US007587496B2

(12) United States Patent
Matsushima

(10) Patent No.: US 7,587,496 B2
(45) Date of Patent: Sep. 8, 2009

(54) TRANSFER DEVICE, DISTRIBUTED PROCESSING SYSTEM, TRANSFER DEVICE CONTROL METHOD, PROGRAM, AND RECORDING MEDIUM

(75) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 737 days.

(21) Appl. No.: 11/197,547

(22) Filed: Aug. 5, 2005

(65) Prior Publication Data
US 2006/0064459 A1 Mar. 23, 2006

(30) Foreign Application Priority Data
Sep. 17, 2004 (JP) ............................. 2004-272605

(51) Int. Cl.
 G06F 15/16 (2006.01)
 G06F 17/30 (2006.01)
(52) U.S. Cl. ...................... 709/227; 709/200; 709/202; 707/2
(58) Field of Classification Search ........................ None
 See application file for complete search history.

(56) References Cited

U.S. PATENT DOCUMENTS

| 6,321,274 | B1 | 11/2001 | Shakib et al. | |
|---|---|---|---|---|
| 7,149,813 | B2 * | 12/2006 | Flanagin et al. | 709/248 |
| 7,428,523 | B2 * | 9/2008 | Tsang et al. | 707/2 |
| 2003/0084093 | A1 | 5/2003 | Grason et al. | |
| 2005/0027871 | A1 * | 2/2005 | Bradley et al. | 709/227 |

FOREIGN PATENT DOCUMENTS

| EP | 1 241 902 A2 | 9/2002 |
|---|---|---|
| EP | 1 418 732 A2 | 5/2004 |
| JP | 6-75890 | 3/1994 |
| JP | 2001-273211 | 10/2001 |
| JP | 2002-135858 | 5/2002 |
| JP | 2002-223211 | 8/2002 |
| JP | 2003-196611 | 7/2003 |
| JP | 2003-228505 | 8/2003 |
| JP | 2004-5418 | 1/2004 |
| WO | WO 02/13479 A2 | 2/2002 |

OTHER PUBLICATIONS

U.S. Appl. No. 12/051,226, filed Mar. 19, 2008, Matsushima.
U.S. Appl. No. 11/400,227, filed Apr. 10, 2006, Matsushima.

* cited by examiner

Primary Examiner—Wen-Tai Lin
(74) Attorney, Agent, or Firm—Oblon, Spivak, McClelland, Maier & Neustadt, P.C.

(57) ABSTRACT

In a transfer device which mediates communication between first communication devices and a second communication device via a network, a first receiver unit receives collectively operation responses from the first communication devices, the operation responses being created to operation requests of the second communication device respectively. A first transmitter unit transmits collectively the operation responses received by the first receiver unit, to the second communication device as a destination of each of the operation responses. A second receiver unit receives collectively the operation requests which are sent to the first communication devices by the second communication device, from the second communication device. A second transmitter unit transmits collectively the operation requests received by the second receiver unit, to the first communication devices as respective destinations of the operation requests.

28 Claims, 61 Drawing Sheets

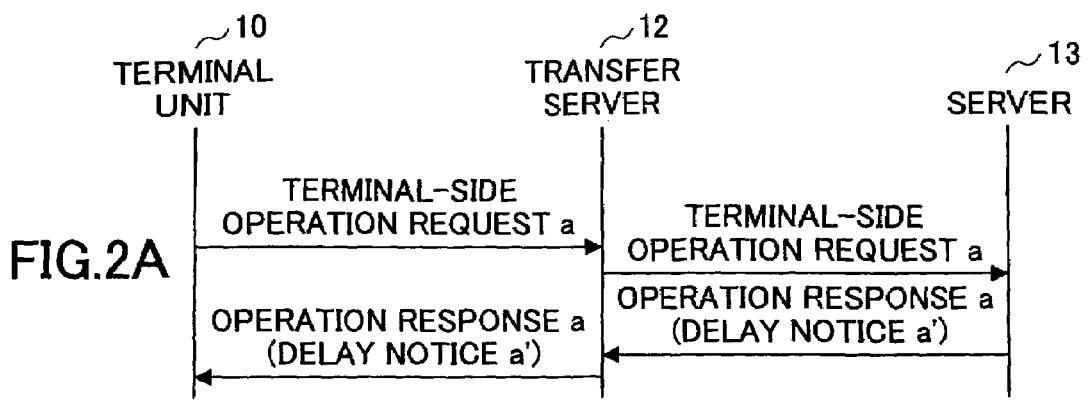
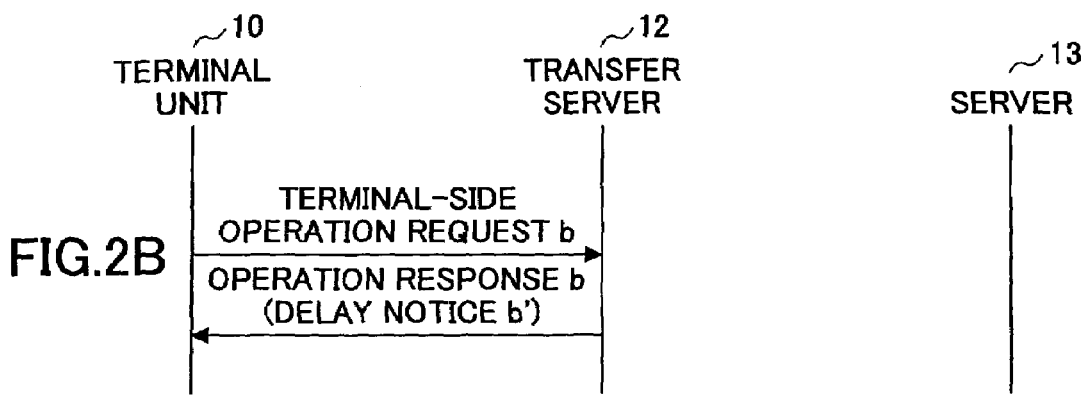
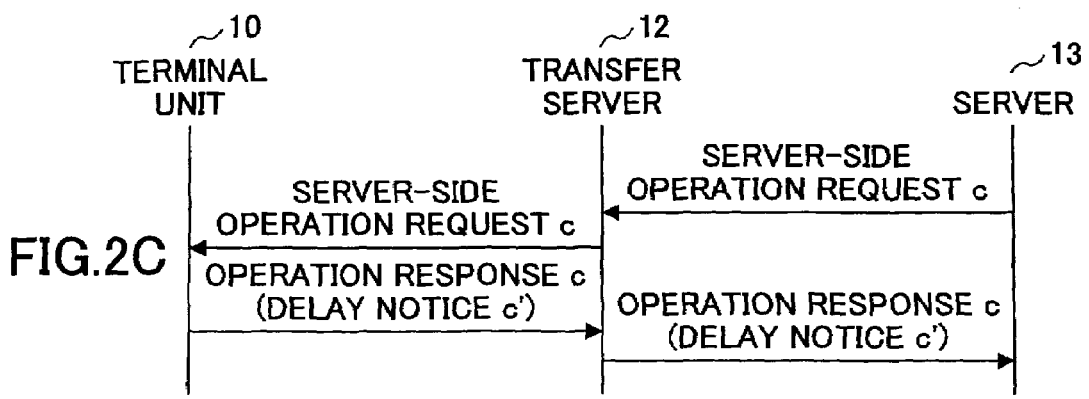
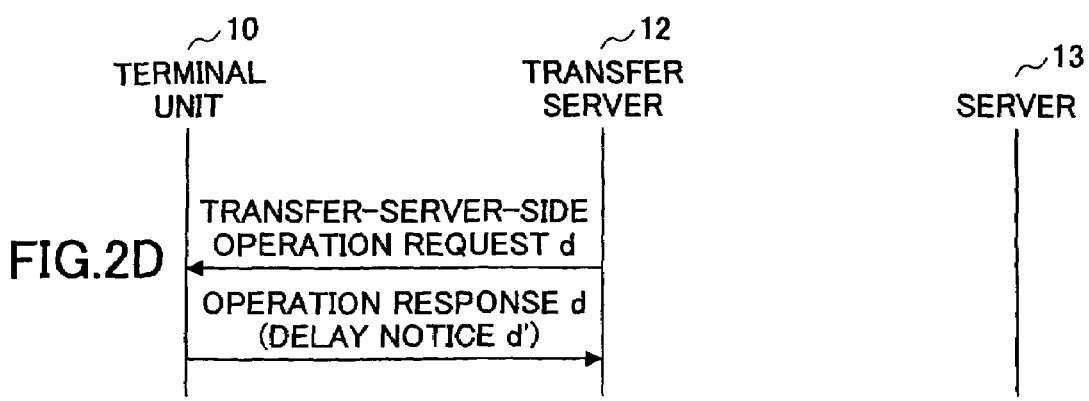

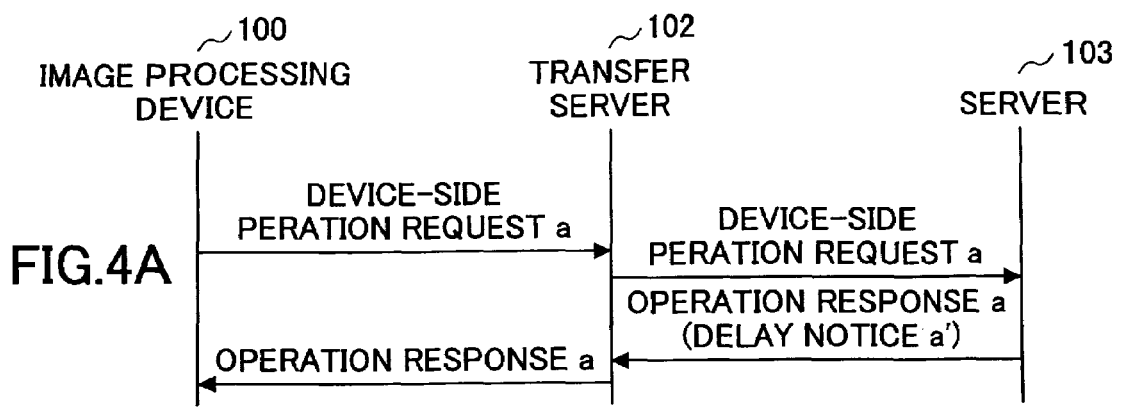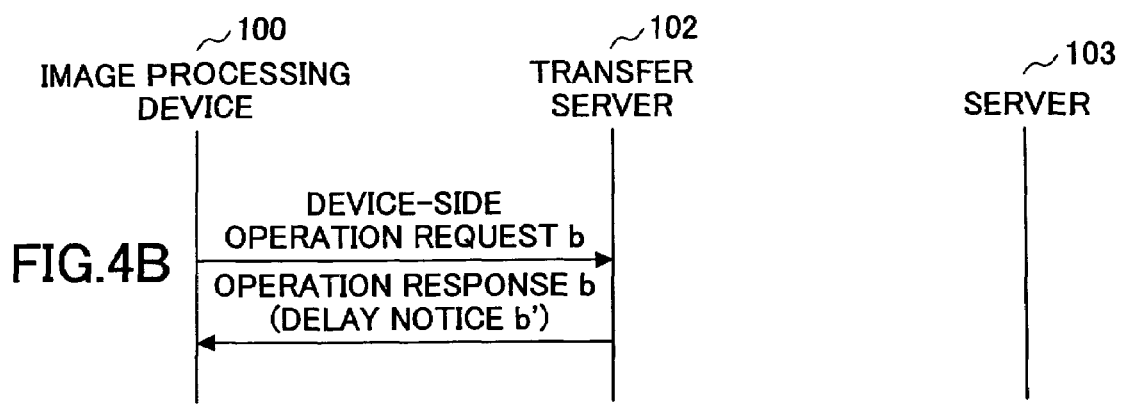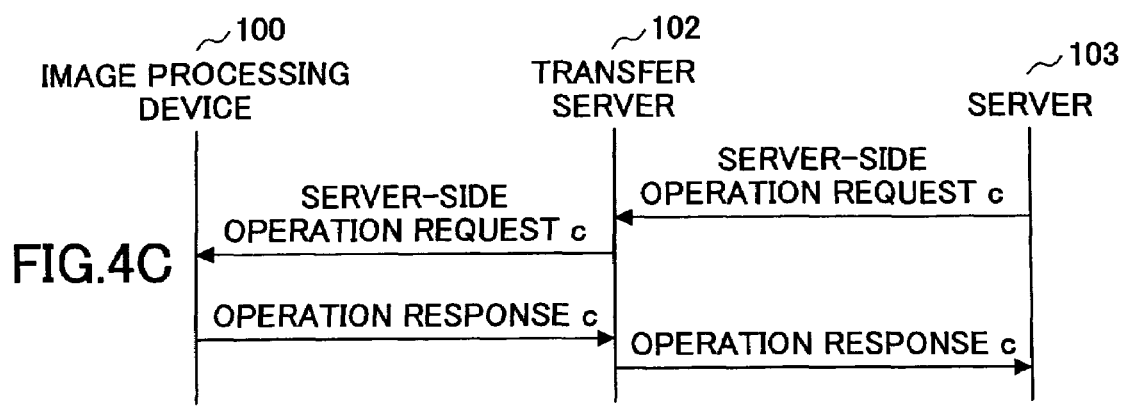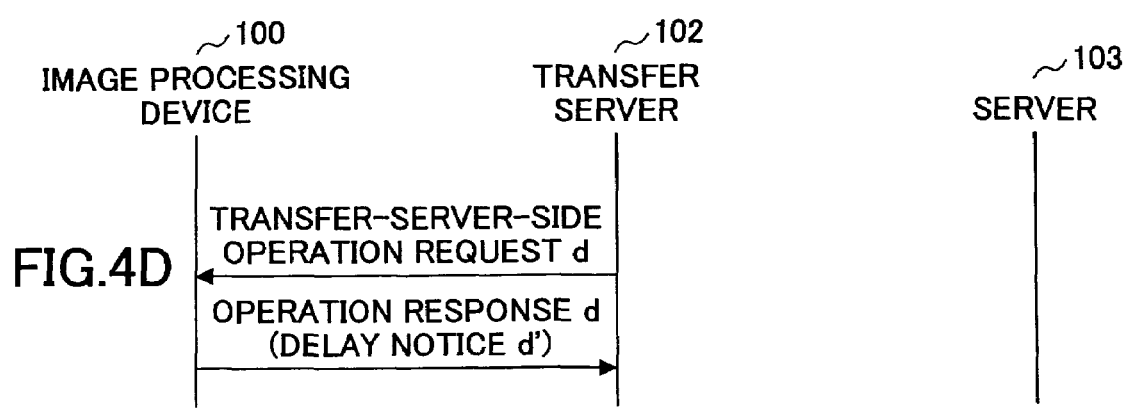

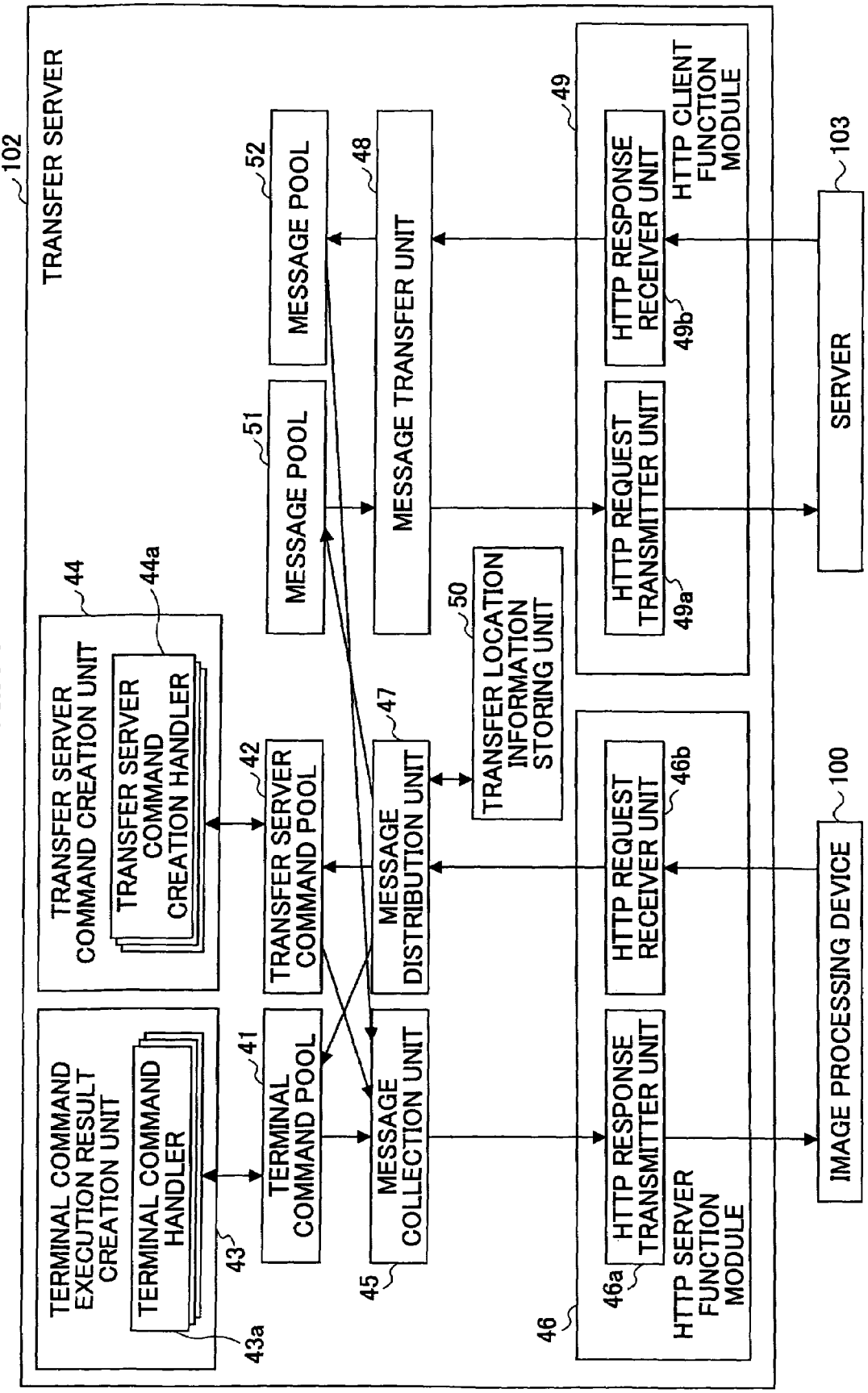

FIG.12

COMMAND ID
SOURCE NODE INFORMATION
METHOD NAME (ERROR MESSAGE)
INPUT PARAMETER (ERROR DESCRIPTION)
STATE (INITIAL VALUE: UN-PROCESSED)
OUTPUT PARAMETER (VACANCY UNTIL COMPLETION)
COMMAND DESTINATION NODE

FIG.13

COMMAND ID
DESTINATION NODE INFORMATION
METHOD NAME (COUNT VALUE)
INPUT PARAMETER
STATE (INITIAL VALUE: UN-PROCESSED)
DESTINATION NODE OF COMMAND EXCUTION RESULT
OUTPUT PARAMETER (VACANCY UNTIL RESPONSE IS RECEIVED)

FIG.14

TRANSFER NODE INFORMATION

ENTITY HEADER INFORMATION

XML DATA OF MESSAGE

FIG.15

ENTITY HEADER INFORMATION

XML DATA OF MESSAGE

FIG.16

```
POST /aaa HTTP/1.1
Content-Type:multipart/mixed;boundary=MIME_boundary
Content-Length:nnnn --MIME_boundary
Content-Type:text/xml;charset=UTF-8    ⎫
Content-Transfer-Encoding:8bit          ⎬ ENTITY
SOAPAction:"SOAP Action URI"            ⎭ HEADER
X-SOAP-Type:Request <s:Envelope>                            ⎫ XML    (SOAP    )
   <--SOAP Request-->                   ⎬ DATA   (ENVELOPE)
</s:Envelope>
```
1ST PART

```
--MIME_boundary
Content-Type:text/xml;charset=UTF-8
Content-Transfer-Encoding:8bit
X-SOAP-Type:Response <s:Envelope>
   <--SOAP Response-->
</s:Envelope>
```
2ND PART

```
--MIME_boundary
Content-Type:text/xml;charset=UTF-8
Content-Transfer-Encoding:8bit
X-SOAP-Type:Response <s:Envelope>
   <--SOAP Response-->
</s:Envelope>
```
3RD PART

```
--MIME_boundary
Content-Type:text/xml;charset=UTF-8
Content-Transfer-Encoding:8bit
X-SOAP-Type:Response <s:Envelope>
   <--SOAP Response-->
</s:Envelope>

--MIME_boundary--
```
4TH PART

FIG.17

```
HTTP/1.1 200 OK
Content-Type:multipart/mixed;boundary=MIME_boundary
Content-Length:nnnn --MIME_boundary
Content-Type:text/xml;charset=UTF-8
Content-Transfer-Encoding:8bit
SOAPAction:"SOAP Action URI"
X-SOAP-Type:Request <s:Envelope>
   <--SOAP Request-->
</s:Envelope>

--MIME_boundary
Content-Type:text/xml;charset=UTF-8
Content-Transfer-Encoding:8bit
X-SOAP-Type:Response <s:Envelope>
   <--SOAP Response-->
</s:Envelope>

--MIME_boundary
Content-Type:text/xml;charset=UTF-8
Content-Transfer-Encoding:8bit
X-SOAP-Type:Response <s:Envelope>
   <--SOAP Response-->
</s:Envelope>

--MIME_boundary
Content-Type:text/xml;charset=UTF-8
Content-Transfer-Encoding:8bit
X-SOAP-Type:Response <s:Envelope>
   <--SOAP Response-->
</s:Envelope>

--MIME_boundary--
```

1ST PART: ENTITY HEADER + XML DATA (SOAP ENVELOPE)
2ND PART
3RD PART
4TH PART

FIG.18

```
POST /bbb HTTP/1.1
Content-Type:multipart/mixed;boundary=MIME_boundary
Content-Length:nnnn --MIME_boundary
Content-Type:text/xml;charset=UTF-8
Content-Transfer-Encoding:8bit
SOAPAction:"SOAP Action URI"
X-SOAP-Type:Request
X-Received-From:Client_A <s:Envelope>
   <--SOAP Request-->
</s:Envelope>

--MIME_boundary
Content-Type:text/xml;charset=UTF-8
Content-Transfer-Encoding:8bit
X-SOAP-Type:Response
X-Received-From:Client_A <s:Envelope>
   <--SOAP Response-->
</s:Envelope>

--MIME_boundary
Content-Type:text/xml;charset=UTF-8
Content-Transfer-Encoding:8bit
X-SOAP-Type:Response
X-Received-From:Client_B <s:Envelope>
   <--SOAP Response-->
</s:Envelope>

--MIME_boundary
Content-Type:text/xml;charset=UTF-8
Content-Transfer-Encoding:8bit
X-SOAP-Type:Response
X-Received-From:Client_B <s:Envelope>
   <--SOAP Response-->
</s:Envelope>

--MIME_boundary--
```

- 1st part: ENTITY HEADER + XML DATA (SOAP ENVELOPE)
- 2nd part
- 3rd part
- 4th part

FIG.19

```
HTTP/1.1 200 OK
Content-Type:multipart/mixed;boundary=MIME_boundary
Content-Length:nnnn --MIME_boundary
Content-Type:text/xml;charset=UTF-8    ⎫
Content-Transfer-Encoding:8bit         ⎪ ENTITY
SOAPAction:"SOAP Action URI"           ⎬ HEADER
X-SOAP-Type:Request                    ⎪
X-Send-To:Client_A                     ⎭

<s:Envelope>                           ⎫ XML    (SOAP    )
   <--SOAP Request-->                  ⎬ DATA   (ENVELOPE)
</s:Envelope>                          ⎭                        1ST PART --MIME_boundary
Content-Type:text/xml;charset=UTF-8
Content-Transfer-Encoding:8bit
X-SOAP-Type:Response
X-Send-To:Client_A <s:Envelope>
   <--SOAP Response-->
</s:Envelope>                                                   2ND PART --MIME_boundary
Content-Type:text/xml;charset=UTF-8
Content-Transfer-Encoding:8bit
X-SOAP-Type:Response
X-Send-To:Client_B <s:Envelope>
   <--SOAP Response-->
</s:Envelope>                                                   3RD PART --MIME_boundary
Content-Type:text/xml;charset=UTF-8
Content-Transfer-Encoding:8bit
X-SOAP-Type:Response
X-Send-To:Client_B <s:Envelope>
   <--SOAP Response-->
</s:Envelope>                                                   4TH PART --MIME_boundary--
```

FIG.20

```
Content-Type: text/xml; charset=UTF-8
Content-Transfer-Encoding: 8bit
X-SOAP-Type: Request
SOAPAction: "http://www.example.com/maintenance/server/errorNotification"

<s:Envelope
  xmlns:s="http://schemas.xmlsoap.org/soap/envelope/"
  xmlns:se="http://schemas.xmlsoap.org/soap/encoding/"
  xmlns:n="http://www.example.com/header"
  xmlns:ns="http://www.example.com/maintenance/server"
  s:encodingStyle="http://schemas.xmlsoap.org/soap/encoding">

<s:Header>
    <n: REQUEST ID>12345</n: REQUEST ID>
</s:Header>
<s:Body>
  <ns: ERROR MESSAGE>
      <ERROR ID>1111</ERROR ID>
      <DESCRIPTION>HARD DISK DRIVE ERROR</DESCRIPTION>
  </ns: ERROR MESSAGE>
</s:Body>
</s:Envelope>
```

FIG.21

```
Content-Type: text/xml; charset=UTF-8
Content-Transfer-Encoding: 8bit
X-SOAP-Type: Response <s:Envelope
  xmlns:s="http://schemas.xmlsoap/org/soap/envelope/"
  xmlns:se="http://schemas.xmlsoap/org/soap/encoding/"
  xmlns:n="http://www.example.com/header"
  xmlns:ns="http://www.example.com/maintenance/server"
  s:encodingStyle="http://schemas.xmlsoap.org/soap/encoding">

<s:Header>
    <n: REQUEST ID>12345</n: REQUEST ID>
  </s:Header>
  <s:Body>
    <ns: ERROR MESSAGE RESPONSE>
      <RECEPTION RESULT>OK</RECEPTION RESULT>
    </ns: ERROR MESSAGE RESPONSE>
  </s:Body>
</s:Envelope>
```

FIG.22

```
Content-Type: text/xml; charset=UTF-8
Content-Transfer-Encoding: 8bit
X-SOAP-Type: Request
SOAPAction: "http://www.example.com/sales/server/orderPaper"

<s:Envelope
    xmlns:s="http://schemas.xmlsoap/org/soap/envelope/"
    xmlns:se="http://schemas.xmlsoap/org/soap/encoding/"
    xmlns:n="http://www.example.com/header"
    xmlns:ns="http://www.example.com/sales/server"
    s:encodingStyle="http://schemas.xmlsoap.org/soap/encoding">

<s:Header>
    <n: REQUEST ID>12345</n: REQUEST ID>
  </s:Header>
  <s:Body>
    <ns: SHEET ORDER>
      <PRODUCT NAME>A4 COPY SHEET100</PRODUCT NAME>
      <QUANTITY>5</QUANTITY>
    </ns: SHEET ORDER>
  </s:Body>
</s:Envelope>
```

FIG.23

```
Content-Type: text/xml; charset=UTF-8
Content-Transfer-Encoding: 8bit
X-SOAP-Type: Request
SOAPAction: "http://www.example.com/sales/server/orderPaper"
X-Received-From:Client_A
```

ENVELOPE IS SAME AS THAT OF TRANSMISSION FROM IMAGE PROCESSING DEVICE TO TRANSFER SERVER

FIG.24

```
Content-Type: text/xml; charset=UTF-8
Content-Transfer-Encoding: 8bit
X-SOAP-Type: Response
X-Send-To: Client_A <s:Envelope
 xmlns:s="http://schemas.xmlsoap.org/soap/envelope/"
 xmlns:se="http://schemas.xmlsoap.org/soap/encoding/"
 xmlns:n="http://www.example.com/header"
 xmlns:ns:"http://www.example.com/sales/server"
 s:encodingStyle="http://schemas.xmlsoap.org/soap/encoding">

<s:Header>
    <n: REQUEST ID>12345</n: REQUEST ID>
</s:Header>
<s:Body>
    <ns: SHEET ORDER RESPONSE>
        <ORDER RESULT>OK</ORDER RESULT>
        <FEE>1000<FEE>
    </ns: SHEET ORDER RESPONSE>
</s:Body>
</s:Envelope>
```

FIG.25

```
Content-Type: text/xml; charset=UTF-8
Content-Transfer-Encoding: 8bit
x-SOAP-Type: Response
```

ENVELOPE IS SAME AS THAT OF TRANSMISSION FROM SERVER TO TRANSFER SERVER

FIG.26

```
Content-Type: text/xml; charset=UTF-8
Content-Transfer-Encoding: 8bit
X-SOAP-Type: Request
SOAPAction: "http://www.example.com/maintenance/client/getTemperature"

<s:Envelope
  xmlns:s="http://schemas.xmlsoap/org/soap/envelope/"
  xmlns:se="http://schemas.xmlsoap/org/soap/encoding/"
  xmlns:n="http://www.example.com/header"
  xmlns:nc:"http://www.example.com/maintenance/client"
  s:encodingStyle="http://schemas.xmlsoap.org/soap/encoding">

<s:Header>
    <n: REQUEST ID>98765</n: REQUEST ID>
  </s:Header>
  <s:Body>
    <nc: TEMPERATURE SENSOR VALUE>
      <SENSOR ID>3</SENSOR ID>
    </nc: TEMPERATURE SENSOR VALUE>
  </s:Body>
</s:Envelope>
```

FIG.27

```
Content-Type: text/xml; charset=UTF-8
Content-Transfer-Encoding: 8bit
X-SOAP-Type: Response <s:Envelope
  xmlns:s="http://schemas.xmlsoap/org/soap/envelope/"
  xmlns:se="http://schemas.xmlsoap/org/soap/encoding/"
  xmlns:n="http://www.example.com/header"
  xmlns:nc:"http://www.example.com/maintenance/client"
  s:encodingStyle="http://schemas.xmlsoap.org/soap/encoding">

<s:Header>
    <n: REQUEST ID>98765</n: REQUEST ID>
  </s:Header>
  <s:Body>
    <nc: TEMPERATURE SENSOR VALUE RESPONSE>
      <TEMPERATURE>52</TEMPERATURE>
    </nc: TEMPERATURE SENSOR VALUE RESPONSE>
  </s:Body>
</s:Envelope>
```

FIG.28

```
Content-Type: text/xml; charset=UTF-8
Content-Transfer-Encoding: 8bit
X-SOAP-Type: Response
SOAPAction: "http://www.example.com/sales/client/notifyNewItem"
X-Send-To: Client_A <s:Envelope
 xmlns:s="http://schemas.xmlsoap/org/soap/envelope/"
 xmlns:se="http://schemas.xmlsoap/org/soap/encoding/"
 xmlns:n="http://www.example.com/header"
 xmlns:nc="http://www.example.com/sales/client"
 s:encodingStyle="http://schemas.xmlsoap.org/soap/encoding">

<s:Header>
  <n: REQUEST ID>77777</n: REQUEST ID>
 </s:Header>
 <s:Body>
  <nc: NEW PRODUCT INFORMATION MESSAGE>
   <PRODUCT NAME>HIGH QUALITY PRINTER SHEET100</PRODUCT NAME>
   <PRICE>1000<PRICE>
  </nc: NEW PRODUCT INFORMATION MESSAGE>
 </s:Body>
</s:Envelope>
```

FIG.29

```
Content-Type: text/xml; charset=UTF-8
Content-Transfer-Encoding: 8bit
x-SOAP-Type: Request
SOAPAction: "http://www.example.com/sales/client/notifyNewItem"
```

ENVELOPE IS SAME AS THAT OF TRANSMISSION FROM SERVER TO TRANSFER SERVER

FIG.30

```
Content-Type: text/xml; charset=UTF-8
Content-Transfer-Encoding: 8bit
X-SOAP-Type: Response <s:Envelope
 xmlns:s="http://schemas.xmlsoap/org/soap/envelope/"
 xmlns:se="http://schemas.xmlsoap/org/soap/encoding/"
 xmlns:n="http://www.example.com/header"
 xmlns:nc="http://www.example.com/sales/client"
 s:encodingStyle="http://schemas.xmlsoap.org/soap/encoding">

<s:Header>
    <n: REQUEST ID>77777</n: REQUEST ID>
</s:Header>
<s:Body>
<nc: NEW PRODUCT INFORMATION MESSAGE RESPONSE>
    <RECEPTION RESULT>OK</RECEPTION RESULT>
</nc: NEW PRODUCT INFORMATION MESSAGE RESPONSE>
</s:Body>
</s:Envelope>
```

FIG.31

```
Content-Type: text/xml; charset=UTF-8
Content-Transfer-Encoding: 8bit
x-SOAP-Type: Response
x-Received-From: Client_A
```

ENVELOPE IS SAME AS THAT OF TRANSMISSION FROM IMAGE PROCESSING DEVICE TO TRANSFER SERVER

FIG.34

| NAME SPACE URI | TRANSFER NODE INFORMATION (IP ADDRESS, HOST NAME, ETC.) |
|---|---|
| http://www.example.com/maintenance/server | FACILITIES MANAGEMENT SERVER (TRANSFER SERVER 102, ITSELF) |
| http://www.example.com/maintenance/client | FACILITIES MANAGEMENT SERVER (TRANSFER SERVER 102, ITSELF) |
| http://www.example.com/sales/server | SALES MANAGEMENT SERVER (SERVER 103a) |
| http://www.example.com/sales/client | SALES MANAGEMENT SERVER (SERVER 103a) |
| http://www.example.com/delivery/server | INFORMATION DELIVERY SERVER (SERVER 103b) |
| http://www.example.com/delivery/client | INFORMATION DELIVERY SERVER (SERVER 103b) |

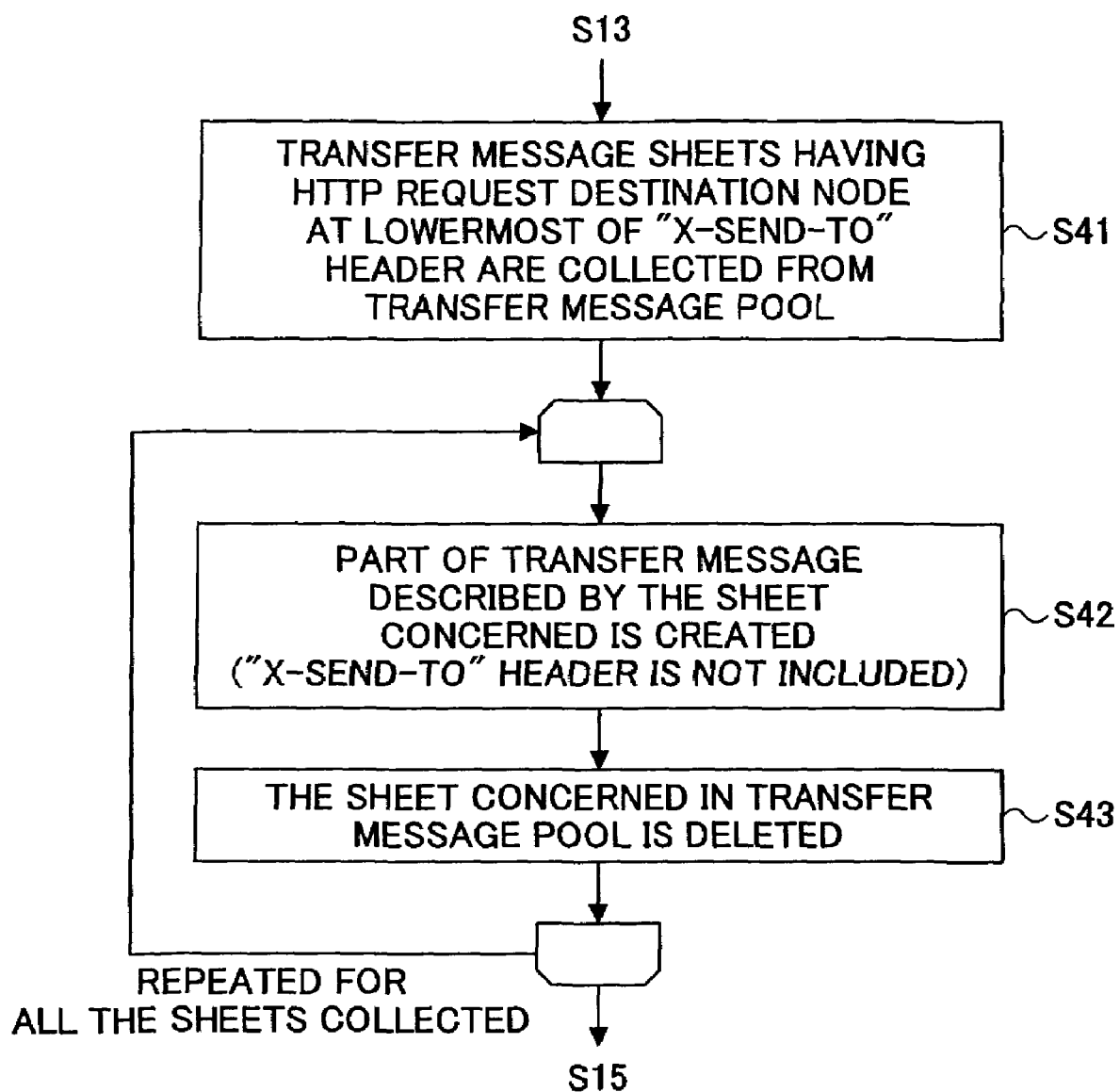

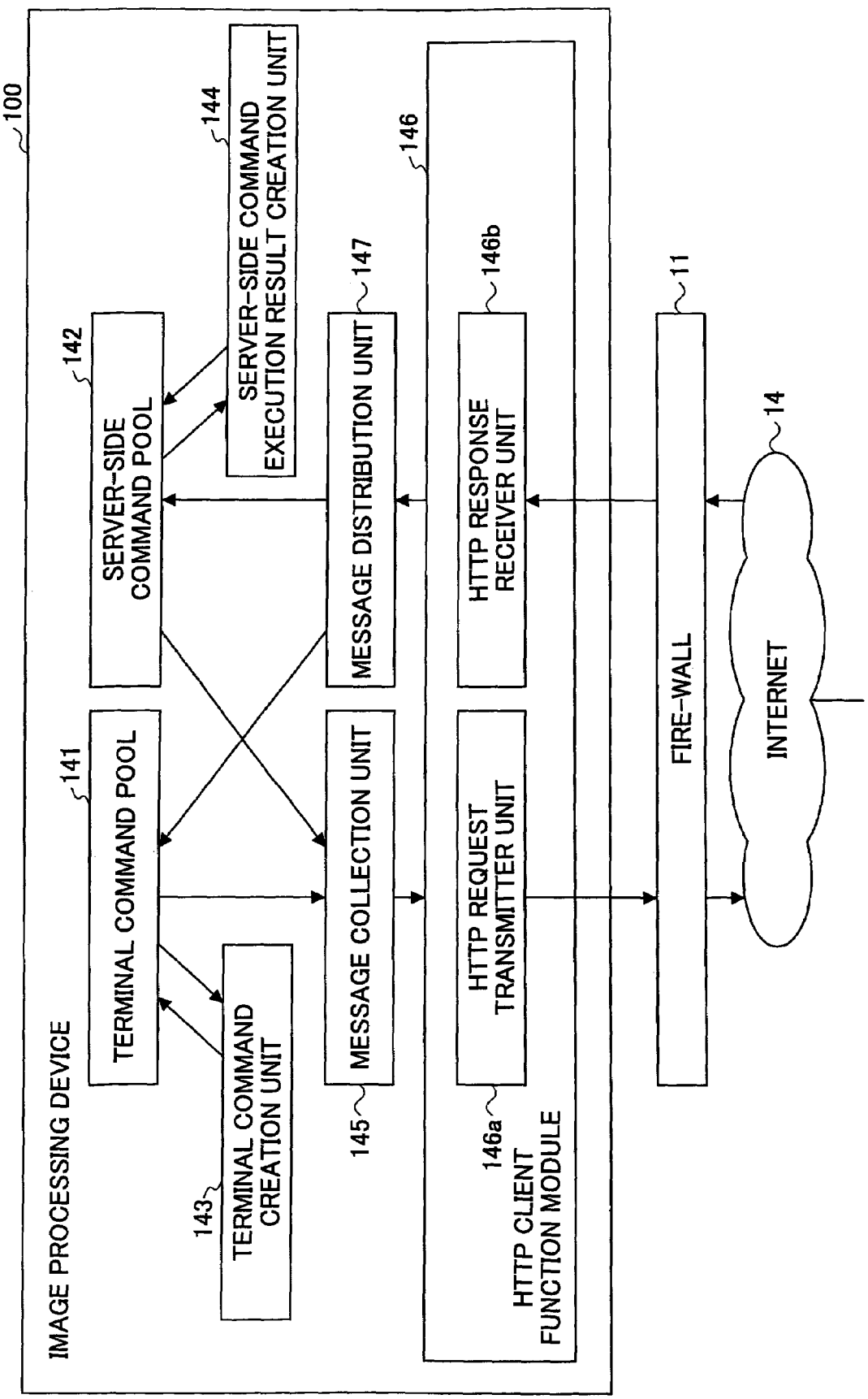

FIG.43

```
COMMAND ID
METHOD NAME (ERROR MESSAGE)
INPUT PARAMETER (ERROR DESCRIPTION)
STATE (INITIAL VALUE: UN-PROCESSED)
NOTIFICATION NODE OF COMMAND EXECUTION RESULT
OUTPUT PARAMETER (VACANCY UNTIL RESPONSE IS RECEIVED)
```

FIG.44

```
COMMAND ID
METHOD NAME (COUNT VALUE)
INPUT PARAMETER
STATE (INITIAL VALUE: UN-PROCESSED)
OUTPUT PARAMETER (VACANCY UNTIL PROCESS IS DONE)
COMMAND NOTIFICATION NODE
```

FIG.49

| TERMINAL ID | PATH INFORMATION |
|---|---|
| IMAGE PROCESSING DEVICE A | ⇔TRANSFER SERVER 102 |
| IMAGE PROCESSING DEVICE B | ⇔TRANSFER SERVER 102 |
| IMAGE PROCESSING DEVICE C | UNKNOWN |
| IMAGE PROCESSING DEVICE D | UNKNOWN |

FIG.58

| TERMINAL ID | PATH INFORMATION |
|---|---|
| TERMINAL A | ⇔TRANSFER SERVER F⇔TRANSFER SERVER G |
| TERMINAL B | ⇔TRANSFER SERVER H |
| TERMINAL C | UNKNOWN |
| TERMINAL D | UNKNOWN |

FIG.59

| NAME SPACE URI | TRANSFER NODE INFORMATION (IP ADDRESS, HOST NAME, ETC.) |
|---|---|
| http://www.example.com/maintenance/server | FACILITIES MANAGEMENT SERVER (TRANSFER SERVER 102, ITSELF) |
| http://www.example.com/maintenance/client | FACILITIES MANAGEMENT SERVER (TRANSFER SERVER 102, ITSELF) |
| http://www.example.com/sales/server | SALES MANAGEMENT SERVER (SERVER 103a) |
| http://www.example.com/sales/client | SALES MANAGEMENT SERVER (SERVER 103a) |
| http://www.example.com/delivery/server | INFORMATION DELIVERY SERVER (SERVER 103b) |
| http://www.example.com/delivery/client | INFORMATION DELIVERY SERVER (SERVER 103b) |
| default | COMPREHENSIVE MANAGEMENT SERVER (SERVER 103c) |

FIG.61

| NAME SPACE URI | TRANSFER NODE INFORMATION (IP ADDRESS, HOST NAME, ETC.) |
|---|---|
| http://www.example.com/maintenance/server | TRANSFER SERVER B (ITSELF) |
| http://www.example.com/maintenance/client | TRANSFER SERVER B (ITSELF) |
| default | TRANSFER SERVER C (SECONDARY TRANSFER SERVER) |

| SETTING NAME | SETTING VALUE |
|---|---|
| NAME SPACE URI TO WHICH METHOD OF PROCESSING BY ITSELF BELONGS | http://www.example.com/maintenance/server http://www.example.com/maintenance/client |
| TRANSFER LOCATION SERVER ID | TRANSFER SERVER C (SECONDARY TRANSFER SERVER) | ed
TRANSFER DEVICE, DISTRIBUTED PROCESSING SYSTEM, TRANSFER DEVICE CONTROL METHOD, PROGRAM, AND RECORDING MEDIUM

BACKGROUND OF THE INVENTION

1. Field of the Invention

The present invention relates to a transfer device which mediates communication between first communication devices and a second communication device, a distributed processing system which has the transfer device, the first communication devices and the second communication device, a transfer device control method which controls the transfer device to mediate communication between the first communication devices and the second communication device, and a computer program product embodied for causing a computer to execute the transfer device control method.

2. Description of the Related Art

Conventionally, in a communication system in which communication devices are connected via a network, the communication devices exchange messages mutually so that a notice or demand from one communication device is transmitted to another communication device. And in such a system, a first communication device transmits a command to a second communication device as an operation request causing the second communication device to perform a certain operation, and the second communication device sends back to the first communication device an execution result of the operation as an operation response.

For example, Japanese Laid-Open Patent Application No. 2001-273211 discloses such technology and teaches that a remote processor transmits to a local processor a message which gives a command to be performed by the local processor, and receives a response which indicates a result of the command by the local processor.

In the system of Japanese Laid-Open Patent Application No. 2001-273211, the remote processor is arranged outside the firewall and the local processor is arranged inside the firewall. It is also disclosed that, when needed, the local processor transmits an operation request to the remote processor in the outside of the firewall, and the remote processor transmits a command to the local processor as a response to the operation request. This technology enables transmission of a command to the inside of the firewall from the outside of the firewall.

The technology concerning the above operation request is applicable also to a remote management system which carries out remote control of management operation of a device connected to the communication device.

Japanese Laid-Open Patent Application No. 2002-135858 discloses an example of the application of this technology to a remote management system. In this system, a command from a remote control device having the function of receiving an operation request from a user is transmitted to a remotely controlled device having the function of performing blinding operation and lighting operation, so that a blinding or lighting operation is performed by the remotely controlled device according to the command.

However, there is no teaching in Japanese Laid-Open Patent Application No. 2002-135858 of transmitting a response in respect of the command from the remotely controlled device to the remote control device.

By the way, when exchanging messages between a plurality of communication devices, there is a conceivable case in which one communication device transmits a command to two or more other communication devices. And in such a case, each communication device that receives the command is demanded to return the execution result of the command to the command-transmitting source communication device, respectively.

Conventionally, when performing such operation, the source communication device communicates with the destination communication devices as the destinations of the command individually, and transmits the command to every one of the destination communication devices. Also when receiving a command response, the source communication device communicates individually with each destination communication device to which the command is transmitted, and receives a command response from each destination communication device.

However, according to the conventional system mentioned above, every time a command is transmitted or a command response is received, it is necessary to establish a connection between the source communication device and the destination communication device separately for every destination of the command, respectively. Therefore, the communication overhead becomes large and there is a problem of communication efficiency.

Under the present circumstances, the environment where communication through the network is performed by establishing a dial-up connection still remains, and the above-mentioned problem remains unresolved in such environment. In such environment, a communication fee is charged every time a connection is established, and there is a case in which establishing a connection takes the time of several ten seconds. There is also a problem in that the communication cost increases remarkably as the number of times of establishment of the connection increases.

SUMMARY OF THE INVENTION

A general object of the present invention is to provide a transfer device in which the above-described problems are eliminated.

A more specific object of the present invention is to provide a transfer device which efficiently performs communication between communication devices in a distributed processing system when a certain communication device transmits an operation request to other communication devices and receives two or more operation responses to the operation request from the other communication devices.

In order to achieve the above-mentioned objects, the present invention provides a transfer device which mediates communication between first communication devices and a second communication device via a network, the transfer device comprising: a first receiver unit receiving collectively operation responses from the first communication devices, the operation responses being created to operation requests of the second communication device and sent to the second communication device; a first transmitter unit transmitting collectively the operation responses received by the first receiver unit, to the second communication device as a destination of each of the operation responses; a second receiver unit receiving collectively the operation requests which are sent to the first communication devices by the second communication device, from the second communication device; and a second transmitter unit transmitting collectively the operation requests received by the second receiver unit, to the first communication devices as respective destinations of the operation requests of the second communication device.

In order to achieve the above-mentioned objects, the present invention provides a distributed processing system having a server and a transfer device connected to each other, the transfer device mediating communication between the server and terminal units via a network, the transfer device comprising: a first receiver unit receiving collectively operation responses from the terminal units, the operation responses being created to operation requests of the server and sent to the server; a first transmitter unit transmitting collectively the operation responses received by the first receiver unit, to the server as a destination of each of the operation responses; a second receiver unit receiving collectively the operation requests which are sent to the terminal units by the server, from the server; and a second transmitter unit transmitting collectively the operation requests received by the second receiver unit, to the terminal units as respective destinations of the operation requests of the server, and the server comprising: a transmitter unit transmitting collectively the operation requests which are sent to the terminal units, to the transfer device; and a receiver unit receiving collectively the operation responses of the terminal units which are created to the operation requests of the server and sent to the terminal units, from the transfer device.

In order to achieve the above-mentioned objects, the present invention provides a transfer device control method of controlling a transfer device which mediates communication between first communication devices and a second communication device via a network, the method comprising: receiving collectively operation responses from the first communication devices, the operation responses being created to operation requests of the second communication device and sent to the second communication device; transmitting collectively the operation responses to the second communication device as a destination of each of the operation responses; receiving collectively the operation requests which are sent to the first communication devices by the second communication device, from the second communication device; and transmitting collectively the received operation requests to the first communication devices as respective destinations of the operation requests of the second communication device.

In order to achieve the above-mentioned objects, the present invention provides a computer program product embodied for causing a computer to execute a transfer device control method of controlling a transfer device which mediates communication between first communication devices and a second communication device via a network, the method comprising: receiving collectively operation responses from the first communication devices, the operation responses being created to operation requests of the second communication device and sent to the second communication device; transmitting collectively the operation responses to the second communication device as a destination of each of the operation responses; receiving collectively the operation requests which are sent to the first communication devices by the second communication device, from the second communication device; and transmitting collectively the received operation requests to the first communication devices as respective destinations of the operation requests of the second communication device.

According to the transfer device, the distributed processing system and the transfer device control method of the invention, when a certain communication device in the distributed processing system transmits an operation request to two or more communication devices and receives the operation responses to the operation request, communication efficiency can be raised by mediating the communication between the communication devices appropriately. According to the computer program or computer-readable recording medium of the invention, a computer is caused to control the transfer device according to the above-mentioned transfer device control method, and the same advantageous effect can be acquired.

BRIEF DESCRIPTION OF THE DRAWINGS

Other objects, features and advantages of the present invention will be apparent from the following detailed description when reading in conjunction with the accompanying drawings.

FIG. 2A, FIG. 2B, FIG. 2C, and FIG. 2D are diagrams for explaining the relation between an operation request and an operation response in the distributed processing system of FIG. 1.

FIG. 4A, FIG. 4B, FIG. 4C, and FIG. 4D are diagrams for explaining the relation between an operation request and an operation response in the remote management system of FIG. 3.

FIG. 11 is a block diagram showing the composition of the functions for performing command and command response related processes among the functions of the transfer server of FIG. 3.

FIG. 12 is a diagram showing an example of the data structure of a terminal command sheet in the transfer server of FIG. 3.

FIG. 13 is a diagram showing an example of the data structure of a transfer server command sheet in the transfer server of FIG. 3.

FIG. 14 is a diagram showing an example of the data structure of a transfer message sheet in the transfer message pool for transmission in the transfer server of FIG. 3.

FIG. 15 is a diagram showing an example of the data structure of a transfer message sheet in the transfer message pool for reception in the transfer server of FIG. 3.

FIG. 16 is a diagram showing an example of the HTTP request which is received from the image processing device by the transfer server of FIG. 3.

FIG. 17 is a diagram showing an example of the HTTP response which is transmitted to the image processing device by the transfer server of FIG. 3.

FIG. 18 is a diagram showing an example of the HTTP request which is transmitted to the server by the transfer server of FIG. 3.

FIG. 19 is a diagram showing an example of the HTTP response which is received from the server by the transfer server of FIG. 3.

FIG. 20 is a diagram showing an example of the part which describes a terminal command sent to the transfer server in the remote management system of FIG. 3.

FIG. 21 is a diagram showing an example of the part which describes a response to the terminal command shown in FIG. 20.

FIG. 22 is a diagram showing an example of the part when a terminal command sent to the server (sales management server) is transferred to the transfer server from the image processing device.

FIG. 23 is a diagram showing an example of the part when the terminal command shown in FIG. 22 is transferred to the server from the transfer server.

FIG. 24 is a diagram showing an example of the part when a response to the terminal command shown in FIG. 22 is transferred to the transfer server from the server.

FIG. 25 is a diagram showing an example of the part when the command response shown in FIG. 24 is transferred to the image processing device from the transfer server.

FIG. 26 is a diagram showing an example of the part which describes a transfer server command sent to the image processing device.

FIG. 27 is a diagram showing an example of the part which describes a response to the transfer server command shown in FIG. 26.

FIG. 28 is a diagram showing an example of the part when the server command sent to the image processing device is transferred to the transfer server from the server.

FIG. 29 is a diagram showing an example of the part when the server command shown in FIG. 28 is transferred to the image processing device from the transfer server.

FIG. 30 is a diagram showing an example of the part when a response to the server command shown in FIG. 28 is transferred to the transfer server from the image processing device.

FIG. 31 is a diagram showing an example of the part when the command response shown in FIG. 30 is transferred from the transfer server to the server (sales management server).

FIG. 34 is a diagram showing an example of the destination table which is stored in the transfer server of FIG. 3.

FIG. 35 is a flowchart for explaining the transfer message collection process of step S14 in the basic flow of FIG. 32.

FIG. 42 is a block diagram showing the composition of the functions for performing the command and command response related processes among the functions of the image processing device of FIG. 3.

FIG. 43 is a diagram showing an example of the data structure of a terminal command sheet in the image processing device of FIG. 3.

FIG. 44 is a diagram showing an example of the data structure of a server side command sheet in the image processing device of FIG. 3.

FIG. 49 is a diagram showing an example of the path information table which is stored in the server of FIG. 3.

FIG. 58 is a diagram showing an example of the path information table in the server J shown in FIG. 57.

FIG. 59 is a diagram showing another example of the destination table of FIG. 34.

FIG. 61 is a diagram showing another example of the destination table.

DETAILED DESCRIPTION OF PREFERRED EMBODIMENTS

A description will now be given of the preferred embodiments of the invention with reference to the accompanying drawings.

One embodiment of the distributed processing system which is a transfer server which is constituted as a transfer device of the invention, and the distributed processing system which is constituted using the transfer server will be explained.

Figure 1:
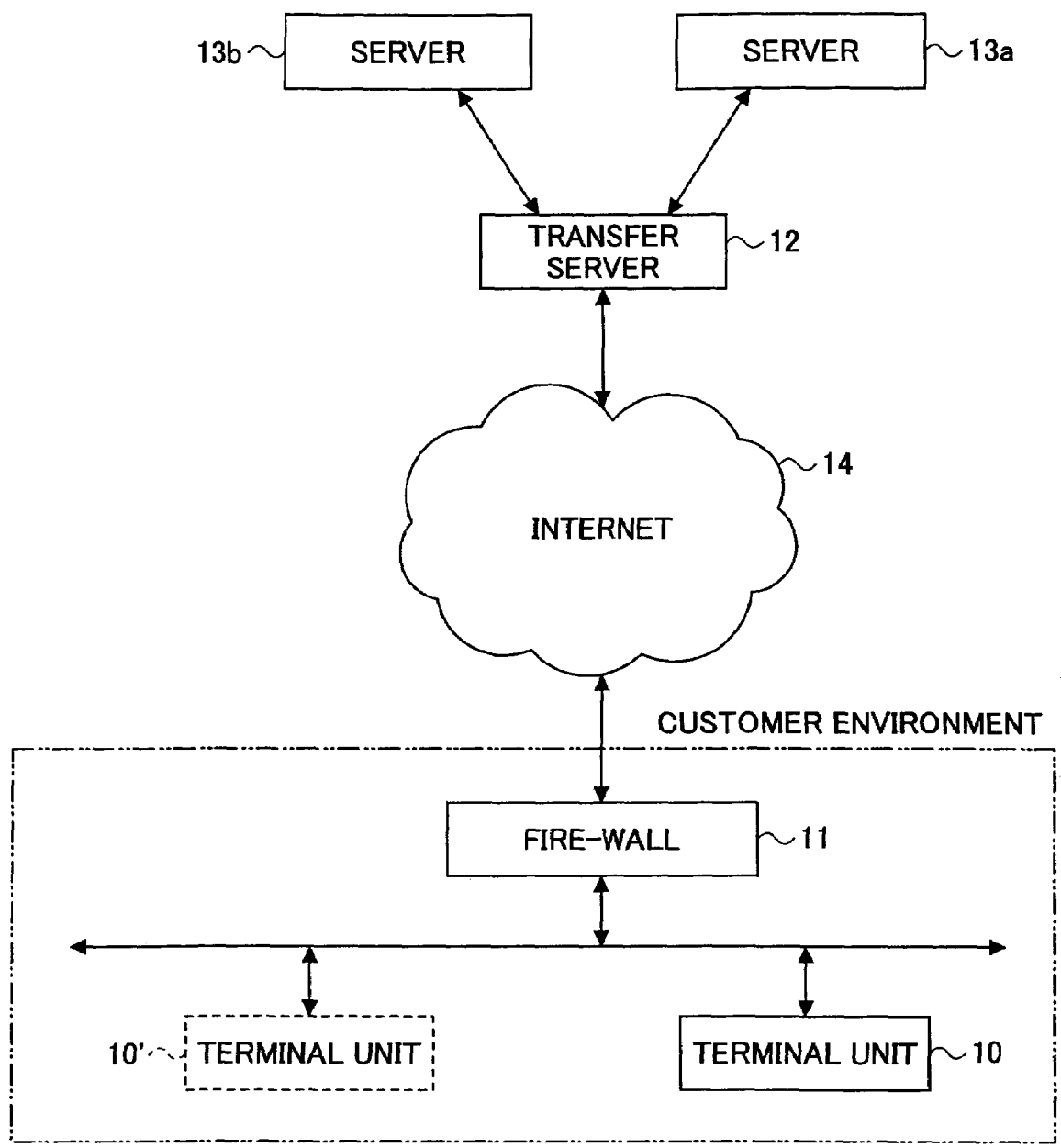
FIG. 1 is a block diagram showing the composition of an embodiment of the distributed processing system using a transfer server as the transfer device of the invention.

FIG. 1 is a block diagram showing the composition of the distributed processing system using the transfer server as the transfer device of the invention. As shown in FIG. 1, the distributed processing system comprises the terminal units 10 which are the first communication devices, the servers 13 which are the second communication devices, and the transfer server 12 which mediates communication between these communication devices via the network 14. In FIG. 1, the terminal units 10 and 10' and the servers 13a and 13b are illustrated. For the purpose of explanation of the invention in the following, the terminal unit 10 and the server 13 will be considered as a typical example of these devices unless otherwise specified.

Terminal unit 10 is arranged in the customer environment (user side) and configured so that it is capable of communicating with transfer server 12 via the Internet 14. When the function offered by server 13 is used from terminal unit 10, terminal unit 10 transmits only the demand to transfer server 12, and the transfer server 12 transmits the demand from terminal unit 10 to an appropriate server 13. In this manner, the distributed processing system allows terminal 10 to use the function offered by server 13.

In order to facilitate understanding of the distributed processing system, the terms "transfer server" and "server" are used, but it is not intended to limit these devices to a device which achieves the function as "server" on a network.

Terminal unit 10 may be either a known PC (personal computer) having a communication capability or a communication device having a communication capability applicable to one of various electronic devices. For example, terminal unit 10 may be any of image processing devices, including printer, fax device, digital copier, scanner device and a multifunction peripheral device, or communication devices having a communication capability installed in a measuring system of gas, water service or electricity, a network-connected home appliance, a vending machine, a medical device, a power unit, an air conditioning system, a car, an aircraft, etc.

As indicated in FIG. 1, a plurality of terminal units (10 and 10') may be arranged in the customer environment, and terminal units of different kinds may coexist in the customer environment.

In this embodiment, terminal units 10 within each customer environment are connected together to form LAN (local area network), and this LAN is connected to Internet 14 via firewall 11 in consideration of the security of them.

Firewall 11 is usually set up to intercept the communication requests sent from the outside of the customer environment, and transfer server 12 is unable to transmit information to terminal unit 10 inside firewall 11 by transmitting only a communication request like a HTTP (hypertext transfer protocol) request. Therefore, in order to exchange information between transfer server 12 and terminal unit 10, it is necessary to adopt a special protocol.

Server 13 may be arranged to constitute any of various hierarchic structures although only two servers 13 are connected to transfer server 12 in this embodiment. It is also possible to change the arrangement during the use of the distributed processing system.

Since the destination of commands is managed by transfer server 12 even in this embodiment, it can respond to a change of the system configuration easily by changing the data of the destination being managed.

In this embodiment, the connection line between server 13 and transfer server 12 which is different from the Internet 14 is shown. However, it is also possible to rearrange the devices so that the devices can communicate with each other via the Internet 14.

In the distributed processing system mentioned above, the application program is installed in server 13 so that server 13 performs operation according to an operation request from terminal unit 10, or transmits an operation request to terminal unit 10.

The application program is installed in transfer server 12 so that transfer server 12 mediates transmission and reception of an operation request and an operation response to the operation request between terminal unit 10 and server 13.

Moreover, the application program for realizing the function as a server is installed in transfer server 12. Each of the nodes of this distributed processing system including terminal unit 10 is configured so that an operation request which is the request of processing to the method of the application program installed can be transmitted and an operation response which is a result of the requested processing can be acquired at each node according to RPC (remote procedure call).

In this specification, the method is defined as a logical function in which the input and output form is specified. The operation request serves as a function call (procedure call) which calls this function, and the operation response serves as an execution result of the function called by the function call. There is also a case in which the contents of the response to the operation request include a notice having no meaningful execution result.

FIG. 2A through FIG. 2D show the relation between operation request and operation response. The firewall 11 is not taken into consideration in these figures.

FIG. 2A shows the case in which the operation request sent to server 13 is created by terminal unit 10.

In this case, terminal unit 10 creates the terminal side operation request a, and server 13 which receives this request via transfer server 12 and returns the operation response a to the operation request. At this time, it is not necessary for the terminal unit 10 side to grasp which server 13 the operation request is finally transmitted to, and what is performed is only that the operation request is transmitted to transfer server 12. Transfer server 12 transmits the operation request to appropriate server 13, receives an operation response from the server 13, and returns it to terminal unit 10. There is also a case in which the terminal side operation request a is mediated by two or more transfer servers 12 one by one, and it reaches server 13.

In FIG. 2A, there may be a case in which not only the response a but also the delay notice a' is sent to terminal unit 10. When server 13 receives the terminal side operation request a from transfer server 12 and it is determined that it cannot return the response to the operation request during connection with transfer server 12, server 13 sends the delay notice a'. After it is reported that a response is delayed, the connection state is temporarily terminated, and server 13 hands over the response to the operation request anew in the case of a next connection.

FIG. 2B shows the case in which the operation request sent to transfer server 12 is created by terminal unit 10.

In this case, terminal unit 10 creates the terminal side operation request b, and transfer server 12 receives this and returns the operation response b to that operation request.

However, also in this case, it is not necessary for the terminal unit 10 side to take action different from that in the case of FIG. 2A. If an operation request is transmitted to transfer server 12 like the case of FIG. 2A, the operation request which should be performed by itself is distinguished by the transfer server 12 side. When it is recognized that it should be performed by itself, it is made to perform operation which replaces with the transfer to server 13 and relates to the operation request.

Similar to the case of FIG. 2A, also in the case of FIG. 2B, the delay notice b' is returned when a response cannot be returned immediately.

FIG. 2C shows the case in which server 13 creates the operation request c sent to terminal unit 10.

In this case, server 13 creates the server side operation request c, and terminal unit 10 receives this via transfer server 12 and returns the operation response c to that operation request.

FIG. 2D shows the case in which the operation request sent to terminal unit 10 is created by transfer server 12.

In this case, transfer server 12 creates the transfer server side operation request d, and terminal unit 10 receives this and returns the operation response d to that operation request.

Also in the cases of FIG. 2C and FIG. 2D, it is not necessary for the terminal unit to recognize which server the operation response is returned to, and if all the operation responses are transmitted to transfer server 12, the transfer server 12 side transmits them to appropriate servers (including transfer server 12 itself).

Also in the cases of FIG. 2C and FIG. 2D, sending the delay notice is the same as in the cases of FIG. 2A and FIG. 2B.

According to the present invention, SOAP (simple object access protocol) is utilized as the protocol of delivery of the argument list and return values according to RPC (remote procedure call), and the above-mentioned operation request and the above-mentioned operation response are described as a SOAP message.

In this embodiment, when transmitting or receiving an operation request or an operation response to the operation request between a communication device (terminal unit 10) and two or more communication partners (server 13), the transfer server 12 is provided as a transfer device which mediates the transmission and reception. And an operation request is transmitted to server 13 which is the destination node according to the classification of the operation request received from terminal unit 10 by the transfer server 12, and server 13 returns the operation response to terminal unit 10 as the source node of the operation request.

The above embodiment may be configured that an operation request is transmitted only from the above-mentioned communication device, and the above-mentioned communication partners transmit only an operation response to that operation request to the above-mentioned communication device.

As the communications protocol for actually transmitting an operation request and an operation response, a suitable protocol may be used according to the structure of the system, and, for example, HTTP (hypertext transfer protocol), SMTP (simple mail transfer protocol) or FTP (file transfer protocol) is usable.

The example in the case of adopting HTTP will be explained with reference to FIG. 3. The image processing device 100 in this embodiment is the first communication device in the embodiment of the distributed processing system of FIG. 1.

A remote management system in which the service provided by sales management server 103a or the information delivery server 103b which is the second communication device is used, and the facilities management server 102 which is the transfer device of the invention which mediates communication between these devices will be explained.

In this system, the image processing device 100 can also use the service provided by the facilities management server 102. FIG. 3 is a conceptual diagram showing an example of the composition of the distributed processing system, and the composition of FIG. 3 is the same as that of FIG. 1 except the terminal unit 10 is changed to image processing device 100 and the servers 12 and 13 are changed to the servers 102 and 103. The explanation of the whole system of FIG. 3 will be omitted.

In this embodiment, only one image processing device 100 is shown in FIG. 1 as the terminal unit but it is possible to include two or more terminal units in this system.

In the following explanation, in order to simplify explanation, terminal unit will be explained as what is only one image processing device 100, but related to some of processing and data, an example with two or more terminal units is also shown, without specifying it in particular so that it may be extended easily and be applied also to the case in which two or more terminal units are arranged. Even in this case, if one of the plurality of terminal units is assumed as the image processing device 100, it is satisfactorily applicable also to the system shown in FIG. 3.

By the way, image processing device 100 is a digital multifunction peripheral device which is provided with the multiple functions, including a copy, a facsimile and a scanner, and communicates with an external device, and incorporates the application programs for providing service concerning those functions.

Facilities management server 102 has the function to provide the service related to remote management and maintenance of image processing device 100, besides the function as a transfer server which mediates communication between a server and image processing device 100.

Sales management server 103a has the function to provide the service related to the order reception and sale of an article of consumption and a supply in image processing device 100.

Information delivery server 103b has the function to provide the service which distributes various information, including news, guidance or product introduction, etc., to the user of image processing device 100.

Each node can transmit the operation request which is the request of processing to the method of the mutual application program to mount by RPC (remote procedure call), and can acquire now the operation response which is a result of this requested processing.

In the following explanation, except when giving explanation related to the contents of service, the facilities management server 102 is called transfer server 102, and sales management server 103a and the information delivery server 103b are collectively called server 103.

FIG. 4A through FIG. 4D show the relation between the operation request and the operation response. In FIG. 4A through FIG. 4D, the firewall 11 is not taken into consideration.

FIG. 4A shows the case in which the operation request sent to server 103 is created by image processing device 100.

In this case, image processing device 100 creates an image processing device side operation request a (terminal command), and server 103 receives this request via transfer server 102 and returns an operation response a to this command (command response).

There may be a case in which the image processing device side operation request a is mediated by two or more transfer servers 102 one by one, and it reaches server 103.

FIG. 4B shows the case in which the operation request sent to transfer server 102 is created by image processing device 100.

In this case, image processing device 100 creates an image processing device side operation request b, and transfer server 102 receives this request and returns an operation response b to this command, for example.

The point that it is not necessary for the image processing device 100 side to grasp which node the operation request is finally transmitted to in the case of FIG. 4A and FIG. 4B is the same as that in the case of FIG. 2A and FIG. 2B.

FIG. 4C shows the case in which server 103 creates the operation request sent to image processing device 100.

In this case, server 103 creates a server side operation request c (server command), and image processing device 100 receives this request via transfer server 102 and returns an operation response c to the operation request.

FIG. 4D shows the case in which the operation request sent to image processing device 100 is created by transfer server 102.

In this case, transfer server 102 creates a transfer server side operation request (also called "transfer server command") d, and image processing device 100 receives this request and returns an operation response d to the command.

The point that it is not necessary for the image processing device 100 side to grasp which node the operation response is finally transmitted by the image processing device 100 side in the case of FIG. 4C and FIG. 4D is the same as that of the case of FIG. 2C and FIG. 2D.

It is the same as that of the case of FIG. 2A to send the reply a delay notice related to all the FIG. 4A-FIG. 4D, when a response cannot be returned immediately. Thus, an operation request and an operation response are symmetrically dealt with on the level of RPC between image processing device 100 and server 103 and between image processing device 100 and transfer server 102. However, on communication level, it is not symmetrical.

Next, the communication sequence in this distributed processing system will be explained.

Figure 5:
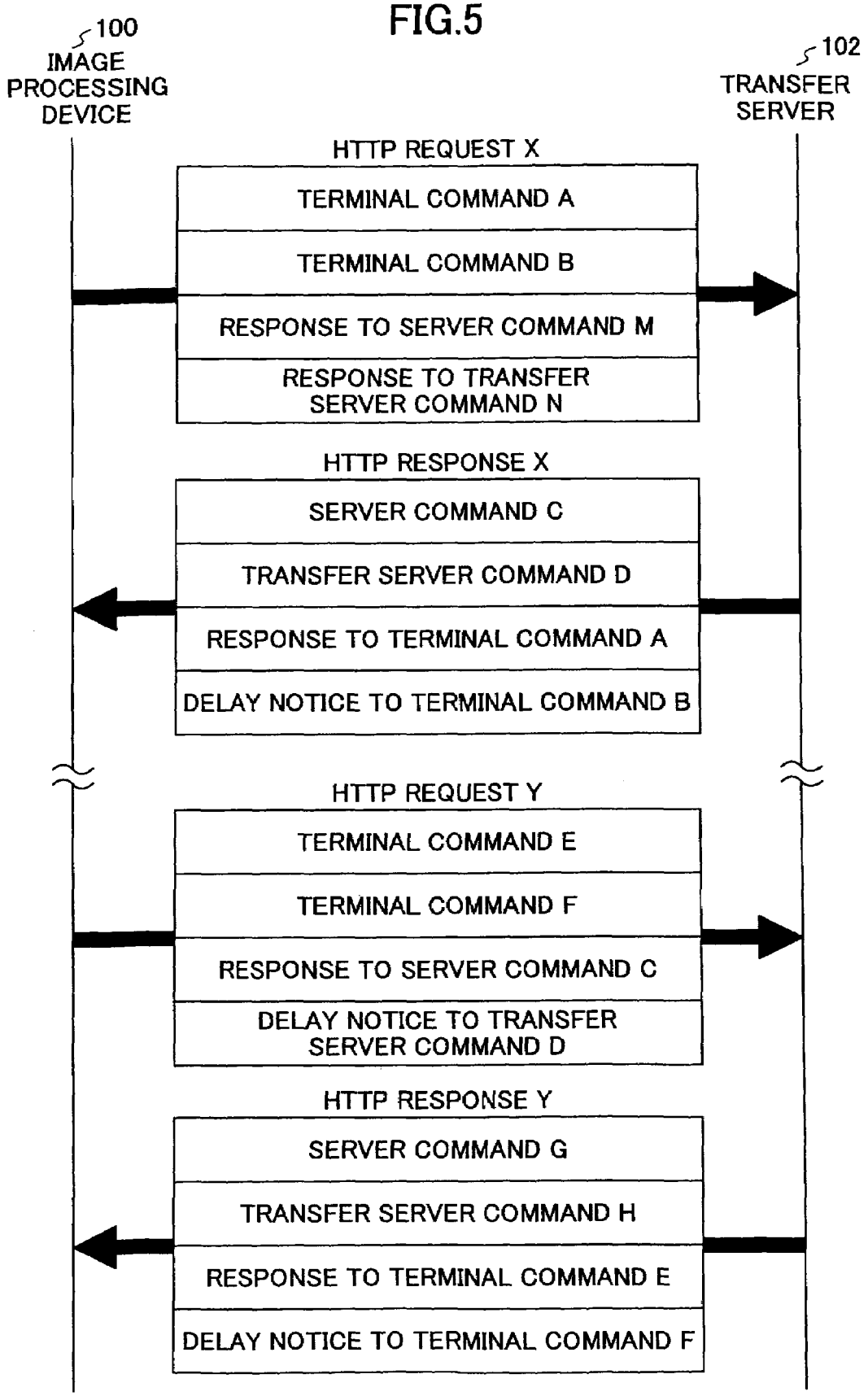
FIG. 5 is a diagram for explaining an example of the communication sequence between the image processing device and the transfer server in the remote management system of FIG. 3.

FIG. 5 shows the example of the communication sequence between image processing device and transfer server.

By transmitting and receiving mutually the HTTP request which is the communication request, and the HTTP response which is the communication response to the communication request, as shown in FIG. 5, image processing device 100 and transfer server 102 are communicating.

However, firewall 11 is provided between image processing device 100 and transfer server 102, and, as shown in FIG. 5, an HTTP request is transmitted to transfer server 102 as the communication request from image processing device 100, and is always performed from transfer server 102 by the procedure of returning a HTTP response to image processing device 100 as a communication response to the communication request.

For example, transfer server 102 returns HTTP response X to HTTP request X which is sent by image processing device 100, and similarly returns HTTP response Y to HTTP request Y.

In the HTTP request sent by image processing device 100, what are described therein are the terminal command which is an operation request to transfer server 102 or server 103 from image processing device 100, the response (command response) to the server command transmitted to image processing device 100 via transfer server 102 from server 103, and the response to the transfer server command transmitted to image processing device 100 from transfer server 102.

What is necessary for image processing device 100 side is only to grasp that the terminal command concerned is to be transmitted to either transfer server 102 or server 103 from image processing device 100.

In the HTTP response sent by transfer server 102, what are described therein are the server command which is an operation request to image processing device 100 from server 103, the response to the transfer server command which is an operation request to image processing device 100 from transfer server 102, and the terminal command to transfer server 102 or server 103 from image processing device 100.

It should be noted that the response is to indicate which terminal command it is addressed, and it is not necessary to enable it not to specify concretely whether it is the response from which transfer server 102 or server 103 related to the response.

When transmitting a delay notice, the delay notice may be indicated instead of the above-mentioned response.

As indicated in this example, the terminal commands A and B can be indicated and transmitted to HTTP request X, and can indicate and transmit the response or delay notice to it to that HTTP request X and corresponding HTTP response X.

However, the server command C and the transfer server command D will be indicated as being reply to HTTP request X and corresponding HTTP response X, and will transmit to them, and the response or delay notice to it will be indicated and transmitted to HTTP request Y which is the following HTTP request.

In the case of FIG. 4A or FIG. 4B mentioned above, image processing device 100 can establish transfer server 102 and a connection, immediately after generating a terminal command, and it can hand them over including this to an HTTP request.

However, in order that firewall 11 installed in the image processing device 100 side may intercept the HTTP request from transfer server 102 in the case of FIG. 4C or FIG. 4D, it cannot access from the transfer server 102 side to image processing device 100 immediately, and a server command cannot be handed over.

Figure 6:
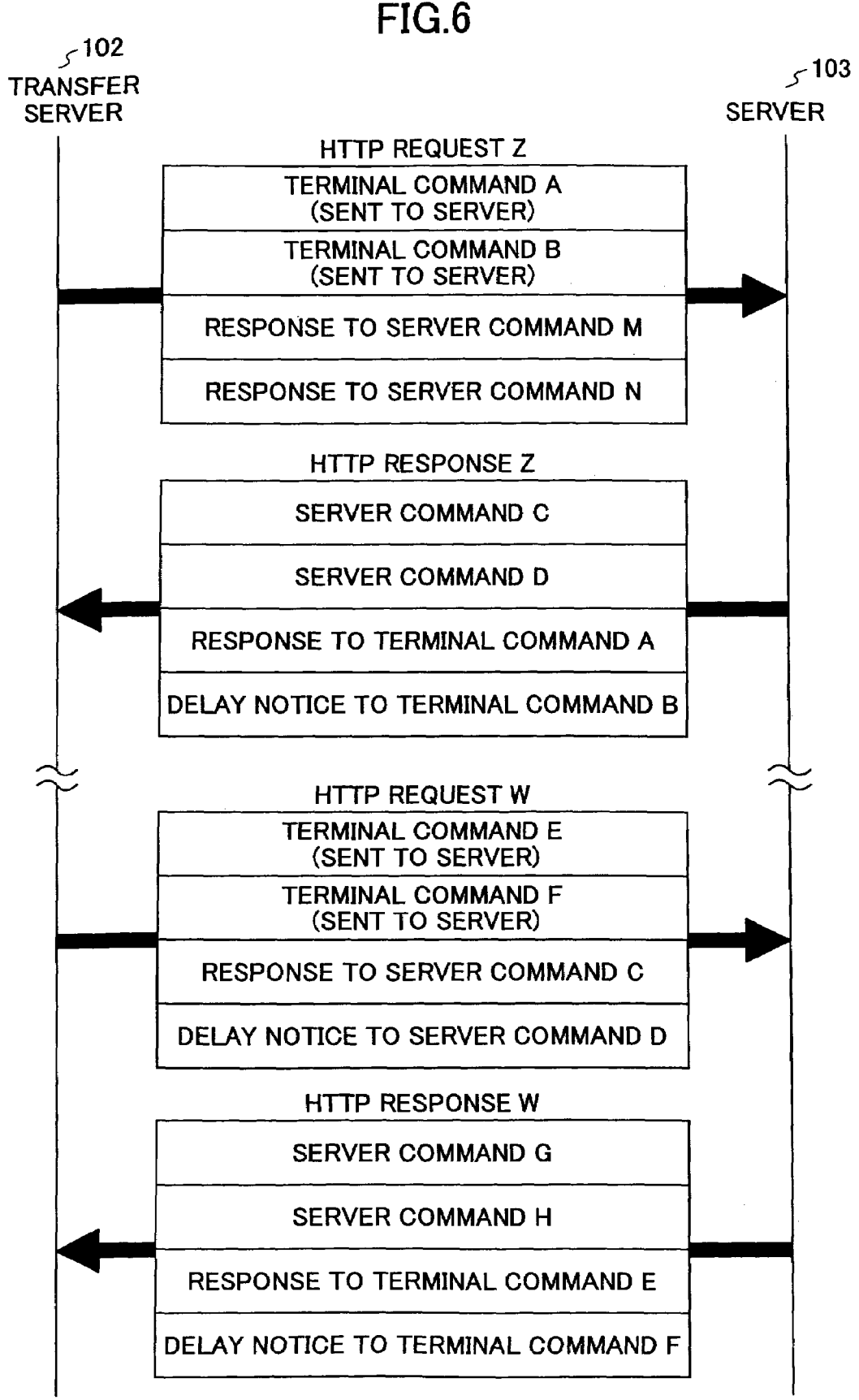
FIG. 6 is a diagram for explaining an example of the communication sequence between the transfer server and the server in the remote management system of FIG. 3.

Next, FIG. 6 shows the example of the communication sequence between the transfer server and the server.

A firewall is not necessarily between transfer server 102 and server 103. However, in order to lose the load which manages the partner which should communicate by the server 103 side, or manages the timing which should require communication, as shown in FIG. 6, the communication transmits an HTTP request to server 103 as the communication request from transfer server 102, and the procedure to this communication request of returning a HTTP response to transfer server 102 as a communication response is always made to perform it from server 103.

For example, it is the condition of server 103 returning HTTP response Z to HTTP request Z which transfer server 102 transmitted, and similarly returning HTTP response W to HTTP request W.

And the inside of that which is the response to the server command which transmitted to the terminal command and picture device 100 which were received from image processing device 100, and received from image processing device 100 to the HTTP request, it indicates that it was determined that should transmit to server 103, and is trying to transmit.

It indicates the response to the server command which is an operation request addressed to image processing device 100 from server 103, and the terminal command transmitted to server 103 for a HTTP response, and is trying to transmit to it.

When transmitting a delay notice, it may replace with the above-mentioned response and a delay notice may be indicated. A terminal command, a transfer server command, a server command, and the response and delay notice to these can be indicated to one respectively arbitrary HTTP request of every several (0 is sufficient), or HTTP response. And the contents indicated to one HTTP request or HTTP response are logically put in block and are transmitted.

By transmitting the different operation request and different operation response of destination and source node collectively, the number of times of a connection required in order to transmit required information can be reduced, an overhead can be reduced, and communication increase in efficiency can be attained.

Figure 7:
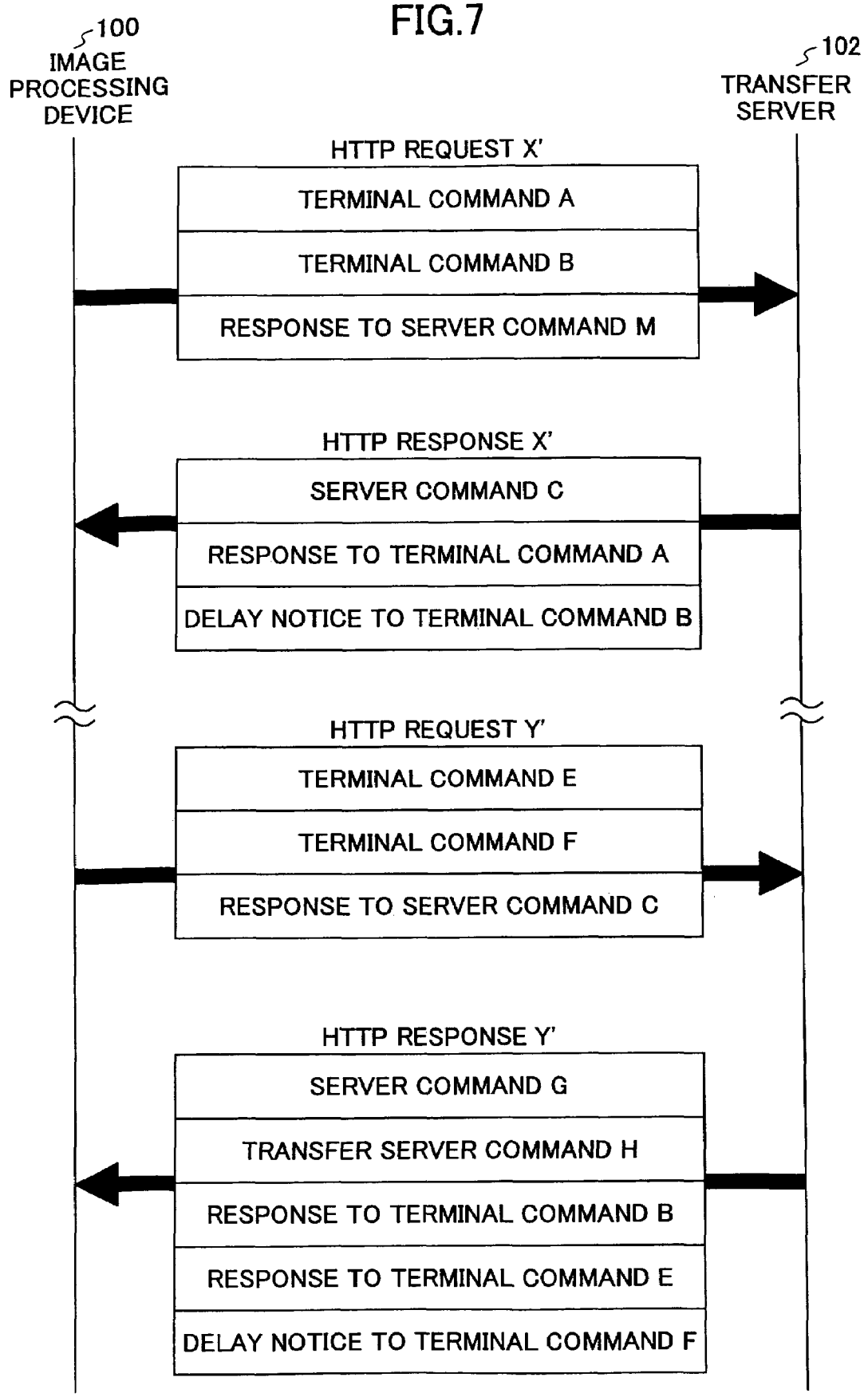
FIG. 7 is a diagram for explaining another example of the communication sequence shown in FIG. 5.

FIG. 7 shows the example of another communication sequence between the image processing device and the transfer server.

Although the very simple example of a sequence is shown in FIG. 5 and FIG. 6 for explanation, the example which is constant is shown in FIG. 7. When a delay notice is transmitted to a command, it is not necessary to return a response at the time of the following transmitter meeting.

For example, it indicates to next HTTP response Y' of HTTP response X' which describes the delay notice like terminal command B shown in FIG. 7, and may be made to return the HTTP response further after not returned and illustrating a response.

Of course, the same may be said of a transfer server command or a server command, and it is not necessary to indicate the response to the command to the next HTTP request of the HTTP request which describes the delay notice. And what is necessary is to indicate to a next HTTP request further and just to transmit.

By the way, each command and each command response are created independently, respectively. Since processing should be presented, in order to perform the above batch transmission between image processing device 100 and transfer server 102 and between transfer server 102 and server 103, the processing which combines these commands and command responses before a transfer, and is separated after a transfer is needed.

Next, the functional composition for performing such processing with the hardware configuration of each device and the procedure of the processing will be explained.

Figure 8:
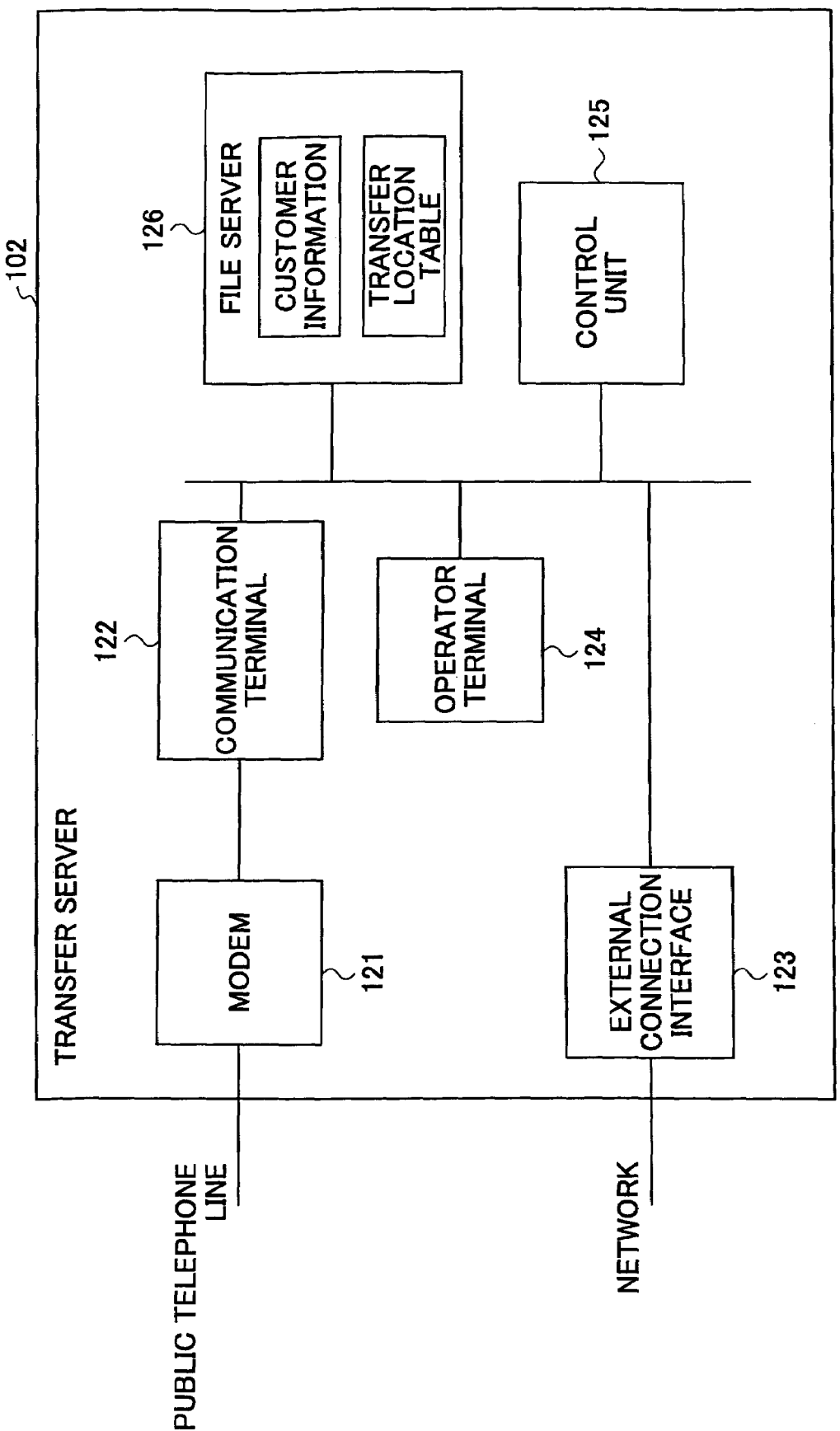
FIG. 8 is a block diagram showing the hardware composition of the transfer server shown in FIG. 3.

In order to simplify explanation, the statement of the processing related to a delay notice is omitted in the following explanation. FIG. 8 shows the hardware composition of the transfer server of the invention. FIG. 8 is a block diagram showing the composition of transfer server 102.

This transfer server 102 comprises modem 121, communication terminal 122, external connection interface 123, operator's terminal 124, control unit 125, and file server 126.

Modem 121 communicates with image processing device 100 by the side of an device user (for example, user point using an image processing device) via the public circuit which is not illustrated, and carries out the strange recovery of the data transmitted and received.

Communication terminal 122 controls communication by modem 121. And the function as unit of communications is achieved with these modems 121 and communication terminals 122.

External connection I/F 123 is an interface for performing communication through the network by Internet 14 or the common carrier leased line. And image processing device 100 by the side of an device user and communication with server 103 are performed. The proxy server for security management etc. may be provided.

Operator's terminal 124 receives the input of various operational data on the input unit, such as a keyboard, by the operator. When communicating with image processing device 100 of each customer environment, there are customer data to be used, such as those IP addresses, telephone numbers (call origination point telephone number), etc., for example.

Control unit 125 is provided with the microcomputer which comprises CPU, ROM, RAM, etc. which are not illustrated. The CPU generally controls the transfer server 102 in accordance with the program, and various processing can be performed by using the respective elements thereof if needed.

File server 126 is provided with a storage, such as a hard disk drive unit which is not illustrated. The IP address and the telephone number of image processing device 100 of each customer environment, data, identification information of the image processing device for maintenance, various data, such as a program concerning the data inputted from operator's terminal 124, the destination table in which each command and the destination of a command response are stored as a database (DB), respectively.

The composition of a control device is not restricted to this embodiment. For example, it can also be constituted using a personal computer (PC).

Figure 9:
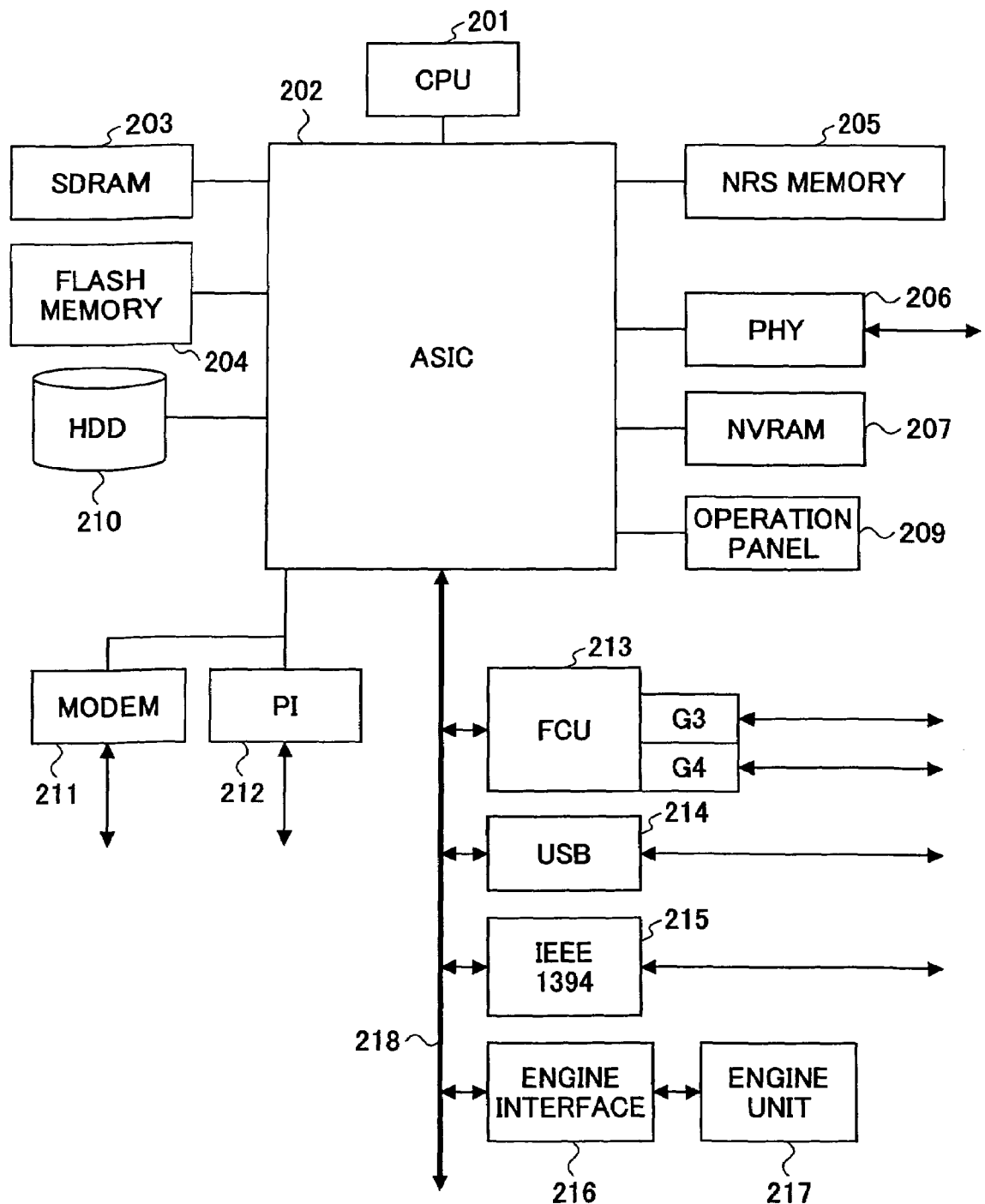
FIG. 9 is a block diagram showing the hardware composition of the image processing device shown in FIG. 3.

Next, FIG. 9 shows the hardware composition of the image processing device of the invention.

Image processing device 100 is constituted as a multifunction peripheral device provided with multiple functions, including a printer function, a facsimile function, a digital copier function, a scanner function, and a document-management function.

As shown in FIG. 9, this image processing device 100 comprises CPU 201, ASIC (application-specific integrated circuit) 202, SDRAM 203, flash memory 204, NRS memory 205, PHY (physical media interface) 206, NVRAM (non-volatile memory) 207, operation panel 209, HDD (hard disk drive) 210, modem 211, PI (personal interface) 212, FCU (facsimile control unit) 213, USB (universal serial bus) 214, IEEE (Institute of Electrical and Electronic Engineers) 1394 interface 215, engine interface 216, and engine unit 217.

These elements are the hardware resources for performing image processing, such as image reading, image formation, and drawing information transmission.

CPU 201 is an arithmetic processing unit which performs data processing (control of each function) via ASIC 202.

ASIC 202 is a multifunctional device which comprises a HDD interface, a CPU interface, a SDRAM interface, a local bus interface, a PCI interface, and a MAC (Media Access Controller), and shares the devices used as the controlled system of CPU 201. ASIC 202 promotes efficient development of an application (application software) or support of common system service from the field of architecture.

Operation panel 209 which receives the operating instructions of each engine unit is directly connected to ASIC 202, and PHY 206 is connected directly to ASIC 202. FCU 213, USB 214, IEEE 1394 interface 215, and engine interface 216 are connected to ASIC 202 via PCI bus 218, and modem 211 and PI 212 are connected directly to ASIC 202, if needed.

And CPU 201 can function as a processing unit to process information by reading a required control program from the storage unit of flash memory 204 or HDD 210 via ASIC 202, and developing and performing in SDRAM 203.

SDRAM 203 is the main memory used as the program memory which stores various programs including OS, work memory used when CPU 201 performs data processing, etc. DRAM and SRAM may be used instead of this SDRAM 203.

The program memory which stores various programs for flash memory 204 to perform the OS image which is a file of a boot loader (boot program) or OS which starts image processing device 100, and processing mentioned later, for example. It is the non-volatile memory (storage unit) used as fixed parameter memory which stores various fixed parameters, and a memory content is held even if a power supply is turned off.

The nonvolatile RAM in which a RAM and the backup circuit using a battery are integrated, or another non-volatile memory, such as EEPROM, may be used instead of flash memory 204.

NRS memory 205 is the non-volatile memory which stores the NRS application mentioned later, and can add a NRS function as an option. PHY 206 is the interface for communicating with an external device via LAN.

NVRAM 207 serves as the model/machine number memory which stores the model/machine number which is the identification information of image processing device 100, the memory which stores the operational initial value by control unit 209, the memory which stores the initial value of each application (APL), the memory, the setting situation of self or a communication partner of memorizing each counter information (data of accounting counter etc.), and the non-volatile memory (storage unit) used as memory which stores model information, including network-address information, a protocol, etc., and the memory content is held even if a power supply is turned off. Non-volatile memory, such as RAM, nonvolatile RAM which accumulated the backup circuit using a battery, EEPROM, a flash memory, can be used as this NVRAM 207.

Operation panel 209 is an operation and display unit in which an operation unit and a display unit are combined. HDD 210 is a storage unit (recording medium) which retains the data regardless of turning on and off of a power supply. In this HDD 210, the program and the other data stored in flash memory 204 mentioned above, or the data stored in NVRAM 207 can be also stored. The data used as the object to which the processing of collection, updating, or transmission is periodically performed may also be stored in this HDD 210.

Modem 211 is a modulation/demodulation unit, and when transmitting data to transfer server 102 via a public telephone network, modem 211 modulates the data in the form which can be passed through the public telephone network. When the modulated data sent from transfer server 102 is received, modem 211 performs demodulation of the modulated data to restore to the original data.

PI 212 is provided with the interface conforming to RS485 specifications, and it is connected to a public telephone network via the line adapter which is not illustrated.

FCU 213 controls communication with external devices including image processing devices having a FAX device or a modem function (FAX communication capabilities), such as a digital copier and a multifunction peripheral device, via a public telephone network.

USB 214 and IEEE 1394 interface 215 are the interfaces of USB specification and IEEE 1394 specification for communicating with a peripheral device, respectively.

Engine interface 216 is the interface for connecting engine part 217 to the PCI bus. Engine unit 217 includes the engine including known scanner engine and plotter engine and provided for image reading and formation, and the post-processing unit which performs the post-processing, such as sorting, punching and staple processing, to the sheet on which the image is formed by the plotter engine.

In the above-described image processing device 100, at the time of powering on, CPU 201 initiates the boot loader of flash memory 204 through ASIC 202, and according to the boot loader, CPU 201 reads the OS image in flash memory 204, loads it to SDRAM 203 and expands it to the usable OS. And the OS will be started if the expansion of OS is completed.

Then, various functions can be provided by reading the NRS application programs in NRS memory 205 or the application programs in flash memory 204, if needed, and the programs are loaded to SDRAM 203 and expanded therein.

Figure 10:
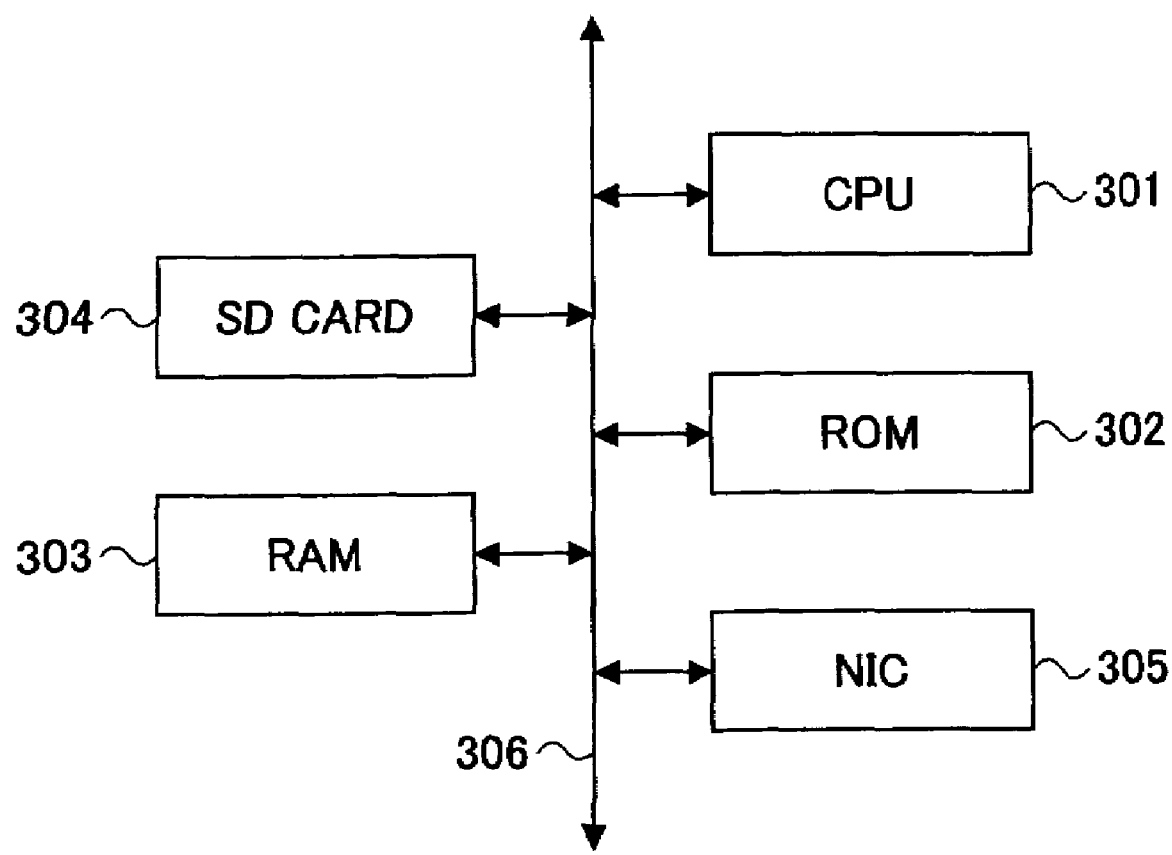
FIG. 10 is a block diagram showing the hardware composition of the server shown in FIG. 3.

Next, FIG. 10 shows the hardware composition of the server. As shown in FIG. 10, each server 103 comprises CPU 301, ROM 302, RAM 303, SD (secure digital) card 304, and network interface card (NIC) 305 which are interconnected by system bus 306.

Specifically, in the server 103, CPU 301 is the control unit which controls the whole server 103 in accordance with the control program stored in ROM 302. And ROM 302 is the read-only memory which stores the various fixed data containing the control program used by CPU 301.

RAM 303 is the memory for temporary storage used as work memory when CPU 301 performs data processing etc. SD card 304 is the non-volatile memory retaining the memory content even if the power supply of server 103 is turned off. NIC 305 is the unit of communications for performing transmission and reception of a communication partner and information via networks including Internet 14. Of course, additional hardware may be added to the basic composition of server 103 if needed.

Figure 3:
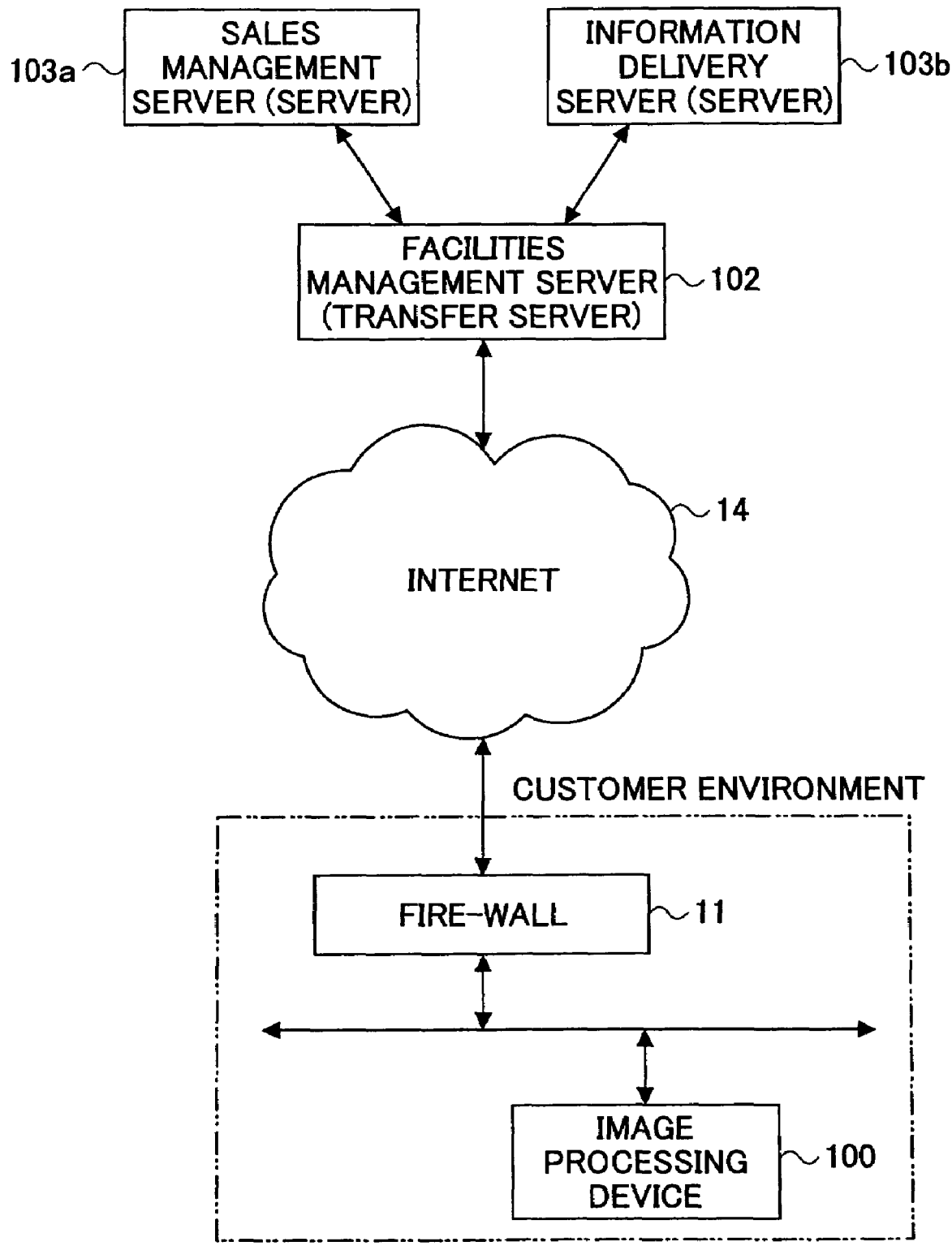
FIG. 3 is a block diagram showing the composition of another embodiment of the distributed processing system of FIG. 1 which is an example of the remote management system.

Next, FIG. 11 shows the composition of the functions for performing the command and command response related processes among the functions of transfer server 102 of FIG. 3.

Among the functions shown in FIG. 11, the terminal command pool 41, the transfer server command pool 42, the transfer message pool 51 for transmission, and the transfer message pool 52 for reception are provided in any rewritable storage unit. For example, they can be provided in flash memory of control unit 125, SDRAM or HDD. Alternatively, it may be provided in file server 126.

The functions of terminal command execution result creation unit 43, transfer server command creation unit 44, message collection unit 45, message distribution unit 47, and message transfer unit 48 are realized by the CPU of control unit 125.

The functions of HTTP server function module 46 and HTTP client function module 49 is realized by the CPU of control unit 125 and external connection I/F 123. The function of destination information storage unit 50 is realized by the nonvolatile storage unit like the flash memory of control unit 125 or HDD.

These functions will be explained in greater detail. Terminal command pool 41 is the pool where the terminal commands, which are determined as being performed by transfer server 102 itself among the terminal commands received from image processing device 100, are associated with the responses to the commands, the identification information of the commands, the information of the command originating node, etc., and such terminal commands are registered.

Transfer server command pool 42 is the pool where the transfer server commands are associated with the responses to the commands, the identification information of the commands, the information of the command destination node, etc., and such transfer server commands are registered.

In these pools, a command sheet in the form of a table is created for every command, and such information is stored so that each command, the identification information and the information including its response, etc., are associated.

The terminal command execution result creation unit 43 corresponds to a response creation unit. And it has terminal command handler 43a which is the application which reads and executes a terminal command from terminal command pool 41.

This terminal command handler 43a creates the response to a terminal command, and it has a function which relates with command ID of a terminal command, and is registered into terminal command pool 41.

The terminal command received from image processing device 100 is related with the management information for managing ID which identifies this command, and this command etc., and is registered into terminal command pool 41 as a terminal command sheet of table format.

And when also registering into terminal command pool 41 the command response which terminal command execution result creation unit 43 created, it is registered into the terminal command sheet related to the executed terminal command.

The terminal command of two or more kinds is read to terminal command handler 43a from terminal command pool 41, and it is possible to provide the function which creates the response to each terminal command.

When it includes the information on the dispatching priority for a terminal command having priority over transfer server 102, and performing processing, providing the function which reads from the high thing of priority preferentially and is performed is also considered.

The terminal command handler 43a may be a module which calls not the application itself but application required for execution of a terminal command, and performs a command.

FIG. 12 shows the example of the data structure in the terminal command sheet of transfer server 102.

As shown in FIG. 12, in transfer server 102, the area that stores the data of "command ID", "transmission source information", "method name", "input parameter", "state", "output parameter", and "notification node of command" is provided in the terminal command sheet.

And among these, "command ID", "method name", and "input parameter" correspond to a terminal command (and ID attached thereto), and "state" and "notification node of command" correspond to management information. The "output parameter" is an execution result of a transfer server command, and serves as the contents of the command response which is returned by transfer server 102.

The contents of each data item will be explained. The "method name" is the contents of the request to transfer server 102, and indicates the kind of the function which is called by transfer server 102. The "input parameter" is the data which is accompanied with "method name" and is an argument when calling the function. The "transmission source information" indicates the identification information of the device at the node where the command is created. In the case of a terminal command, the identification information of image processing device 100 is registered to this data.

This information is changed into the information which indicates the destination when transmitting the response to the command. Since transfer server 102 itself executes all the terminal commands that are stored in terminal command pool 41, they do not need to manage the destination of the command.

The "command ID" is the identification information which identifies the terminal command. The "state" is the data which indicates the state of processing of the terminal command, and is changed with advance of the processing in a manner of "un-processed"->"processing completion"->"response completion" or in a manner of "un-processed"->"during process"->"processing completion"->"response completion".

The response created by terminal command execution result creation unit 43 is stored in the "output parameter". It is empty until execution of a terminal command is completed and the above-mentioned "state" is changed to "processing completion".

The "notification node of command" is the reference information which indicates the module which executes the terminal command.

Referring back to FIG. 11, transfer server command creation unit 44 corresponds to a request creation unit, and creates a transfer server command and the identification information (ID) which identifies this command is assigned thereto.

The management information for managing the destination information of this command and this command is attached, and it has a function which associates these information and is registered into transfer server command pool 42 as a transfer server command sheet of table format. Transfer server command creation handler 44a performs this processing.

Among these, the application program provided in transfer server 102 corresponds to the portion which creates a transfer server command. The function which gives the priority at the time of making image processing device 100 execute each command to the created transfer server command may be provided in transfer server command creation handler 44a.

FIG. 13 shows the example of the data structure in the transfer server command sheet of transfer server 102.

As shown in FIG. 13, in transfer server 102, the area which stores the data of "command ID", "destination information", "method name", "input parameter", "state", "notification node of command execution result", and "output parameter" is provided in the transfer server command sheet.

Among these, "command ID", "method name", and "input parameter" correspond to a transfer server command (and ID attached thereto), and "state" and "notification node of command execution result" correspond to management information.

The "output parameters" is the contents of the command response received from image processing device 100 used as the destination of the command.

The contents of each data item will be explained. The "method names" is the contents of the request to image processing device 100, and indicates the kind of the function called by image processing device 100. The "input parameter" is the data which is accompanied with the "method name", and is an argument at the time of calling a function.

The "destination information" indicates the identification information of the device of the object which performs the command, i.e., the device used as the destination of the command. In the case of a transfer server command, the identification information of image processing device 100 is registered to this. The ID, a proper name, an IP address, etc. can be used as the identification information.

Since transfer server 102 itself always creates a transfer server command, it does not need to manage the transmission source information of the command. The "command ID" is the identification information for identifying a transfer server command.

The "state" is the data which indicates the advancing state of the processing of the terminal command and is changed with the advance of the processing as in a manner of "untransmitted"->"awaiting response"->"response reception completion".

The "notification node of command execution result" is the reference information which shows the module which notifies that and performs required processing, when the response to the transfer server command indicated on the sheet is received.

Although the module to refer to is the handler which registered the transfer server command in many cases, it does not necessarily need to be so.

The contents in the stage which receives the command response are stored in the "output parameter". It is empty until it receives the command response from image processing device 100.

Referring back to FIG. 11, message collection unit 45 corresponds to a collection unit, and associates command ID and transmission source information of the terminal command corresponding to the command response which terminal command execution result creation unit 43 created, and this command response, and read from terminal command pool 41, and associates command ID and destination information of the transfer server command which transfer server command creation unit 44 created, and this command, and it reads from transfer server command pool 42.

The message for a transfer indicated on the message sheet for a transfer of transfer message pool 52 for reception explained in full detail behind is read, and it has a function which creates an outgoing message from these.

When priority is specified as the message for a command response, or a terminal command or a transfer, it is possible to cause message collection unit 45 to read sequentially from the items of higher priority, respectively.

In this embodiment, an outgoing message is described by XML (extensible markup language) which is a structured language, and the outgoing message indicates the above-mentioned command response or command and command ID as a SOAP message. And message collection unit 45 creates one SOAP message as an outgoing message related to one command response or command. At this time, the command ID of each command is described in the SOAP header, and the contents of a command response or command are described in the SOAP body.

In communications using the SOAP, the message called SOAP envelope (envelope) which comprises the SOAP header and the SOAP body is described by XML, and such message is exchanged by the HTTP protocol.

Creation of such SOAP message from the command response or command is realized by executing the conversion program (serializer) created based on WSDL (web service description language) so that the data is serialized. The message for a transfer is stored in the state of the SOAP envelope described by XML, and the message stored can be used as the outgoing message without change.

HTTP server function module 46 is provided with HTTP response transmitter unit 46a which transmits a HTTP response, and HTTP request receiver unit 46b which receives an HTTP request.

And HTTP response transmitter unit 46a corresponds to the second transmitter unit. HTTP response transmitter unit 46a has the functions that creates the HTTP response containing the outgoing message created by message collection unit 45, and transmits the HTTP response to image processing device 100. In this respect, two or more outgoing messages may be contained in one HTTP response, and the outgoing message related to a command response, the outgoing message related to a transfer server command, and the outgoing message related to a transfer message may also be made arbitrarily intermingled. Of course, the outgoing message related to a transfer message created by a different server may be made intermingled.

Regardless of the types of the outgoing messages, HTTP response transmitter unit 46a creates one HTTP response containing all the outgoing messages created by message collection unit 45, and transmits the HTTP response to image processing device 100.

However, providing a maximum number of outgoing messages that can be contained in one HTTP response is also considered.

By the way, the transmission of an HTTP response is always performed even when message collection unit 45 tries to read out a transfer server command, a transfer server command response or a transfer message, etc., but there is no data read, and consequently does not create any SOAP message which should be transmitted to image processing device 100.

And the trial of this read-out is always performed when HTTP request receiver unit 46b receives the HTTP request from image processing device 100. This is because transfer server 102 is unable to transmit an HTTP request to image processing device 100 through firewall 11 as mentioned above.

HTTP request receiver unit 46b corresponds to the first receiver unit, and has the function that receives an HTTP request from image processing device 100. And, in the HTTP request received by HTTP request receiver unit 46b, the received message which contains a terminal command and a command ID related with the command, and the received message which contains a transfer server command or a response to a server command and a command ID related with the command or response are intermingled arbitrarily.

The received messages indicate the above-mentioned command, response, command ID, etc. as SOAP messages. And whether it is the message addressed to transfer server 102 or the message which should be transmitted to server 103 is not detected at the time of reception, and it is not necessary to include the information on the destination for this purpose in the HTTP request.

Message distribution unit 47 has the function to distribute and register the data contained in the HTTP request received by HTTP request receiver unit 46b into appropriate one of terminal command pool 41, transfer server command pool 42, and transfer message pool 51 for transmission.

Specifically, the destination table stored to destination information storage unit 50 is retrieved, and message distribution unit 47 functions as a destination determination unit, and determines the destination of each data item according to the classification of the received command or received command response, so that the pool where the data item is to be registered is determined based on the result of determination.

The destination table defines correspondence between destinations of the commands or command responses and classifications (groups) of the commands or command responses. And the information on the destination to which the command and command response should be transmitted can be acquired by using the command or command response of concern as a key and searching the destination table.

And if the destination of the received command (terminal command) is transfer server 102 itself, a terminal command sheet is formed in terminal command pool 41, and the terminal command and the command ID related with the command are registered to the terminal command sheet.

And if the destination of the received command response is transfer server 102 itself, that response is a response to a transfer server command. The command ID of that command response is matched with the command ID in the transfer server command sheet stored in transfer server command pool 42, and the transfer server command with the command ID being matched is specified, and it is registered to the "output parameter" related to the transfer server command.

Although each received message which divides an HTTP request and is contained there at this time is taken out and that data is changed into a form required for the registration to a table, this conversion can be performed by executing the necessary conversion program (de-serializer) created based on WSDL.

On the other hand, in order to transmit the message concerning the command and command response except transfer server 102 itself to other device related to the command and command response which are the destination, it registers with transfer message pool 51 for transmission.

And in performing registration to transfer message pool 51 for transmission, it creates and registers a transfer message sheet.

FIG. 14 shows the example of the data structure of a transfer message sheet.

As shown in FIG. 14, the area which stores "destination information", "entity header information", and "the XML data of a message" is established in the transfer message-commands sheet of transfer message pool 51 for transmission.

Among these, the information on the destination determined according to the classification of the command which message distribution unit 47 received, or a command response is registered into "destination information".

The information on a part's entity header (it mentions later for details) that the message was indicated is registered into "entity header information", and the contents of the SOAP envelope concerning a message are registered into "the XML data of a message".

Since it is not based on the contents of the message but what is necessary is just to transmit as it is related to the transfer message, it is not necessary to change the data format of a SOAP envelope.

When message distribution unit 47 registers a message into transfer message pool 51 for transmission, with reference to the information on the source node of the HTTP request the message was indicated to be, it creates the header which describes the information on the source node of a message, and is trying to add to entity header information.

Referring back to FIG. 11, message transfer unit 48 has the function to register into transfer message pool 52 for reception the message which read the transfer message registered into transfer message pool 51 for transmission, and created the outgoing message, and HTTP response receiver unit 49*b* of HTTP client function module 49 received.

First, related to generation of an outgoing message, the transfer message which should transmit to the destination is read for every destination. And since the message is registered into the transfer message sheet in the state of the SOAP envelope indicated by XML at this time, it can be used as a message for a transfer as it is.

The part for transmission which gave the entity header registered into the "entity header information" of the same sheet to the SOAP message, and indicated the message is created.

The transfer message sheet for registering the message which received related to the registration to transfer message pool 52 for reception is created and registered. However, the form of this sheet differs from the case of transfer message pool 51 for transmission a little.

FIG. 15 shows the example of the data structure of the transfer message sheet in transfer message pool 52 for reception.

As shown in FIG. 15, the area which stores the data of "entity header information" and "XML data of message" is provided in the transfer message sheet of transfer message pool 52 for reception.

Among these, the information on a part's entity header (it mentions later for details) that the message was indicated is registered into "entity header information", and the contents of the SOAP envelope concerning a message are registered into "the XML data of a message".

The point that it is not necessary to change the data format of a SOAP envelope is the same as that of the case of transfer message pool 51 for transmission.

In the case of transfer message pool 52 for reception, there is no item of "destination information", but this is because it is trying to indicate the information on the transfer path of a message to an entity header.

If it returns to explanation of FIG. 11 again, HTTP client function module 49 will be provided with HTTP request transmitter unit 49*a* which transmits an HTTP request, and HTTP response receiver unit 49*b* which receives a HTTP response.

And HTTP request transmitter unit 49*a* corresponds to the first transmitter unit, creates the HTTP request which describes the outgoing message which message transfer unit 48 created, and has a function which transmits to server 103.

An outgoing message may be included in one HTTP request how many, and the outgoing message concerning a command response and the outgoing message concerning a picture device command can also be made arbitrarily intermingled at this time.

First of all, when transmitting a message, if even the destination can be recognized, it is not necessary to recognize the contents of the message.

And the outgoing message concerning a command, or a different command response or different transfer message of a transmitting agency may be made intermingled.

Then, there is no HTTP request transmitter unit 49*a*, and it includes all the outgoing messages which message transfer unit 48 created related to the one destination in one HTTP request, and it is trying to be concerned for these any being an outgoing message concerning, and to transmit.

However, providing a maximum in the number of outgoing messages included in one HTTP request is also considered.

Transmission of this HTTP request does not have the data read when read-out of the transfer message was tried related to the destination with message transfer unit 48, and also when the SOAP message which should transmit as a result is not created, it is performed.

And the trial of this read-out shall be performed periodically. For example, it is possible to read every 60 minutes by a timer. It does in this way because it is preventing from transmitting unless communication is required from transfer server 102, even if there is information to transmit to transfer server 102 from server 103 as mentioned above.

By giving an opportunity to transmit the communication request to each server 103 periodically, and transmit information to transfer server 102 from each server 103, even if there is no data which nothing transmits from transfer server 102, it can prevent that the required information on a transfer continues at a long period of time, and stagnates in server 103. Of course, read-out by message transfer unit 48 and transmission of the HTTP request by HTTP request transmitter unit 49*a* following it may be suitably performed in addition to periodical timing.

For example, when information immediately to be transmitted is registered into transfer message pool 51 for transmission, it may be made for message distribution unit 47 to make it read to message transfer unit 48 by notifying that.

HTTP response receiver unit 49*b* corresponds to the second receiver unit, and has the function to receive a HTTP response from server 103. And the received message which contains in a HTTP response command ID related with a server command and its command, the response to a terminal command and its command, and the received message containing associated command ID are intermingled arbitrarily, and are contained.

The above-mentioned command, response, command ID, etc. are indicated to be received messages as a SOAP message. And since these are the messages which should be transmitted to image processing device 100, it will be registered to transfer message pool 52 for reception by message transfer unit 48 as mentioned above, will be read by message collection unit 45 to suitable timing, and will be transmitted to image processing device 100 by HTTP response transmitter unit 46*a*.

When registering with transfer message pool 52 for reception, it is not necessary to change correspondence by where the destination of a message is.

When message collection unit 45 reads a message from transfer message pool 52 for reception and creates an outgoing message, after deleting the information on the transmission destination which is going to transmit a message after this among the information on the transfer path indicated to "entity header information", it is trying to create the portion of an entity header.

Next, FIG. 16 shows the example of the HTTP request which transfer server 102 which has such a function receives from image processing device 100 is shown in FIG. 16.

As this HTTP request is shown in FIG. 16, the message of the multi-part which followed MIME (Multipurpose Internet Mail Extension) as a body part is indicated.

The SOAP envelope is embedded, although an entity header is indicated by each of this part, respectively, and a detailed illustration thereof will be omitted.

Although each element classified by "MIME boundary" constitutes the first independent part, the second part, the 3rd part, and the 4th part from an example of FIG. 16 on the HTTP body of an HTTP request, the number of parts which can be included in the HTTP body is not restricted to four. It is good without limit including zero piece.

What indicated the terminal command, the thing which describes the response to a transfer server command, and the thing which describes the response to a server command are among the SOAP envelopes which are embedded at an HTTP request and handed over.

The example of the HTTP response which transfer server 102 which has such a function transmits to image processing device 100 is shown in FIG. 17. As shown in FIG. 17, only that the HTTP request and HTTP header for explaining this HTTP response in FIG. 16 as a form differ from each other, and a detailed illustration thereof will be omitted like the case of an HTTP request to the body part.

The SOAP envelope of the multi-part according to MIME is indicated. The contents of the SOAP envelope differ according to a command or the contents of the command response.

What indicated the transfer server command, the thing which describes the server command, and the thing which describes the response to a terminal command are among the SOAP envelopes which are embedded at a HTTP response and handed over.

Next, FIG. 18 shows the example of the HTTP request which transfer server 102 transmits to server 103.

As shown in FIG. 18, this HTTP request is the same as that of the HTTP request shown in FIG. 16. However, naturally related to the contents of the SOAP envelope, it differs according to a command or the contents of the command response.

And what indicated the terminal command, and the thing which describes the response to a server command are among the SOAP envelopes which are embedded at this HTTP request and handed over.

The information which shows the source node of the SOAP message indicated by the part as the "X-Received-From" header is added to each part's entity header by message distribution unit 47 of transfer server 102.

And server 103 can define the transfer path of the response to a terminal command, or a server command based on this information.

FIG. 19 shows the example of the HTTP response which transfer server 102 receives from server 103.

As shown in FIG. 19, this HTTP response is the same as the HTTP response shown in FIG. 18. However, naturally related to the contents of the SOAP envelope, it differs according to a command or the contents of the command response.

And what indicated the server command, and the thing which describes the response to a terminal command are among the SOAP envelopes which are embedded at this HTTP response and handed over.

The information which shows the transfer path and the destination of a SOAP message which were indicated by the part as a X-Send-To header is added to each part's entity header.

And message collection unit 45 of transfer server 102 can recognize the destination of a message based on this information.

The above HTTP requests and HTTP responses of form are one message which can be transmitted, and without changing form, more than one can join together and they can create each part's SOAP envelope.

Among other communication devices provided with the usual web service (SOAP RPC) function when dividing the HTTP request and HTTP response of such a form and taking out each part's SOAP envelope, it can also be used for the communication which describes one SOAP envelope to the HTTP request or the HTTP response as it is.

In the message delivered and received between image processing device 100 and transfer server 102 as shown in FIG. 16 and FIG. 17, it is not necessary to indicate the destination and the transfer path of a SOAP message.

Next, some examples of the part indicated in the HTTP requests or HTTP response will be explained using FIG. 20 through FIG. 31.

FIG. 20 shows the example of the part which describes the terminal command to transfer server (the facilities management server) 102.

In this example, the information which first shows whether the SOAP message indicated by this part at the "X-SOAP-Type" header of the portion of an entity header is a SOAP request or it is a SOAP response is indicated.

This example shows that it is a SOAP request, i.e., it is the SOAP message which describes the command, by "Request" of the value.

The "SOAP Action" header shows the contents of the SOAP request and shows the contents of the request by the URI (uniform resource identifier) "http://www.--" in this example.

When a SOAP message is the "SOAP Action" header a SOAP response, in the receiving side of a message, it can also be determined by the existence of this header whether a SOAP message is a SOAP request or it is a SOAP response.

And the name space is declared as an attribute of the "Envelope" tag. And besides the name space defined by SOAP as a standard, the name space is specified by URI of "http://www.example.com/header" and "http://www.example.com/maintenance/server" is declared. Therefore, it is found out that it is a tag belonging to the name space specified by URI of "http://www.example.com/header" related to the XML tag to which the name-space prefix of "n" was given.

Related to the XML tag to which the name-space prefix of "ns" was given, it turns out that it is a tag belonging to the name space specified by URI of "http://www.example.com/maintenance/server".

To the SOAP header, "12345" which is ID of this terminal command is indicated as contents of the XML tag of "demand ID". As information which specifies the method called in transfer server 102 as the SOAP body, directly under the "Body" tag, an "error message" tag is indicated (it corresponds to "method name" and the classification of a command is shown), and the argument at the time of calling the method is indicated as the tag "error ID" of the low rank, and an element of "explanation" (it corresponds to "input parameter").

The notice content of the error message is indicated. Message distribution unit 47 of transfer server 102 recognizes that the command indicated by this part is what should be performed by transfer server 102 according to the kind of command.

Therefore, the destination or the destination of a command are not indicated to this part, and it is not necessary to recognize with which device finally this command is executed by the image processing device 100 side.

The example of the part which describes the response to the terminal command shown in FIG. 20 is shown in FIG. 21.

By indicating the value of the "X-SOAP-Type" header of the portion of an entity header to be "response" in this example is shown that the SOAP message indicated by this part is a SOAP response, i.e., it is the SOAP message which describes the command response.

Also in this example, declaration of a name space is the same as that of the example shown in FIG. 20. And "12345" which is ID of the terminal command which created the response as contents of the XML tag of "command ID" is described by the SOAP header.

The "error message response" tag (the classification of a command response is shown) for that it is the response to "error message" command to be shown in the SOAP body directly under the "Body" tag is provided, and the contents of the command response are indicated to the tag of the low rank.

The information on the purport that the error message was received normally is indicated. And this information is stored in the item of the "output parameter" of the terminal command sheet in image processing device 100.

Since it is not necessary to make it recognize whether a command response is created by which device at the image processing device 100 side, to this part, the source node of a command response has not indicated this distributed processing system.

The written example of the part at the time of transmitting the terminal command to server (sales management server) 103a to transfer server 102 from image processing device 100 is shown in FIG. 22.

Also in this example, like the case of FIG. 20, with "Request" of the value of the "X-SOAP-Type" header is shown that the SOAP envelope indicated by this part is a SOAP request, and the information on the "SOAP Action" header shows the contents of the SOAP request.

The point of declaring the name space is the same as that of the case of FIG. 20 as an attribute of the "Envelope" tag. And besides the name space defined by SOAP as a standard here, the name space specified by URI of "http://www.example.com/header" and "http://www.example.com/sales/server" is declared.

In the SOAP header, "12346" which is ID of this picture device command is indicated as contents of the XML tag of "demand ID". As information which specifies the method called directly under the "Body" tag in server 103a as the SOAP body, "form order" tag is indicated and the argument at the time of calling the method is indicated as the tag "product name" of the low rank, and an element of "quantity". The order content of the form is indicated.

Message distribution unit 47 of transfer server 102 recognizes that the command indicated by this part is what should be transmitted to server 103a according to the kind of command.

Therefore, the destination or the destination of a command are not indicated to this part, either, and it is not necessary to recognize with which device finally this command is executed by the image processing device 100 side.

The written example of the part at the time of transmitting the command shown in FIG. 22 to server 103a from transfer server 102 is shown in FIG. 23.

Since this part is a thing at the time of transmitting the same command as what was shown in FIG. 22 to server 103a, the almost same contents as the part for explaining in FIG. 22 are indicated.

However, the "X-Received-From" header is added to the entity header section, and the information which shows that the command indicated by this part has been transmitted from "Client_" (it is considered as image processing device 100) is indicated.

And after a command is executed, this information is used in order to specify the transfer path at the time of returning a command response.

Although the identification information of image processing device 100 which is the source node of a command is indicated, when a command covers two or more device and has been transmitted to it, the "X-Received-From" header is added one by one for every transfer, it sees to the highest rung from the device which is the source node of a command, and the device which created the part to the bottom, and the identification information of the device which is the latest source is indicated.

The destination of a command does not need to indicate to a part. It is only recognizing the destination which transmits a command to a degree, and transfer server 102 is because to which device it is finally transmitted does not need to recognize.

The written example of the part at the time of transmitting the response to the terminal command to server 103a to transfer server 102 from server 103a is shown in FIG. 24.

Also in this example, by indicating the value of the "X-SOAP-Type" header of the portion of an entity header to be "response" shows that the SOAP message indicated by this part is a SOAP response like the case of FIG. 21.

The transfer path at the time of transmitting a command response previously from transfer server 102 is indicated to the "X-Send-To" header.

Although the identification information of image processing device 100 which serves as the final destination here is indicated, when a transfer path covers two or more device, the identification information of the device which provides two or more "X-Send-To" headers, and serves as a path is indicated one by one, and the identification information of the device which becomes the bottom with the next destination, and the device used as the destination final to the highest rung is indicated.

Also in this example, declaration of a name space is the same as that of the example shown in FIG. 22.

And to the SOAP header, "12346" which is ID of the terminal command which created the response as contents of the XML tag of "command ID" is indicated.

The "form order response" tag for that it is the response to the "form order" command to be shown in the SOAP body directly under the "Body" tag is provided, and the contents of the command response are indicated to the tag of the low rank.

The information on the purport that the form order was received normally, and the information which notifies a charge are indicated.

Since it is not necessary to make it recognize whether a command response is created by which device at the transfer server 102 side, to this part, the source node of a command response has not indicated this distributed processing system.

The written example of the part at the time of transmitting the command response shown in FIG. 24 from transfer server 102 to image processing device 100 is shown in FIG. 25.

Since this part is a thing at the time of transmitting the same command response as what was shown in FIG. 24 to image processing device 100, the almost same contents as the part for explaining in FIG. 24 are indicated.

However, since the information on the transfer path of the purport that it should transmit to image processing device 100 is unnecessary any longer, the "X-Send-To" header of the entity header section has deleted.

The example of the part which describes the transfer server command to an image processing device is shown in FIG. 26.

Also in this example, like the case of FIG. 20, with "Request" of the value of the "X-SOAP-Type" header is shown that the SOAP envelope indicated by this part is a SOAP request, and the information on the "SOAP Action" header shows the contents of the SOAP request.

Since a command can be directly transmitted to image processing device 100 from transfer server 102, the "X-Send-To" header which shows the information on a transfer path has not indicated.

The point of declaring the name space is the same as that of the case of FIG. 20 as an attribute of the "Envelope" tag. And besides the name space defined by SOAP as a standard, the name space specified by URI of "http://www.example.com/header" and "http://www.example.com/maintenance/client" is declared.

In the SOAP header, "98765" which is ID of this transfer server command is indicated as contents of the XML tag of "demand ID".

And as information which specifies the method called directly under the "Body" tag in an image processing device as the SOAP body, "temperature sensor value acquisition" tag is indicated and the argument at the time of calling the method is indicated as an element of the tag "sensor ID" of the low rank.

The ID of the sensor which acquires a sensor value is indicated. In the image processing device 100 side, since it enables it to recognize that the command response to the received command should just transmit to transfer server 102 for the time being, the information on the source node of a command has not been indicated to a part.

The example of the part which describes the response to the transfer server command shown in FIG. 26 is shown in FIG. 27.

Also in this example, by indicating the value of the "X-SOAP-Type" header of the portion of an entity header to be "response" shows that the SOAP message indicated by this part is a SOAP response like the case of FIG. 21.

Also in this example, declaration of a name space is the same as that of the example shown in FIG. 26.

And to the SOAP header, "98765" which is ID of the transfer server command which created the response as contents of the XML tag of "command ID" is indicated.

The "temperature sensor value acquisition Response" tag for that it is the response to "temperature sensor value acquisition" command to be shown in the SOAP body directly under the "Body" tag is provided, and the contents of the command response are indicated to the tag of the low rank.

The information on the temperature value which the sensor of which value acquisition was required shows is indicated. The command response indicated by this part is against a transfer server command, and that transfer server 102 is a thing used as the destination recognizes according to the classification of a command response of message distribution unit 47 of transfer server 102.

Therefore, it is not necessary to indicate the destination and the destination of the command response also to this part, and to recognize to which device finally this command response is transmitted by the image processing device 100 side.

The written example of the part at the time of transmitting the server command to an image processing device to transfer server 102 from server 103a is shown in FIG. 28.

Also in this example, like the case of FIG. 20, with "request" of the value of the "X-SOAP-Type" header, it is shown that the SOAP envelope indicated by this part is a SOAP request, and the information on the "SOAP Action" header shows the contents of the SOAP request.

By server 103a, the transfer path at the time of enabling it to recognize the transfer path and the destination of a command, and transmitting a command previously from transfer server 102 is indicated to the "X-Send-To" header like the case of FIG. 24.

The point of declaring the name space is the same as that of the case of FIG. 20 as an attribute of the "Envelope" tag.

And besides the name space defined by SOAP as a standard, the name space specified by URI of "http://www.example.com/header" and "http://www.example.com/sales/client" is declared.

In the SOAP header, "77777" which is ID of this server command is indicated as contents of the XML tag of "demand ID".

As information which specifies the method called directly under the "Body" tag in image processing device 100 as the SOAP body, "notice of product preview" tag is indicated and the argument at the time of calling the method is indicated as the tag "product name" of the low rank, and an element of "unit price".

The product name and unit price of the new product are indicated. Even if a command is not known in what has been transmitted from where so that it may mention later, since transfer server 102 can transmit a command response to the suitable destination, it has not indicated the information on the source node of a command to a part.

The written example of the part at the time of transmitting the server command shown in FIG. 28 from transfer server 102 to image processing device 100 is shown in FIG. 29.

Since this part is created at the time of transmitting the same server command as what was shown in FIG. 28 to image processing device 100, the almost same contents as the part for explaining in FIG. 28 are indicated.

However, since the information on the transfer path of the purport that it should transmit to image processing device 100 is unnecessary any longer, the "X-Send-To" header of the entity header section has deleted.

It is recognized that the command response to the received command should just transmit to transfer server 102 for the time being in the image processing device 100 side, and since where a command response is transmitted after that does not need to recognize, the information on the source node of a command has not been indicated to a part.

The written example of the part at the time of transmitting the response to the server command shown in FIG. 28 to transfer server 102 from image processing device 100 is shown in FIG. 30.

Also in this example, by indicating the value of the "X-SOAP-Type" header of the portion of an entity header to be "response" shows that the SOAP message indicated by this part is a SOAP response like the case of FIG. 21.

Also in this example, declaration of a name space is the same as that of the example shown in FIG. 28.

And to the SOAP header, "77777" which is ID of the server command which created the response as contents of the XML tag of "command ID" is indicated.

The "notice response of product preview" tag for that it is the response to "notice of product preview" command to be shown in the SOAP body directly under the "Body" tag is provided, and the contents of the command response are indicated to the tag of the low rank.

The information on the purport that the notice was received normally is indicated. That the command response indicated by this part is what is against a server command and should be transmitted to server 103a recognizes according to the classification of a command response of message distribution unit 47 of transfer server 102.

Therefore, it is not necessary to indicate the destination and the destination of the command response also to this part, and to recognize to which device finally this command response is transmitted by the image processing device 100 side.

Transfer server 102 does not need to recognize to which device finally this command response is transmitted, either.

The written example of the part at the time of transmitting the command response shown in FIG. 30 to server 103a from transfer server 102 is shown in FIG. 31.

Since this part is a thing at the time of transmitting the same command response as what was shown in FIG. 30 to server 103a, the almost same contents as the part for explaining in FIG. 30 are indicated.

Although the "X-Received-From" header is added to the entity header section like the case of FIG. 23, since I do not need to have the response to a command response returned, this statement is not indispensable. Related to the point of not indicating the destination of the command response to a part, it is the same as that of the case of FIG. 23.

Next, the processing performed in transfer server 102 which has the composition and the function in which it explained above will be explained using the flowcharts of FIG. 32 through FIG. 41.

Processing shown in these flowcharts is performed when CPU (this CPU shall be pointed out especially in explanation of FIG. 32 through FIG. 41 when it is only called "CPU" unless it refuses) of control unit 125 executes a necessary control program.

Figure 32:
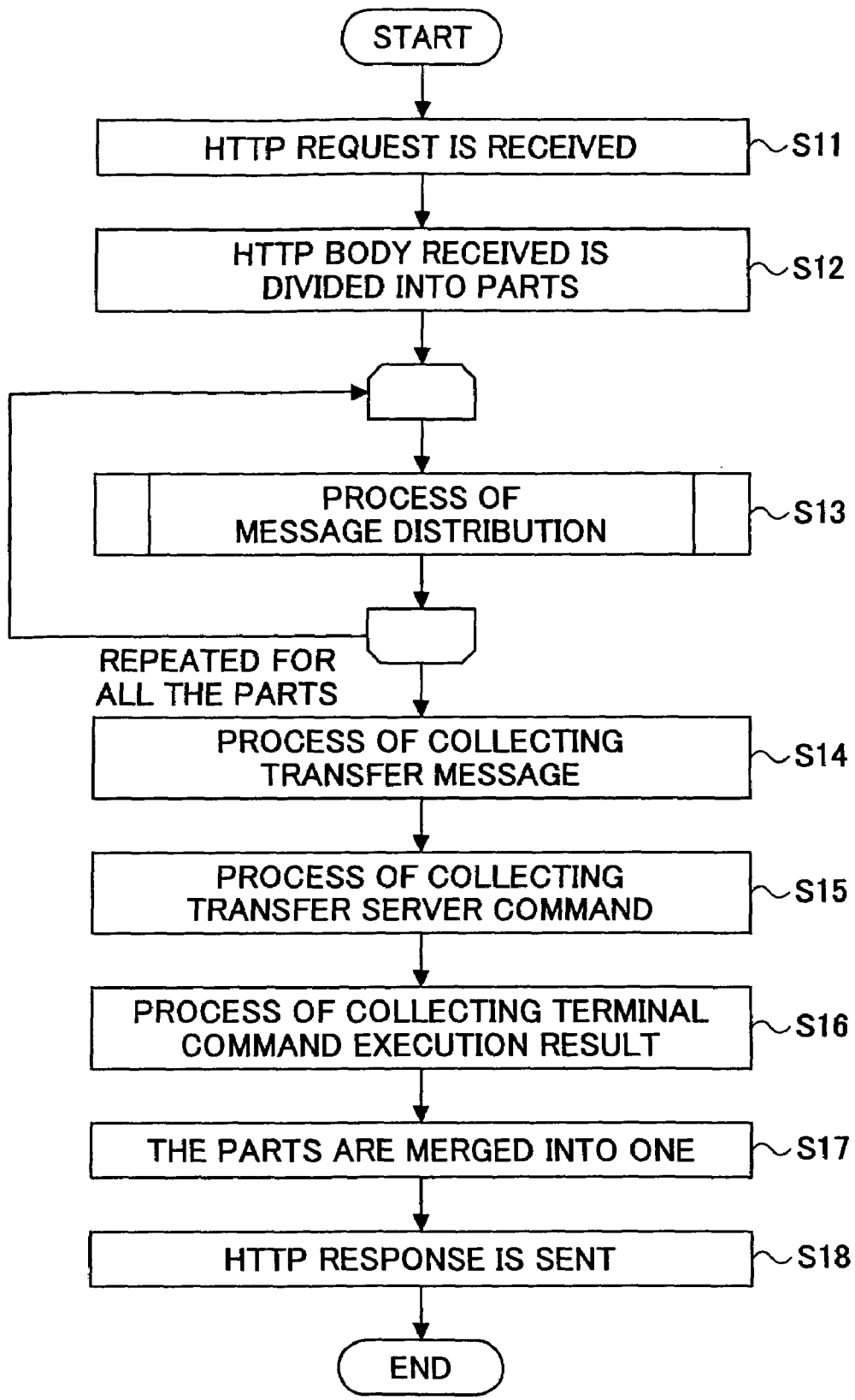
FIG. 32 is a flowchart for explaining the basic flow of the message collection and distribution processes related to communication between the image processing device and the transfer server performed by the transfer server of FIG. 3.

First, the flowchart of collection of a message and the basic flow of distribution processing is shown in FIG. 32.

CPU will start the processing shown in the flowchart of FIG. 32, if an HTTP request is transmitted from image processing device 100. And the HTTP request is first received from image processing device 100 (S11), and the HTTP body of the HTTP request which received is divided into each part (S12).

The division into each part is dividing into the element classified by "MIME boundary", and divides related to all the parts.

Then, message distribution processing of step S13 is repeated for all the parts which divided and got as an object in order.

And when these processings are performed related to all the parts, it progresses to the following step S14.

In the processing so far, steps S11 and S12 are processings of the first receiving procedure, and CPU functions as HTTP request receiver unit 46b.

At step S13, CPU functions as message distribution unit 47. The processing after step S14 is processing relevant to transmission of the HTTP response to image processing device 100.

And in this processing, CPU performs transfer message collection processing (S14). This processing is the processing which collects the messages which should be transmitted to image processing device 100 from transfer message pool 52 for reception, and includes the processing which creates the part which starts a transfer from the collected messages.

Then, transfer server command collection processing is performed (S15). This processing is processing which collects the transfer server commands which should transmit to image processing device 100 from transfer server command pool 42, and includes the processing which creates the part by a SOAP envelope from collected data.

Next, collection processing of the terminal command execution result which is a response to a terminal command is performed (S16). This processing is processing which collects the command responses which should transmit to image processing device 100 from terminal command pool 41, and includes the processing which creates the part by a SOAP envelope from the data collected too.

Then, the part which created by processing of steps S14 through S16 is merged into one, a HTTP response including all the parts is created (S17), and the HTTP response is transmitted to image processing device 100 (Si8).

It is possible that the processing of steps S14 through S16 is in random order.

In the processing so far, CPU functions as message collection unit 45 at steps S14 through S16.

Steps S17 and S18 are processings of the second transmitting procedure, and CPU functions as HTTP response transmitter unit 46a.

Next, the processing shown in the flowchart of FIG. 32 will be explained using the flowchart shown in details from every part.

Figure 33:
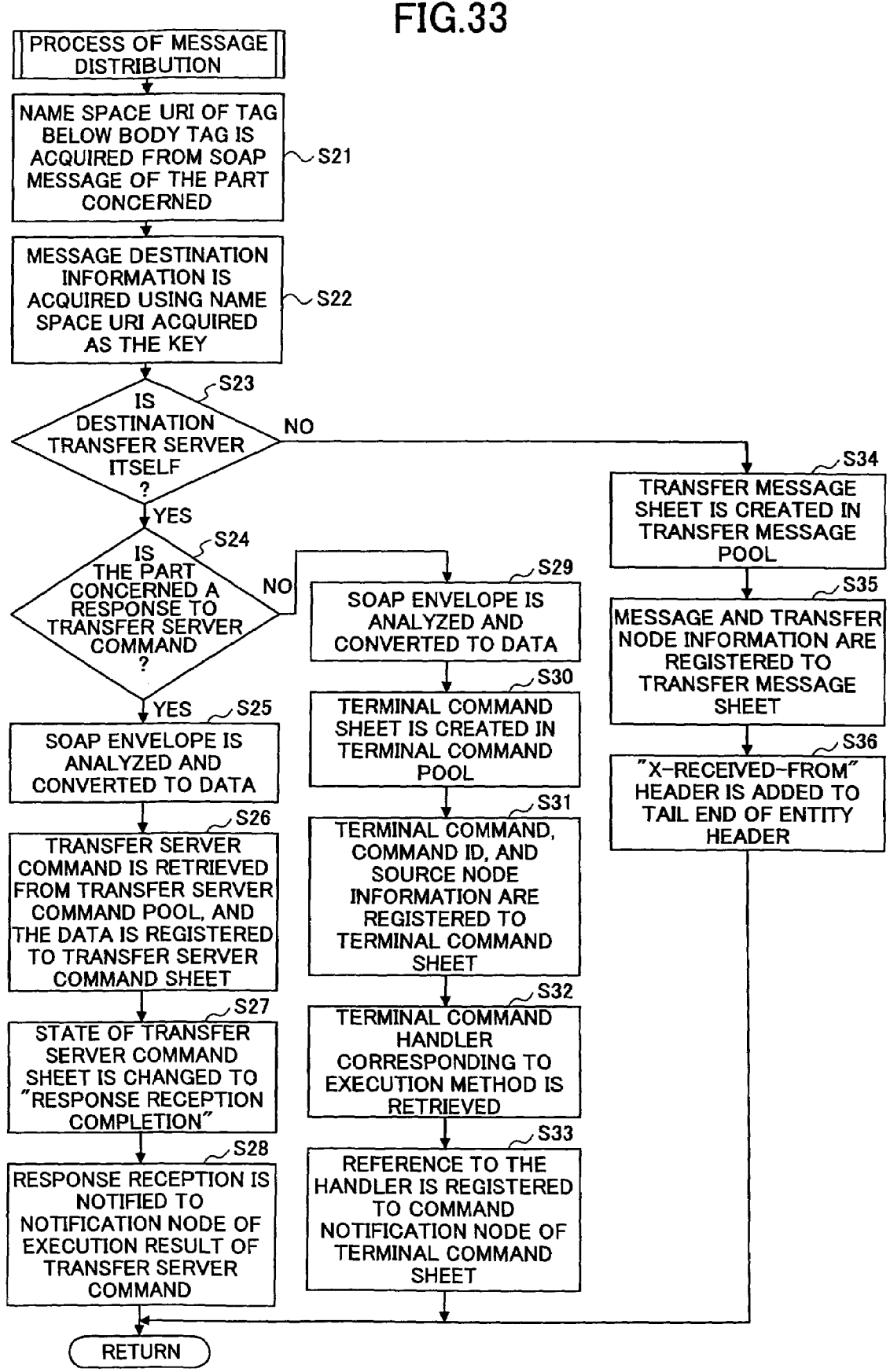
FIG. 33 is a flowchart for explaining the message distribution process shown in FIG. 32.

FIG. 33 is the flowchart for explaining the contents of the message distribution processing shown in FIG. 32.

In this processing, CPU acquires the name space URI of the tag below the body tag from the SOAP message of the part concerned (S21).

As shown in the example of FIG. 20 through FIG. 31, in the SOAP message, the tag which shows the classification of a command or a command response to the tag below the body tag is indicated.

The name-space prefix (for example, the case of FIG. 20 "ns") is given to this tag, and name space URI of a tag can be acquired from this name-space prefix and the contents of a definition of the name space in the inside of the "Envelope" tag.

Since name space URI is used for the grouping of a tag, it can be considered that the command or command response which has the same name space URI is the command or command response belonging to the same group.

Next, the destination table which has stored acquired name space URI to destination information storage unit 50 at the key is searched, and the information on the destination of a candidate part's message is acquired (S22).

FIG. 34 shows the example of a destination table.

As shown in FIG. 34, on the destination table, the information on the destination of the command belonging to the name space or a command response is indicated for every name space URI.

And the information on the destination is good to store as an IP address, a host name, etc. Of course at this time, it does not matter even if it makes the same destination as different name space URI correspond.

And the destination of a candidate part's message is acquirable by searching this table for name space URI acquired at step S21 to a key. At this time, a candidate part's message does not need to distinguish whether it is a thing concerning a command, or it is a thing concerning a command response.

For example, when it is the part which is shown by the candidate part FIG. 20, the tag below the "body" tag belongs to the name space of "http://www.example.com/maintenance/server", and it is found out that the destination of the message concerning the part is transfer server 102 itself.

When name space URI is what is not contained in the destination table, it is good to perform error processing.

Next, it is determined whether the destination acquired at step S22 is transfer server 102 itself (S23).

And if it is by itself, it turns out that the target part is a terminal command which the response or transfer server to a transfer server command should execute.

Then, the target part determines that as they are. In FIG. 33, it has indicated as what determines whether it is the response to a transfer server command (S24).

And this judgment can be determined according to the contents of whether the "SOAP Action" header exists in the target part, and the "X-SOAP-Type" header.

And if it is the response to a transfer server command, processing concerning registration of the response will be performed at steps S25 through S28.

Namely, it changes into the data of the form which analyzes the part's SOAP envelope first and can be registered into a transfer server command sheet (S25).

It searches for the transfer server command corresponding to the response from transfer server command pool 42, and the data of a response is registered into the item of the "output parameter" of the transfer server command sheet related to the transfer server command (S26).

The command ID same as information on "command ID" as what was attached at the time of transmission of a transfer server command shall be given to the command response, and, as for search of a transfer server command, this information can be performed as a key.

After registration of data finishes, the "state" of a transfer server command sheet where data was registered is changed into "response reception completion", and that is shown (S27).

And it is reported that notification node registered into "notification node of the command execution result" had a response (S28).

By this notice, it can recognize that the application which created the transfer server command had a response in that created command, and processing according to a response can be performed.

For example, if this command is transmitted to image processing device 100 when the application corresponding to an abrupt increase with image processing device 100 creates the transfer server command which acquires the sensor value of the temperature sensor of image processing device 100, image processing system 100 returns the command response including the demanded sensor value.

And in the transfer server (the facilities management server) 102 side, if this command response is received, will search for the response to which transfer server command it is based on command ID contained here, it will be made to correspond to it with the found transfer server command, and that command response will be registered.

And it is reported that the application corresponding to an abrupt increase registered as an execution result report destination of the command had a response.

The application can acquire the execution result of the created command from the item of "output parameter", if a transfer server command sheet is referred to when this notice is received. After processing to the above step S28 is completed, processing of FIG. 33 is ended and it returns to the original processing.

When it is not the response to a transfer server command at step S24, since the target part is a terminal command which a transfer server should execute, they are steps S29 through S33, and performs processing related to registration of the command.

Namely, it changes into the data of the form which analyzes the part's SOAP envelope first and can be registered into a terminal command sheet (S29).

The terminal command sheet for registering the terminal command is created in terminal command pool 41 (S30), and a terminal command, command ID, and transmission source information are registered into the terminal command sheet (S31).

The contents of the terminal command are registered into the "method name" of a terminal command sheet, and the item of "input parameter", and command ID indicated by the part is registered into the item of "command ID".

Related to "transmission source information", the transmission source information of the HTTP request the target part was indicated to be can be acquired and registered.

When the "X-Received-From" header is one of the target part's entity headers, the contents are also registered as information on a transfer path. The initial value of the "state" is "un-processed" and the initial value of "output parameter" is NULL.

After the registration to the above item is completed, the reference information to the handler (terminal command handler 43a) for performing the method which is stored in the "method name" of the terminal command sheet is searched by making reference to the predetermined correspondence information defining correspondence between the methods and the handlers (S32). And the discovered reference information is registered into the item of "notification node of command" of the terminal command sheet (S33).

After the processing up to the above step S33 is completed, the processing of FIG. 33 is ended and the control is returned to the original processing.

Since the target part's message should be transmitted to other device if the destination is not itself at step S23, it is steps S34 through S36, and processing concerning registration of the transfer message is performed.

That is, the transfer message sheet for registering the message first is created in transfer message pool 51 for transmission (S34), and a message and the destination information on the message are registered into the message sheet for a transfer (S35). Here, a candidate part's entity header is registered into the item of "entity header information" as it is, and the contents of the SOAP envelope are registered into the item of "the XML data of a message" as it is.

Related to "destination information", the information acquired at step S22 is registered.

And after the registration to the above item is completed, add the "X-Received-From" header to the tail of the entity header registered into "entity header information", and as information on the source node of a message. The information on the source node of the HTTP request the target part was indicated to be is indicated (S36).

After processing to the above step S36 is completed, processing of FIG. 33 is ended and it returns to the original processing.

After ending processing of FIG. 33, it returns to processing of FIG. 32. However, if there is the next part as shown in FIG. 33, processing of FIG. 33 will be repeated to the part. Next, the transfer message collection processing of FIG. 35 performed at step S14 in the basic flow of FIG. 32.

In this processing, CPU collects the transfer message sheets with which the source node of the HTTP request which received from transfer message pool 52 for reception at step S11 of FIG. 32 to the bottom of the "X-Send-To" header is indicated first (S41).

The information registered into the transfer message sheet in transfer message pool 52 for reception is as having been shown in FIG. 15, and the "X-Send-To" header is registered into the item of "entity header information" among these.

Next, processing of steps S42 and S43 is successively repeated by targeting all the transfer message sheets collected at step S41.

And in this processing, the part of the transfer message first indicated on the target transfer message sheet is created (S42). This processing gives the entity header registered into the item of "entity header information" to the SOAP envelope registered into the item of "the XML data of a message" of an object sheet.

However, since it is not necessary to tell the contents of the "X-Send-To" header of the bottom in an entity header to the device of the destination, it is trying to remove this header.

An end of a part's creation will delete the target transfer message sheet from transfer message pool 52 for reception (S43).

And when these processings are performed related to all the collected sheets, it progresses to the processing shown in step S15 of FIG. 32.

Figure 36:
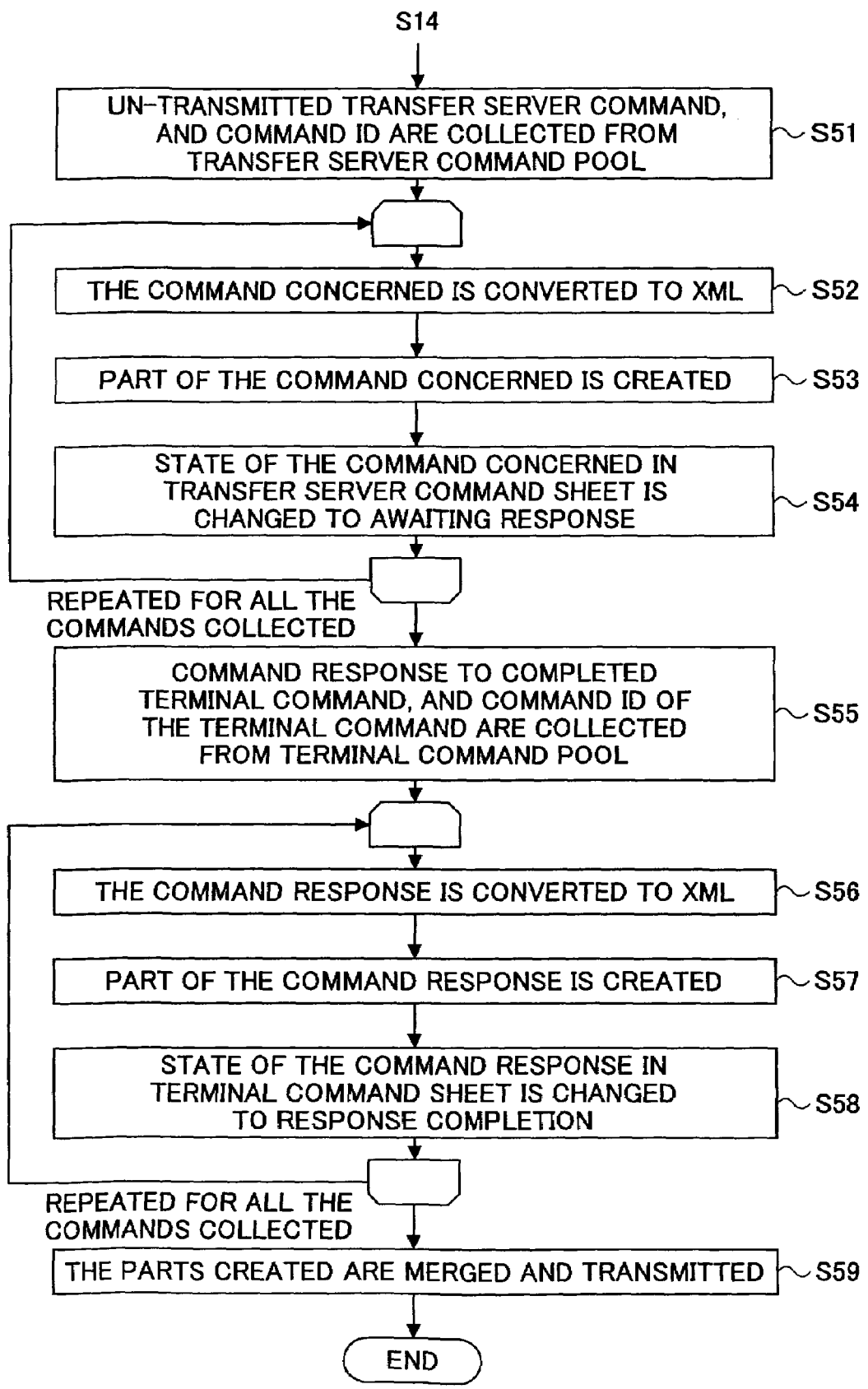
FIG. 36 is a flowchart for explaining the processes of step S15 and subsequent steps in the basic flow of FIG. 32.

Next, the processing after step S15 of FIG. 32 is shown in FIG. 36.

In this processing, CPU collects from transfer server command pool 42 destination information is equal to the source node of the HTTP request which received at step S11 of FIG. 32.

And the "state", the "method names" of a transfer server command sheet and the contents of the "input parameter" "which have not transmitted" as a transfer server command which should transmit are collected, and the contents of the "command ID" are also collected as a command ID of the command (S51).

Since the "state" of "un-transmitting" shows not having been transmitted to image processing device 100 yet after a command is created by transfer server command creation unit 44, it can extract the command which should transmit to image processing device 100 on the basis of this.

Then, processing of steps S52 through S54 is successively repeated by targeting all the transfer server commands collected at step S51.

In processing of this portion, first a target transfer server command and its target command ID. It changes into the XML document (SOAP envelope) contained in the SOAP body and a SOAP header, respectively (S52), and the information adds an entity header to this, and creates the part related to the target command (S53).

And the "state" of the transfer server command sheet where the target transfer server command was indicated is changed into the "awaiting response" (S54).

It is shown that the "state" of calling it "awaiting response" is transmitting settled related to a command at image processing device 100.

And when these processings are performed related to all the collected transfer server commands, it progresses to step S55. Here terminal command pool 41 to transmission source information of CPU is equal to the source node of the HTTP request which received at step S11 of FIG. 32.

And the "state" collects as what should transmit the contents of the "output parameter" of the terminal command sheet which is "processing completion" among the command responses to a terminal command, and also collects the contents of the "command ID" as a command ID of a corresponding terminal command (S55).

The state of "processing completion" in transfer server 102 indicates that the processing corresponding to the terminal command is completed by terminal command execution result creation unit 43 but notification of it to image processing device 100 is not yet performed. Thus, the command response which is sent to image processing device 100 can be extracted on the basis of this state.

Then, processing of steps S56 through S58 is successively repeated by targeting all the command responses collected at step S55. In the processing, the command ID is first collected with the target command response and its target response.

It is changed into the XML document (SOAP envelope) contained in the SOAP body and a SOAP header, respectively (S56), and these information adds an entity header to this, and creates the part related to the target command (S57).

These processings are the same as processing of steps S52 and S53 except the point that objects differ. And the "state" of a terminal command sheet where the target command response was indicated below is changed into "response completion" (S58).

It is shown that the "state", "response completion", is notice settled related to a command response here at image processing device 100.

And after all the processings so far are completed, CPU merges each part which created at step S42 of step S53, S57, or FIG. 35, creates a multi-part's HTTP response as shown in FIG. 17, transmits to image processing device 100 (S59), and ends processing.

As mentioned above, the processes of the message collection and distribution performed by transfer server 102 will be explained using FIG. 32 through FIG. 36.

From image processing device 100, two or more operation requests and operation responses can be put in block, and it can receive, and can process, and also when the destination is not given to them, the suitable destination can be recognized automatically and correspondence according to the destination can be performed.

Two or more operation requests and operation responses which self created or received from other device and which should be transmitted to image processing device 100 can also be collectively transmitted to image processing device 100.

After this transmission is actually completed, it may be made to make a change of the "state" where it carried out by step S54 or S58.

Since the command and command response which were going to transmit can be again set as the object of transmission even if a communication error occurs by doing in this way, the reliability of the system improves.

The same may be said of the deletion of a transfer message sheet performed at step S43 of FIG. 35.

After having merged after generating all the parts that should transmit here, being made to transmit and receiving all the parts, it explained that it processed by dividing this into each part, but it is not necessary to do in this way.

A HTTP header is transmitted first, whenever it creates a part henceforth, the part is transmitted one by one, and when transmission of all the parts is completed, it may be made to transmit data to that effect related to transmission.

Since it can transmit in 1 time of a session and processing of negotiation can be managed at once, if the data transmitted in these courses is one HTTP response only with one HTTP header which continued logically even if it does in this way, the same effect as the case where it merges and transmits can be acquired.

Since the memory space required for the buffer of the data which should be transmitted can be reduced, large-size data can be dealt with by the communication device with low cost.

In addition, every time each part is received at the receiving side, the processing of each part can be performed one by one. Similar to the case of the transmitting side, it is possible to reduce the memory space by performing it in this way.

Figure 37:
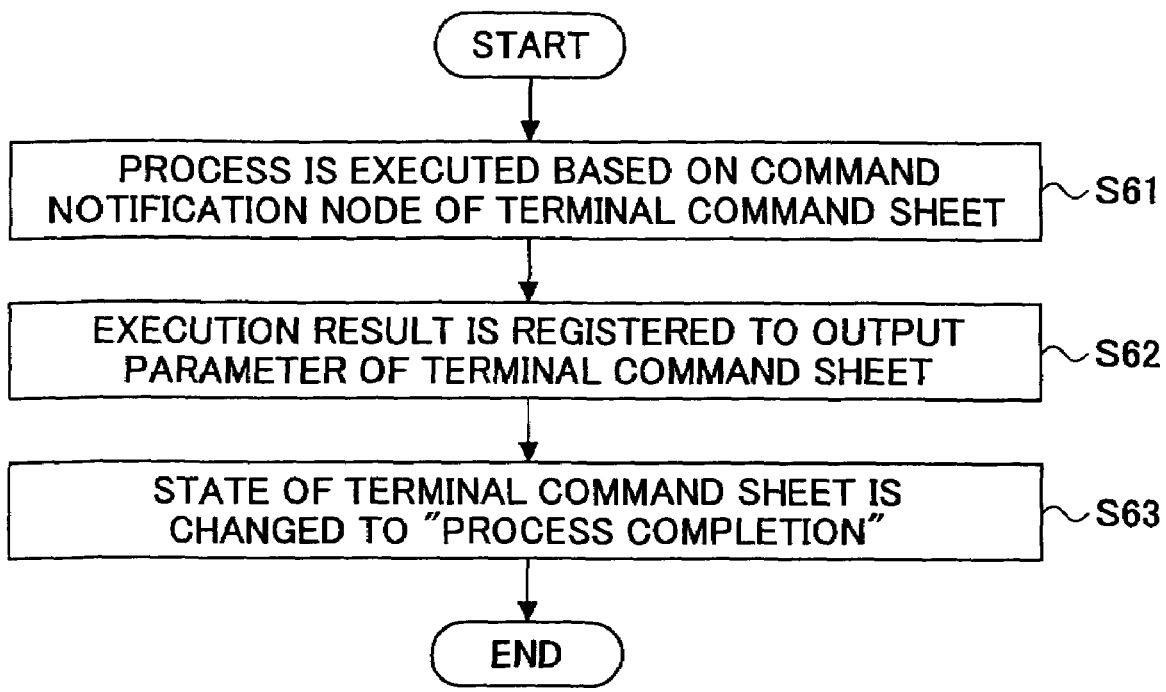
FIG. 37 is a flowchart for explaining an example of the process related to execution of the terminal command performed by the transfer server of FIG. 3.

Next, the processing related to execution of a terminal command will be explained. FIG. 37 is the flowchart for explaining an example of this processing.

After the processing of step S33 is performed, the processing shown in the flowchart of FIG. 37 is performed. Namely, immediately after a terminal command is registered to terminal command pool 41 as in FIG. 33, the processing related to execution of the terminal command as in FIG. 37 is performed.

In this processing, CPU functions as terminal command execution result creation unit 43.

In this processing, the application program is first called based on the information of "notification node of command" of the terminal command sheet related to the terminal command registered. And the processing related to execution of the terminal command is performed by passing the data of "method name" and "input parameter" (S61).

The processing related to execution of the terminal command itself is not shown in this flowchart, but CPU performs this processing separately by using the handler.

After step S61 is performed, the execution result is acquired and registered into the item of the "output parameter" of the terminal command sheet (S62). And the "state" of the terminal command sheet is changed to "processing completion", and it is notified that the processing was completed (S63).

By performing the above processing, it is possible to execute the terminal command and establish the state in which the result of execution of the terminal command can be transmitted to image processing device 100 as a command response.

Figure 38:
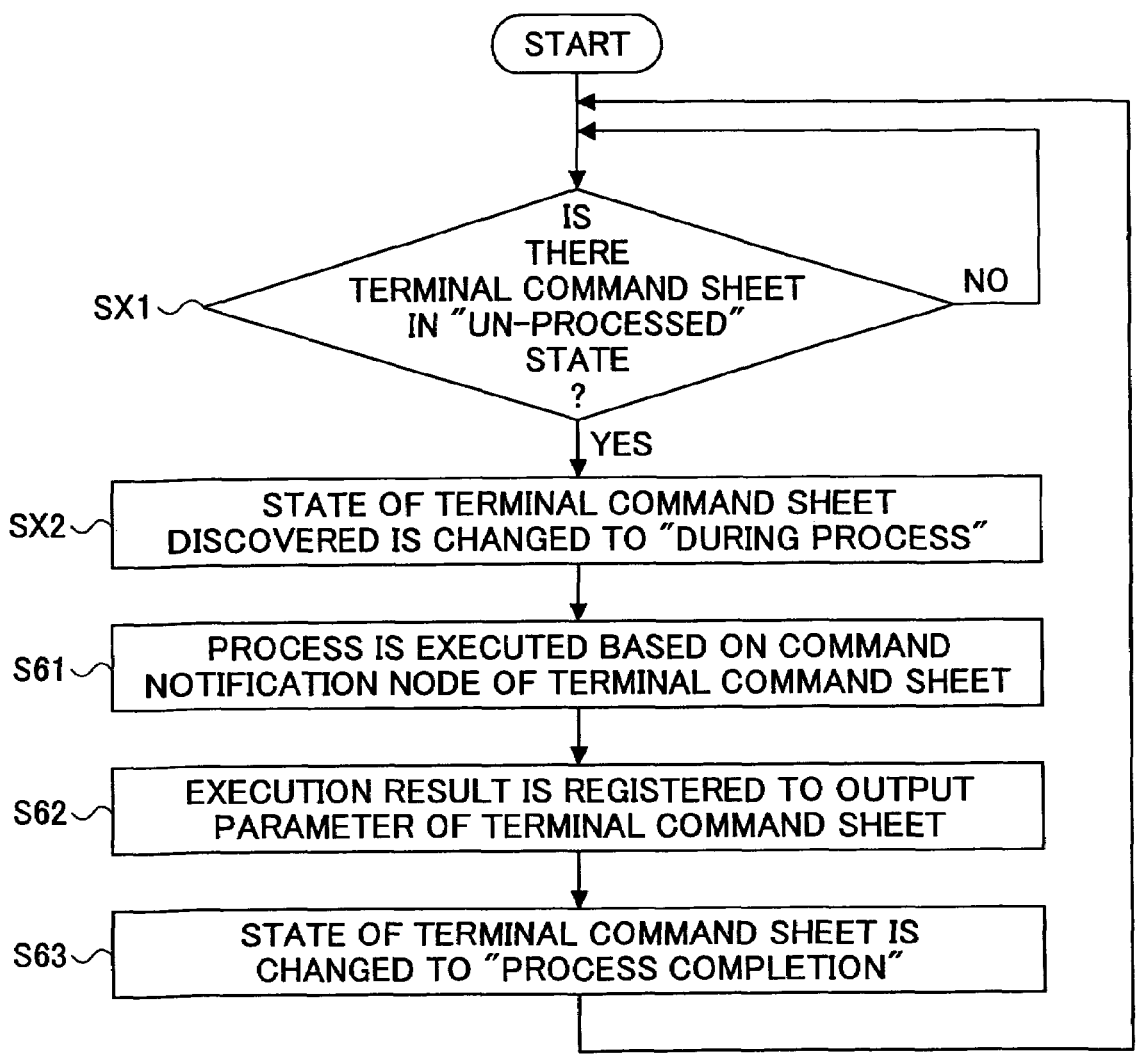
FIG. 38 is a flowchart for explaining another example of the process related to execution of the terminal command by the transfer server of FIG. 3.

Alternatively, the processing shown in the flowchart of FIG. 38 may be performed independently from the processing related to transmission and reception of the messages between transfer server 102 and image processing device 100 shown in FIG. 32, as the processing related to execution of a terminal command.

Also in this processing, CPU functions as terminal command execution result creation unit 43. CPU starts this processing at the time of starting of transfer server 102.

And in this processing, it stands by until it is determined whether there is any terminal command sheet whose state is "un-processed" to terminal command pool 41 (SX1), and it will discover such a terminal command sheet, if there is nothing first.

As mentioned above, the state "it is un-processed" is the initial value of the "state" in a terminal command sheet, and shows that processing is not performed in particular after registration of a command.

When the "un-processed" terminal command sheet is discovered by step SX1, one of them is made into a processing object, and the "state" of the terminal command sheet is changed to "during processing" (SX2).

Then, if the terminal command which processed the same steps S61 through S63 as the case of FIG. 37, and was indicated on the terminal command sheet of the processing object is executed and this is completed, it will return to step SX1 and processing will be repeated. It may be made to perform the above processing by two or more threads (for example, four threads) simultaneously.

Since the "state" of the terminal command sheet used as a processing object is not "un-processed", even if it processes simultaneously by two or more threads, it overlaps and does not put one terminal command sheet in order as a processing object.

Future processings are not overdue even when there is a command which time requires for execution, since a terminal command can be executed to arbitrary timing if it is made to perform the above processings.

And the result can be carried out to order with a command response from what execution ended, and it can change into the state which can transmit to an image processing device.

Figure 39:
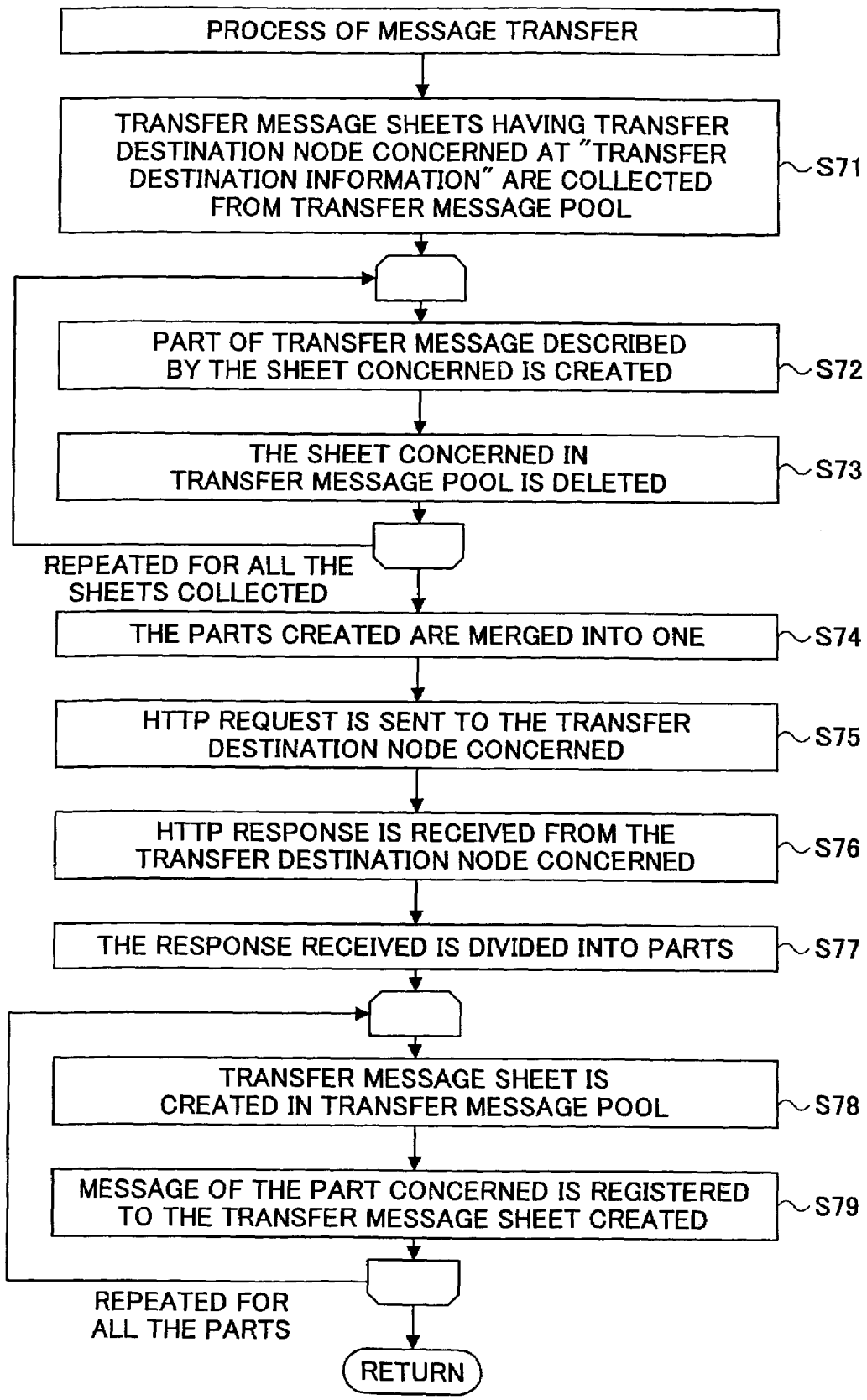
FIG. 39 is a flowchart for explaining the process related to transferring of messages between the server and the transfer server by the transfer server of FIG. 3.

Next, FIG. 39 is the flowchart for explaining the processing related to transferring of the message between servers.

CPU performs this processing to suitable timing for either of the destinations indicated on the destination table shown in FIG. 34 (here, it is considered as server 103).

In this processing, the transfer message sheets with which the target destination was registered into the item of "destination information" are first collected from transfer message pool 51 for transmission (S71).

And processing of steps S72 and S73 is successively repeated by targeting all the transfer message sheets collected at step S71.

And in these processings, the part of the transfer message first indicated on the target transfer message sheet is created (S72). This processing gives the entity header registered into the item of "entity header information" to the SOAP envelope registered into the item of "the XML data of a message" of an object sheet.

An end of a part's creation will delete the target transfer message sheet from transfer message pool 51 for transmission (S73).

And when these processings are performed related to all the collected sheets, the part which created is merged into one (S74), the HTTP request of a multi-part as showed in FIG. 18 is created, and it transmits to the target destination (S75).

In the processing so far, CPU functions as message transfer unit 48 at steps S71 through S73. Steps S74 and S75 are processings of the first transmitting procedure, and CPU functions as HTTP request transmitter unit 49*a*.

It is the same as that of the case of step S43 of FIG. 35 mentioned above that it may be made to carry out of the deletion of a transfer message sheet performed at step S73 after this transmission is actually completed.

Next, a HTTP response is received from the target destination as a communication response to the HTTP request which transmitted (S76). And the HTTP body of the received HTTP response is divided into each part (S77).

The division into each part is dividing into the element classified by "MIME boundary" like the case of step S12 of FIG. 32, and divides related to all the parts.

Then, the processing of steps S78 and S79 is repeated for all the parts which divided and got as an object in order.

In these processings, the transfer message sheet for registering the target message first is created in transfer message pool 52 for reception (S78), and the target message is registered into the message sheet for a transfer (S79).

Here, a candidate part's entity header is registered into the item of "entity header information" as it is, and the contents of the SOAP envelope are registered into the item of "the XML data of a message" as it is. The "X-Send-To" header is not deleted at this time, either.

When these processings are performed related to all the parts which got at step S77, processing of FIG. 39 is ended.

In the above processing, steps S76 and S77 are processings of the second receiving procedure, and CPU functions as HTTP response receiver unit 49*b*. At steps S78 and S79, CPU functions as message transfer unit 48.

Figure 40:
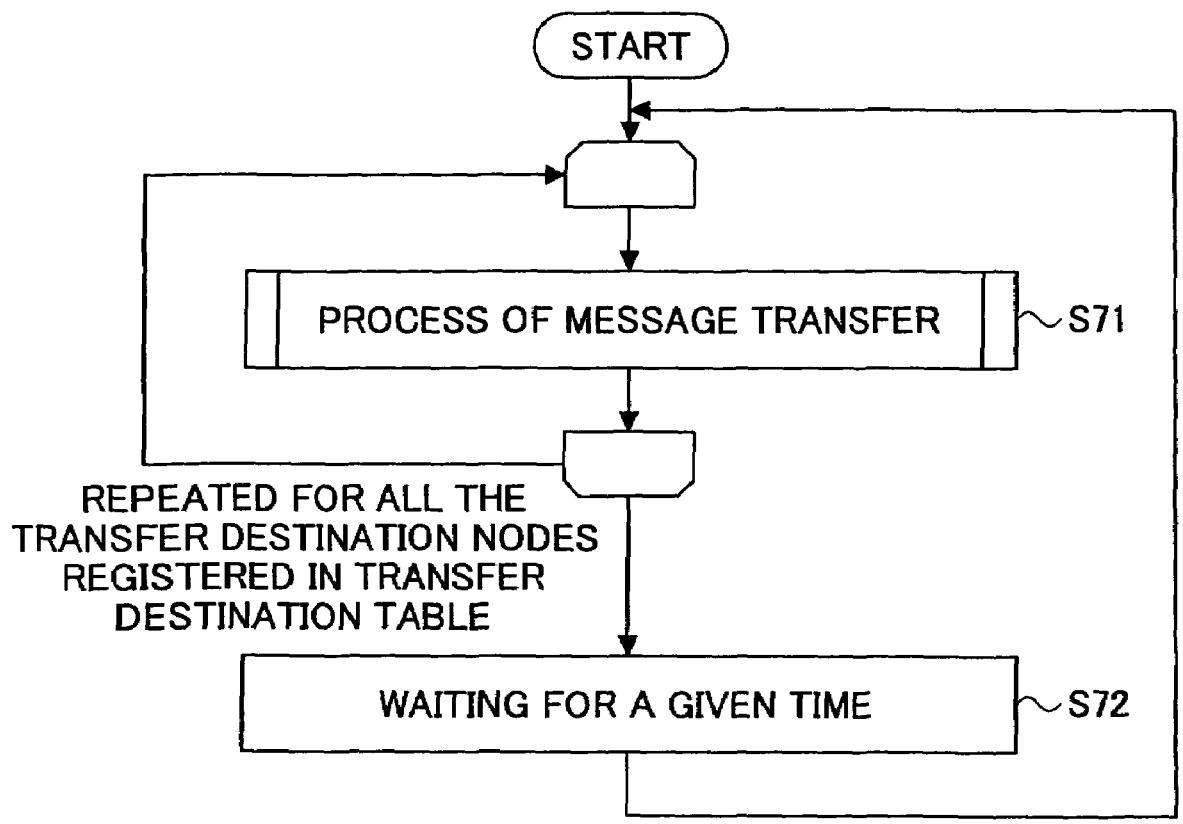
FIG. 40 is a flowchart for explaining the process related to execution timing control of the message transfer process of FIG. 39.

FIG. 40 is the flowchart for explaining the processing related to execution timing control of the message transfer processing of FIG. 39.

CPU starts this processing at the time of starting of transfer server 102. And this processing performs showing one by one by targeting all the destinations indicated on the destination table shown in FIG. 34 to FIG. 39 for every fixed time message transfer processing.

In this case, also when the same destination carries out a multiple-times appearance at a destination table, it is sufficient if one message transfer processing is performed related to the one destination.

Thus, if message transfer processing is periodically performed related to all the destinations to which a message can be transmitted and the HTTP request which is the communication request is transmitted, even when it is made to perform communication to the destination from transfer server 102 by always transmitting the communication request from the transfer server 102 side.

It can prevent being able to give an opportunity to transmit information to transfer server 102 from the destination, and the required information on the transfer to transfer server 102 continuing at a long period of time, and stagnating in server 103.

Of course, message transfer processing may be suitably performed in addition to periodical timing. For example, when information immediately to be transmitted is registered into one of pools, message distribution unit 47 notifies that to message transfer unit 48, and it may be made to make message transfer processing perform.

If it does in this way, when a command is registered, this can be immediately transmitted to the destination.

As mentioned above, transmit collectively the operation request and operation response which should be transmitted to the destination related to each of two or more destinations by performing processing related to a transfer of the message shown in FIG. 39 and FIG. 40.

The operation request and operation response which should transmit to image processing device 100 can be collectively received from the destination, and each can be independently stored to image processing device 100 in the state which can transmit.

Figure 41:
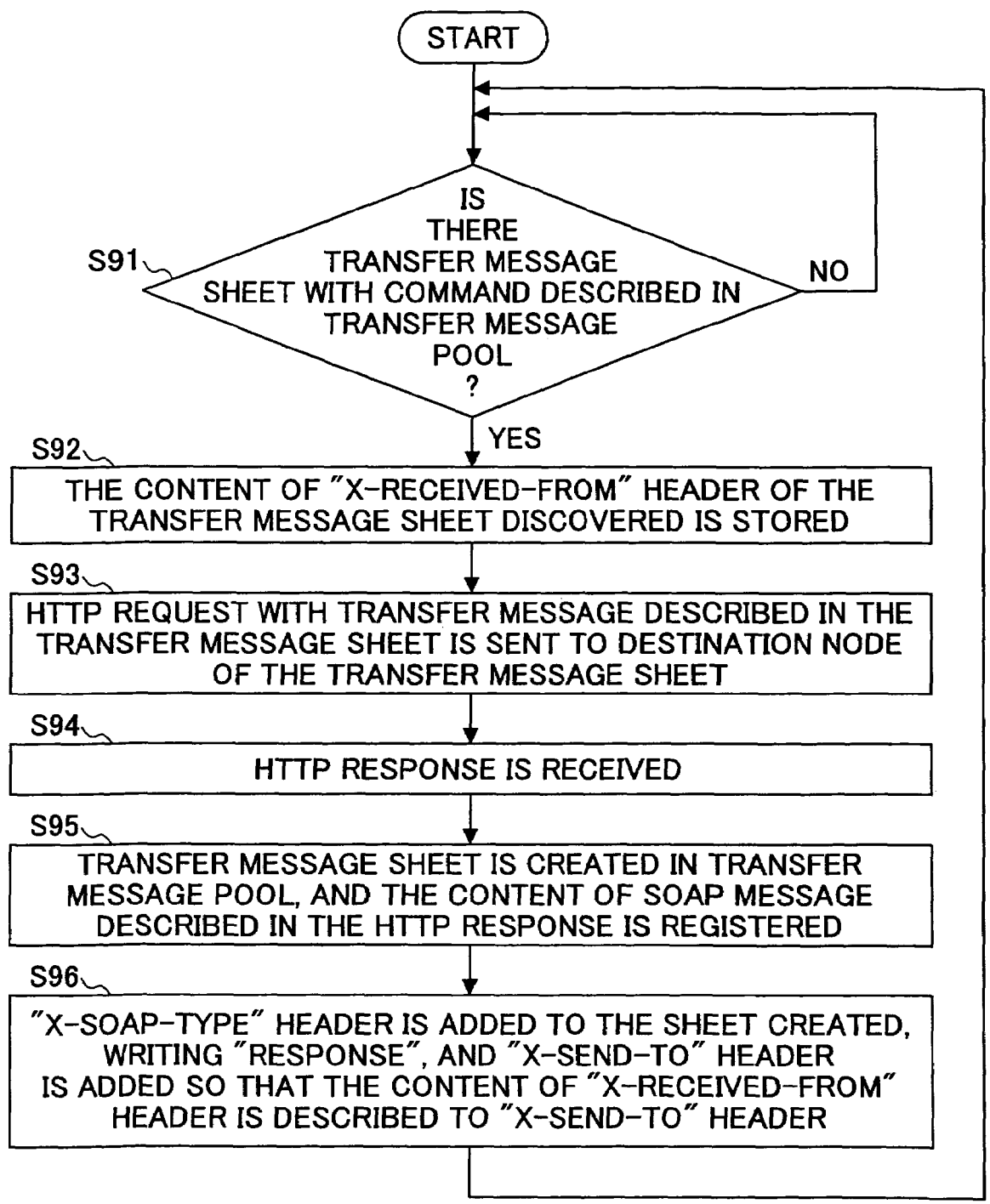
FIG. 41 is a flowchart for explaining another example of the process related to transferring of the terminal command by the transfer server of FIG. 3.

Performing processing as replaced with the processing which that the command from the image processing device 100 side may be dealt with only showed in FIG. 39 and FIG. 40 at the case or shown in the flowchart of FIG. 41 in addition to it is also considered.

CPU starts this processing like the case of FIG. 38 at the time of starting of transfer server 102. And in this processing, it is determined whether there is any transfer message sheet which describes the command to transfer message pool 51 for transmission first (S91), and it stands by until it will discover such a transfer message sheet, if there is nothing.

When the transfer message sheet which describes the command at step S91 is discovered, one of them is made into a processing object, and the contents of the "X-Received-From" header indicated on the transfer message sheet are stored (S92).

And with reference to the "destination information" on an object sheet, the HTTP request which describes the transfer message (SOAP request) indicated on the object sheet is transmitted to the destination (S93).

What is necessary is just to give a required HTTP header to the SOAP envelope registered into the item of "the XML data of a message" when generating a transfer message. At this time, the entity header information registered into the item of "entity header information" can be used.

Then, the HTTP response to the HTTP request which transmitted is received from the destination (S94). To this, the SOAP response to the SOAP request which transmitted should be indicated.

Then, the contents of the SOAP message which creates a transfer message sheet in transfer message pool 52 for reception, and is indicated to the received HTTP response are registered into the created transfer message sheet (S95).

What is necessary is to register the portion of a SOAP envelope into the item of "the XML data of a message" as it is, and just to register the required portion in a HTTP header into the item of "entity header information" related to this registration. And the "response" to the "entity header information" of the created transfer message sheet as the "X-SOAP-Type" header and its contents.

The "X-Send-To" header is added and the contents of the "X-received-From" header stored at step S92 are indicated here (S96). And it returns to step S91 and processing is repeated.

The registered command response can be acquired from the destination of the command and the contents can be registered into transfer message pool 52 for reception by the above processing, like the case where it registers by processing of FIG. 39 and FIG. 40, it can collect by message collection unit 45, and can transmit to image processing device 100.

A command can be transmitted and performed even when the device of the destination does not support batch transmission as shown in FIG. 39, if it is made to perform such processing.

And when a command is registered, this can also be immediately transmitted to the destination. Explanation of the processing related to a transfer of each command and command response which are performed in transfer server 102 above is ended.

Next, the functional composition for dealing with a command and a command response to the image processing device 100 side will be explained. It is as having explained hardware using FIG. 9.

FIG. 42 shows the composition of the functions for performing the command and command response related processing among the functions of image processing device 100 of FIG. 3.

The terminal command pool 141 and server side command pool 142 are established in the storage unit which can rewrite either among the functions shown in FIG. 42.

For example, although it can be provided in NVRAM 207, it may also be provided in SDRAM 203 or HDD 210.

The functions of terminal command creation unit 143, server side command execution result creation unit 144, message collection unit 145, and message distribution unit 147 are realized by CPU 201. The function of HTTP client function module 146 is realized by CPU 201 and PHY 206.

Since it is made to carry out common handling even if the source node of a command is transfer server 102 and it is server 103 in image processing device 100, in the explanation of image processing device 100, the transfer server command and server command mentioned above will be collectively called the "server side command". These functions will be explained further.

First, terminal command pool 141 is a pool which associates and registers a terminal command, the response to this command, and the identification information of this command.

Server side command pool 142 is a pool which associates and registers the server side command, the response to this command, and the identification information of this command. It is trying to associate a command and information, including identification information, a response, etc., in these pools by creating the command sheet of table format for every command, and storing information.

Terminal command creation unit 143 corresponds to a request creation unit. It creates a terminal command and the identification information (ID) which identifies this command is assigned. The management information for managing this command is attached, and it has a function which associates these information and is registered into terminal command pool 141 as a terminal command sheet of table format.

Among these, the application with which image processing device 100 is equipped, for example corresponds to the portion which creates a terminal command.

The function which gives the priority at the time of making terminal command creation unit 143 execute each command in the destination to the created terminal command may be provided.

FIG. 43 shows the example of the data structure of the terminal command sheet in image processing device 100 of FIG. 3.

As shown in FIG. 43, in image processing device 100, the area which stores the data of "command ID", "method name", "input parameter", "state", "notification node of command execution result", and "output parameter" is provided in the terminal command sheet.

Among these items, "command ID", "method name", and "input parameter" correspond to a terminal command (and ID attached thereto), and "state" and "notification node of command execution result" correspond to management information. "Output parameter" is the content of the command response returned from the device which performs processing concerning the command.

Related to the content of each item, it is the same as that of the content of the item of the same name of the terminal command sheet in transfer server 102 or transfer server command sheet, and a description thereof will be omitted.

Since it is not necessary to recognize whether it is transmitted and processed by which device after that if a terminal command is transmitted to transfer server 102, image processing device 100 has not established the item of "destination information".

Referring to FIG. 42, server side command execution result creation unit 144 corresponds to a response creation unit.

And it is the application which reads and executes the server side command from server side command pool 142. And the response to the server side command is created and it has a function which relates with command ID of the server side command, and is registered into server side command pool 142.

The server side command received from transfer server 102 is related with the management information for managing ID which identifies this command, and this command, and is registered into server side command pool 142 as a server side command sheet of table format.

And the command response which server side command execution result creation unit 144 created is also registered into the server side command sheet related to the executed server side command.

The server side command of two or more kinds is read to server side command execution result creation unit 144 from server side command pool 142, and it is possible to provide the function which creates the response to each server side command.

When it includes the information on the dispatching priority for the server side command having priority over image processing device 100, and performing processing, providing the function which reads from the high thing of priority preferentially and is performed is also considered.

Server side command execution result creation unit 144 may be a module which calls not the application itself but application required for execution of the server side command, and performs a command.

FIG. 44 shows the example of the data structure of the server side command sheet in image processing device 100 of FIG. 3.

As shown in FIG. 44, in image processing device 100, the area that stores the data of "command ID", "method name", "input parameter", "state", "output parameter", and "notification node of command" is provided in the server side command sheet.

Among these items, "command ID", "method name", and "input parameter" correspond to the server side command (and ID attached thereto), and "state" and "notification node of command" correspond to management information. And "output parameter" is an execution result of the server side command, and serves as the content of the command response which image processing device 100 returns.

Related to the content of each item, it is the same as that of the content of the item of the same name of the transfer server command sheet in transfer server 102 or terminal command sheet, and a description thereof will be omitted.

Since it is not necessary to recognize to which device it is transmitted after that if the response to the server side command is transmitted to transfer server 102, image processing device 100 has not established the item of "transmission source information".

Referring back to FIG. 42, message collection unit 145 corresponds to a collection unit. And associate command ID of the server side command corresponding to the command response which server side command execution result creation unit 144 created, and this command response, and read from server side command pool 142.

Command ID of the terminal command which terminal command creation unit 143 created, and this command is associated, and it reads from terminal command pool 141, and has a function which creates an outgoing message from these.

When dispatching priority is specified as the command response or the terminal command, it is possible to make it message collection unit 145 read sequentially from the high thing of dispatching priority, respectively. Related to the entry format of an outgoing message, or a generation system, it is the same as that of the thing explaining transfer server 102.

HTTP client function module 146 is provided with HTTP request transmitter unit 146*a* which transmits an HTTP request, and HTTP response receiver unit 146*b* which receives a HTTP response.

And HTTP request transmitter unit 146*a* corresponds to a transmitter unit, creates the HTTP request containing the outgoing message which message collection unit 145 created, and has a function which transmits to transfer server 102.

An outgoing message may be included in one HTTP request how many, and the outgoing message concerning a command response and the outgoing message concerning a terminal command can also be made arbitrarily intermingled at this time.

Then, there is no HTTP request transmitter unit 146*a*, and it includes all the outgoing messages which message collection unit 145 created in one HTTP request, and it is trying to be concerned for these any being an outgoing message concerning, and to transmit.

However, providing a maximum in the number of outgoing messages included in one HTTP request is also considered.

By the way, transmission of this HTTP request does not have data read when message collection unit 145 tries read-out of a terminal command, a command response, etc., and also when the SOAP message which should transmit as a result is not created, it is performed. And the trial of this read-out shall be performed periodically.

For example, it is possible to read every 60 minutes by a timer. It does in this way because it cannot transmit unless communication is required from image processing device 100, even if there is information to transmit to image processing device 100 from transfer server 102 as mentioned above.

By giving an opportunity to transmit the communication request to transfer server 102 periodically, and transmit information to image processing device 100 from transfer server 102, even if there is no data which nothing transmits from image processing device 100. It can prevent that the required information on a transfer continues at a long period of time, and stagnates in transfer server 102.

Of course, read-out by message collection unit 145 and transmission of the HTTP request by HTTP request transmitter unit 146*a* following it may be suitably performed in addition to periodical timing.

For example, when information immediately to be transmitted is registered into one of pools, it may be made for terminal command creation unit 143 or server side command execution result creation unit 144 to make it read to message collection unit 145 by notifying that.

HTTP response receiver unit 146*b* corresponds to a receiver unit, and has the function to receive a HTTP response from transfer server 102.

And the received message which contains in a HTTP response command ID related with the server side command and its command, the response to a terminal command and its command, and the received message containing associated command ID are intermingled arbitrarily, and are contained.

Related to the entry format of a received message, it is the same as that of the thing explaining transfer server 102.

The message distribution unit 147 corresponds to a distribution unit. And it has the function to distribute and register into terminal command pool 141 and server side command pool 142 the data contained in the HTTP response which HTTP response receiver unit 146*b* received. Specifically, the server side command sheet is formed in the server side command pool 142, and the server side command and its associated command ID are registered to it.

The terminal command which collates with command ID of a terminal command sheet which has stored command ID related with the command to terminal command pool 141, and corresponds related to the response to a terminal command is specified. It registers as the "output parameter" related to the terminal command.

Also related to the data-conversion system in the case of this registration, it is the same as that of the thing explaining transfer server 102.

Next, the processing performed by the image processing device 100 which has the composition and the function in which it explained above will be explained using the flowchart of FIG. 45 through FIG. 47.

The processing shown in these flowcharts is performed when CPU 201 of image processing device 100 executes a necessary control program.

Figure 45:
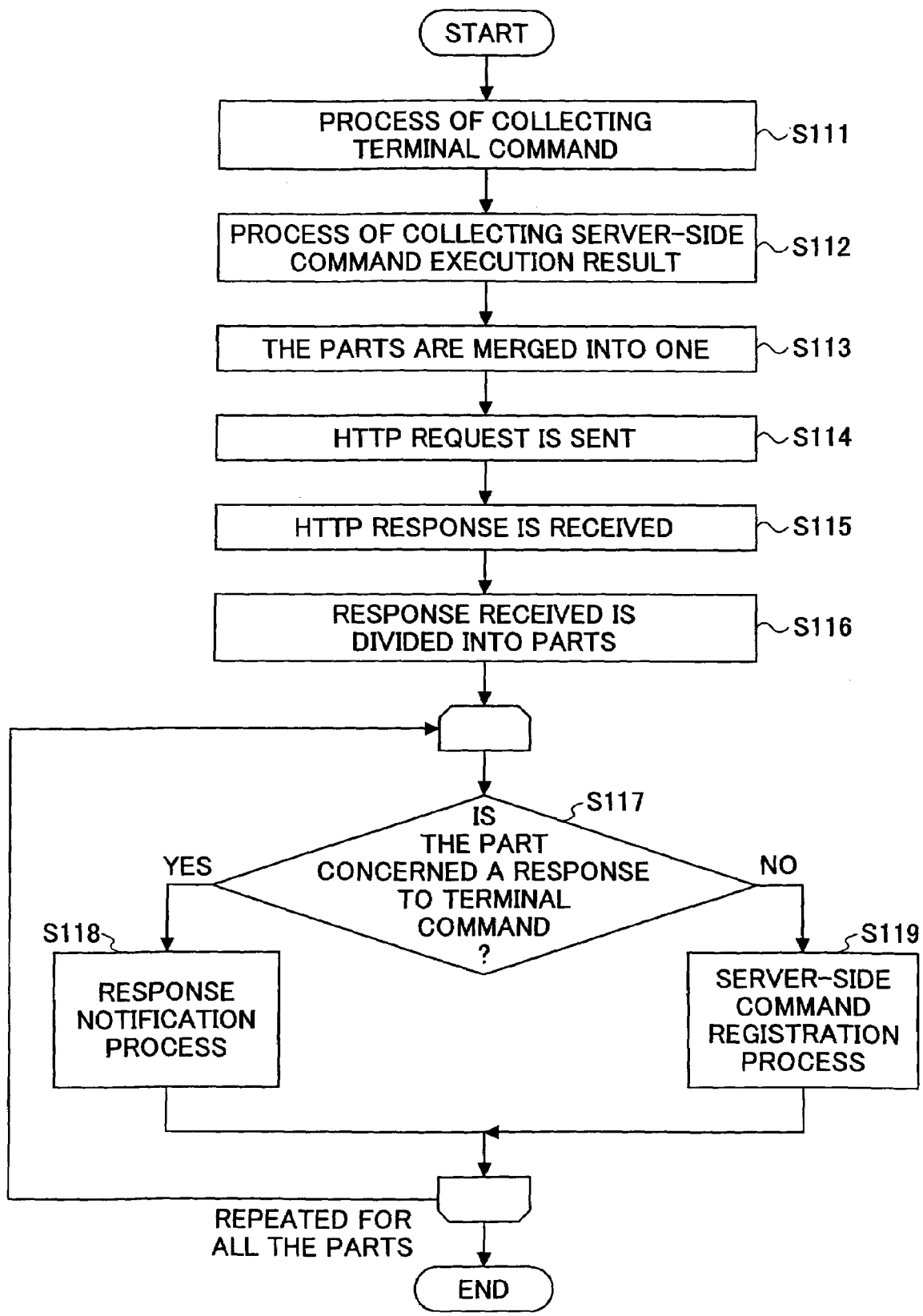
FIG. 45 is a flowchart for explaining the basic flow of the message collection and distribution processes performed by the image processing device of FIG. 3.

First, the flowchart of collection of a message and the basic flow of distribution processing is shown in FIG. 45.

CPU 201 will start the processing shown in the flowchart of FIG. 45, if message collection unit 145 becomes the timing which tries read-out of a terminal command, a command response, etc.

And collection processing of a terminal command is performed first (S111). This processing is processing which collects the terminal commands which should transmit to transfer server 102 from terminal command pool 141, and includes the processing which creates the part by a SOAP envelope from collected data.

Next, collection processing of the server side command execution result which is the response to the server side command is performed (S112). This processing is processing which collects the command responses which should transmit to transfer server 102 from server side command pool 142, and includes the processing which creates the part by a SOAP envelope from the data collected too.

Then, the part which created by processing of steps S111 and S112 is merged into one, an HTTP request including all the parts is created (S113), and the HTTP request is transmitted to transfer server 102 (S114).

In the processing so far, at steps S111 and S112, CPU 201 functions as message collection unit 145, and it functions as HTTP request transmitter unit 146*a* at steps S113 and S114.

Next, a HTTP response is received from transfer server 102 as a communication response to an HTTP request (S115). And the HTTP body of the received HTTP response is divided into each part (S116).

The division into each part is dividing into the element classified by "MIME boundary", and divides related to all the parts.

Then, processing of steps S117 through S119 is repeated for all the parts which divided and got as an object in order. In this processing, the target part determines first whether you are the part which describes the response to a terminal command (S117).

And if it is the response to a terminal command, notice processing of a response will be performed (S118). Since it is the part indicated by the server side command when it is not the response to a terminal command, the server side command registration processing is performed (S119).

After step S118 or S119 is performed, the control is returned to step S117, and the processing is repeated for the next part.

And when these processings are performed related to all the parts, the processing shown in the flowchart of FIG. 45 is ended.

In the processing so far, at steps S115 and S116, CPU 201 functions as HTTP response receiver unit 146b, and it functions as message distribution unit 147 at steps S117 through S119.

Next, FIG. 45 shows the basic flow of the message collection and distribution processes performed by image processing device 100 of FIG. 3.

Figure 46:
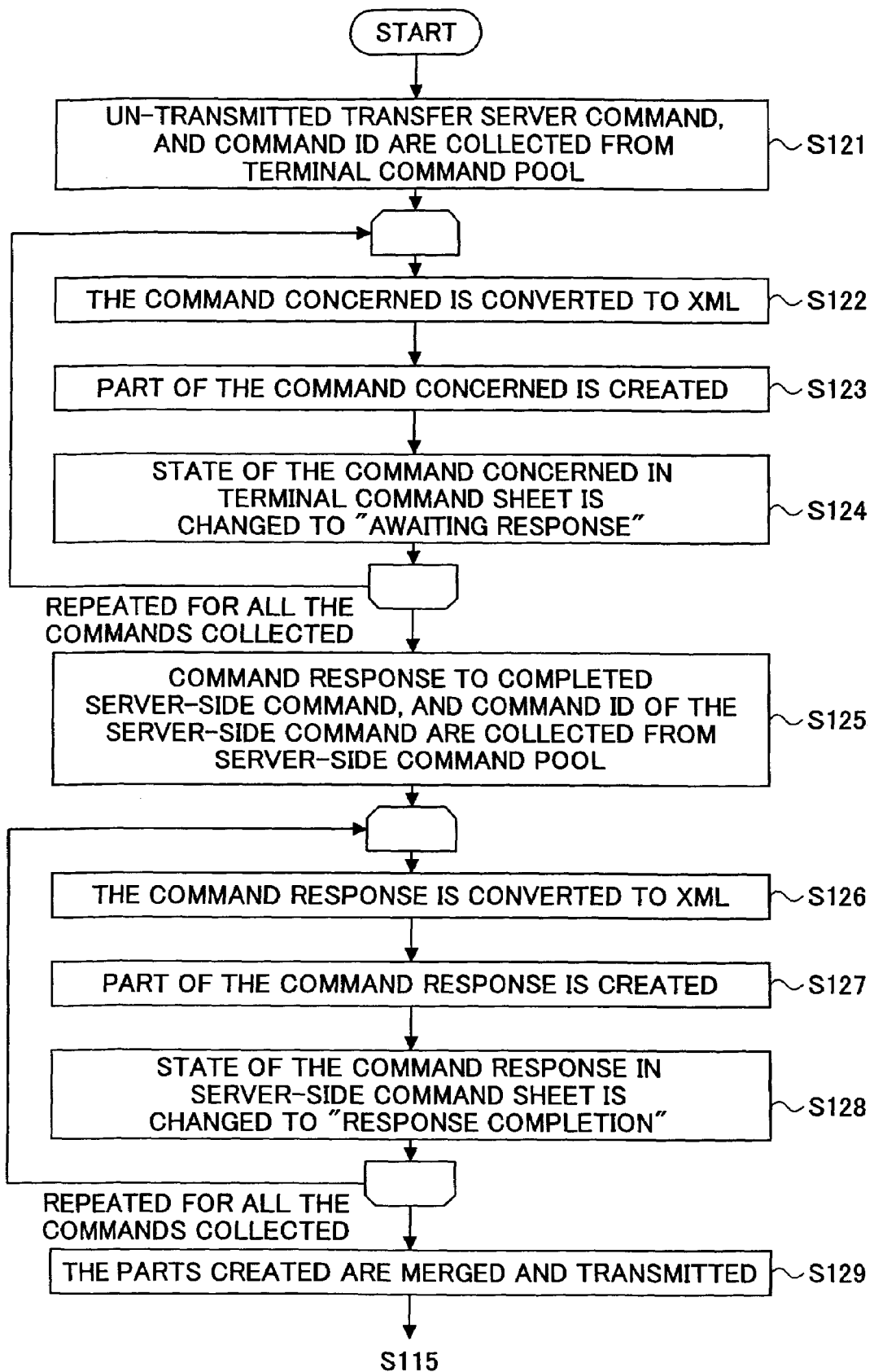
FIG. 46 is a flowchart for explaining the processes up to step S114 in the basic flow of FIG. 45.

FIG. 46 is the flowchart for explaining the processes up to step S114 in the basic flow of FIG. 45.

In the processing, CPU 201 collects from terminal command pool 141 the "state", the "method name" of a terminal command sheet and the contents of the "input parameter" "which have not transmitted" as a terminal command which should transmit, and the contents of the "command ID" also collect them as a command ID of the command (S121).

Since the "state" of "un-transmitting" shows what has not been notified to transfer server 102 yet after a command is created by terminal command creation unit 143, it can extract the command which should transmit to transfer server 102 on the basis of this.

Then, processing of steps S122 through S124 is successively repeated by targeting all the terminal commands collected at step S121.

In these processings, first a target terminal command and its target command ID. It changes into the SOAP envelope contained in the SOAP body and a SOAP header, respectively (S122), and the information adds an entity header to this, and creates the part related to the target command (S123).

And the "state" of a terminal command sheet where the target terminal command was indicated is changed into the "awaiting response" (S124). The state of "awaiting response" indicates that notification of the command to transfer server 102 is completed.

After the processing for all the commands collected is completed, CPU 201 collects from server side command pool 142 the contents of the "output parameter" of the server side command sheet whose state is "processing completion", and also collects the contents of the "command ID" as a command ID of the corresponding server side command (S125).

The state of "processing completion" indicates that the processing corresponding to the server side command is performed by server side command execution result creation unit 144 but notification of it to transfer server 102 is not yet performed. Thus, the command response which should be transmitted to transfer server 102 can be extracted on the basis of this.

Then, processing of steps S126 through S128 is successively repeated by targeting all the command responses collected at step S125. In the processing, command ID is collected with a target command response and its target response.

The information is the processings (S127) which change into the SOAP envelope contained in the SOAP body and a SOAP header, respectively (S126), add an entity header to this, and create the part related to the target command response. These processings are the same as processing of steps S122 and S123 except the point that objects differ.

And the "state" of the server side command sheet where the target command response was indicated below is changed into "response completion" (S128).

The "state", "response completion", shows that it is notice settled related to a command response at transfer server 102.

And after all the processings so far are completed, CPU 201 merges each part which created by step S123 or S127, creates the HTTP request of a multi-part as showed in FIG. 16, and transmits to transfer server 102 (S129).

After this transmission is actually completed, it may be made to make a change of the "state" where it carried out by step S124 or S128.

Since the command and command response which were going to transmit can be again set as the object of transmission even if a communication error occurs by doing in this way, the reliability of the system improves.

The processing related to transmission of an HTTP request is ended above, and it progresses to the processing which corresponds after step S115 of FIG. 45.

Figure 47:
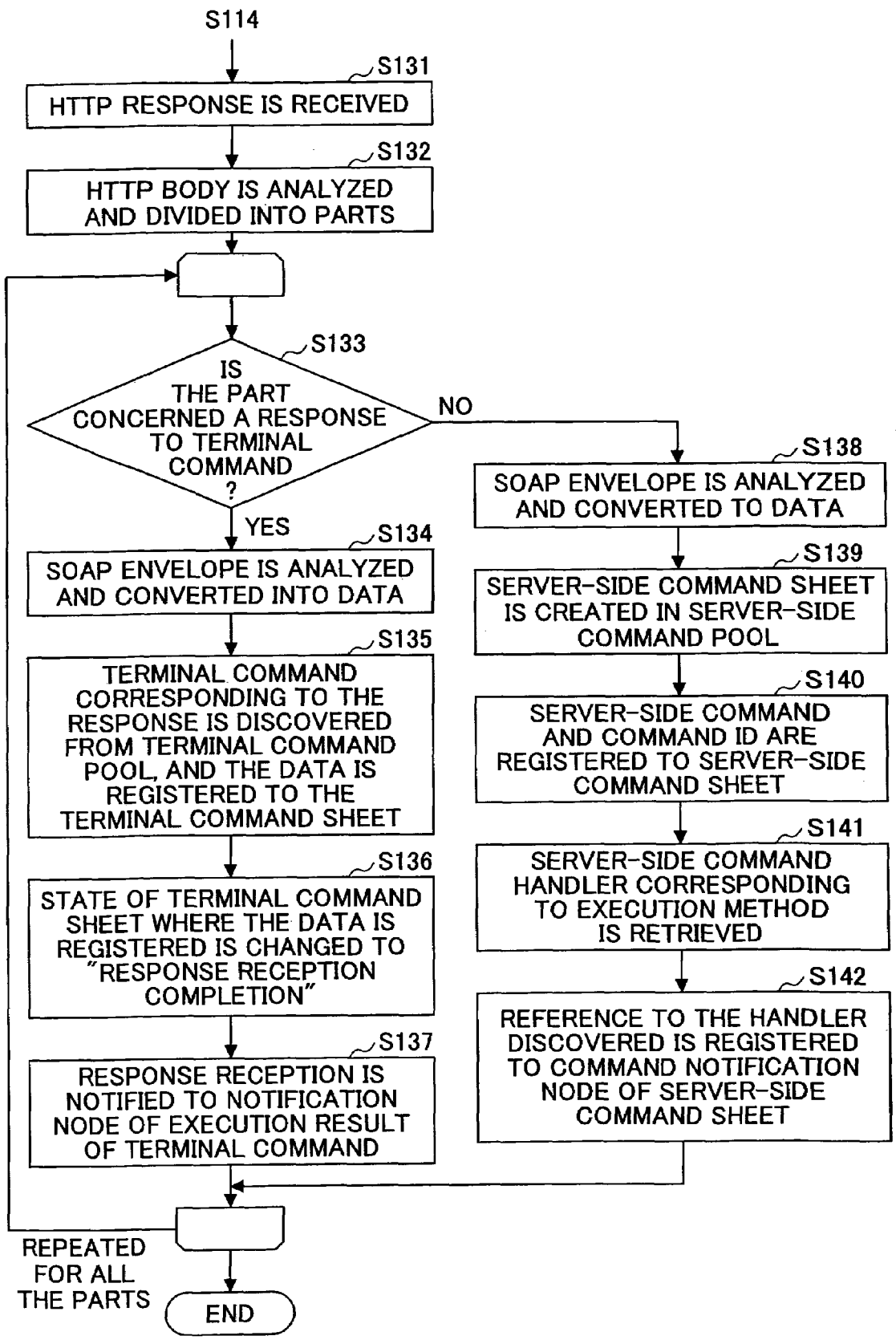
FIG. 47 is a flowchart for explaining the processes of step S15 and subsequent steps in the basic flow of FIG. 45.

FIG. 47 is a flowchart for explaining processing of the portion after step S115 of FIG. 45.

The processing next to step S129 of FIG. 46 corresponds to step S131 of FIG. 47.

In this processing, CPU 201 receives this for the reception of a HTTP response to the HTTP request which transmitted from waiting and transfer server 102 first (S131).

If this is received, the HTTP body will be analyzed and it will divide into each part (S132).

And processing of step S133 through step S142 is successively repeated after that by targeting each part which divided and got.

In processing of this portion, the target part determines first whether it is the response to a terminal command (S133). Since the server side command and the response to a terminal command may be included in the HTTP response as mentioned above, the target part determines these any they are.

And this judgment can be determined according to the contents of whether the "SOAP Action" header exists in the target part, and the "X-SOAP-Type" header.

If it is the response to a terminal command at step S133, processing concerning registration of the response of steps S134 through S137 will be performed.

Namely, it changes into the data of the form which analyzes the part's SOAP envelope first and can be registered into a terminal command sheet (S134).

It searches for the terminal command corresponding to the command response from terminal command pool 141, and the data of a command response is registered into the item of the "output parameter" of the terminal command sheet related to the terminal command (S135).

The command ID same as information on "command ID" as what was attached at the time of transmission of a terminal command shall be given to the command response, and, as for search of a terminal command, this information can be performed as a key.

After registration of data finishes, the "state" of a terminal command sheet where data was registered is changed into "response reception completion", and that is shown (S136).

And it is reported that notification node registered into "notification node of the command execution result" had a response (S137).

By this notice, it can recognize that the application which created the terminal command had a response in that created command, and processing according to a response can be performed. For example, if this command is transmitted to transfer server 102 when the application which emits an error message creates the terminal command of the purport that an error message is performed, transfer server 102 will return the command response of the purport that this was received correctly.

And in the image processing device 100 side, if this command response is received, will search for the response to which terminal command it is based on command ID contained here, it will be made to correspond to it with the found terminal command, and that command response will be registered.

And it is reported that the application which is registered as an execution result report destination of the command and which emits an error message had a response.

The application can acquire the execution result of the created command from the item of "output parameter", if a terminal command sheet is referred to when this notice is received.

After processing to the above step S137 is completed, if there is the next part, the processing from step S133 will be repeated for it.

On the other hand, if it is not the response to a terminal command at step S133, since the part is a part concerning the server side command, it will perform processing which relates to registration of the command at steps S138 through S142.

Namely, it changes into the data of the form which analyzes the part's SOAP envelope first and can be registered into the server side command sheet (S138).

The server side command sheet for registering the server side command is created in server side command pool 142 (S139), and the server side command and command ID are registered into the server side command sheet (S140).

The contents of the server side command are registered into the items of "method name" and "input parameter" of the server side command sheet, and the command ID indicated by the part is registered into the item of "command ID". The initial value of "state" is "un-processed" and the initial value of "output parameter" is NULL.

After the registration to the above items is completed, the reference information to the handler (contained in server side command execution result creation unit 144) for performing the method stored in the "method name" of the server side command sheet is searched by making reference to the predetermined correspondence information defining correspondence between the methods and the handlers (S141). And the discovered reference information is registered into the item of "notification node of command" of the server side command sheet (S142).

After the processing up to the above step S142 is completed, if there is the next part, the processing from step S133 will be repeated for it. After the processing of steps S133 through S142 is completed for all the parts, the processing shown in the flowchart of FIG. 47 is ended.

By performing the above processings, image processing device 100 can transmit collectively the operation response to the operation request which should transmit to transfer server 102, and the operation request which received from transfer server 102 to transfer server 102.

The operation response to the operation request from transfer server 102 or server 103 and the operation request which transmitted to transfer server 102 can be collectively received and processed from transfer server 102.

After having merged after generating all the parts that should transmit here, being made to transmit and receiving all the parts, it explained that it processed by dividing this into each part, but it is not necessary to do in this way.

It is the same as that of the case of transfer server 102 that it may be made to perform processing concerning each part one by one whenever it makes it transmit one by one whenever it creates each part, or it receives each part.

What is necessary is just made to perform processing explained using FIG. 37 or FIG. 38 related to transfer server 102 as processing related to execution of the server side command related to the server side command sheet.

By the way, related to the operation request which image processing device 100 created, if it transmits to transfer server 102 for the time being, transfer server 102 will transmit to the suitable destination (server 103 grade), and will acquire and return an operation response from there.

Therefore, for image processing device 100, even if it processes transmission and reception as that in which transfer server 102 is performing operation concerning all the operation requests, it does not interfere.

Also related to the operation request which image processing device 100 receives, without grasping which device actually created, it receives from transfer server 102 and an operation response is also returned to transfer server 102.

Therefore, for image processing device 100, even if it processes transmission and reception as that in which transfer server 102 is generating all the operation requests, it does not interfere.

Explanation of the processing related to a transfer of each command and command response which are performed in image processing device 100 above is ended.

Next, the functional composition for dealing with a command and a command response to the server 103 side will be explained.

It is as having explained hardware using FIG. 10.

Figure 48:
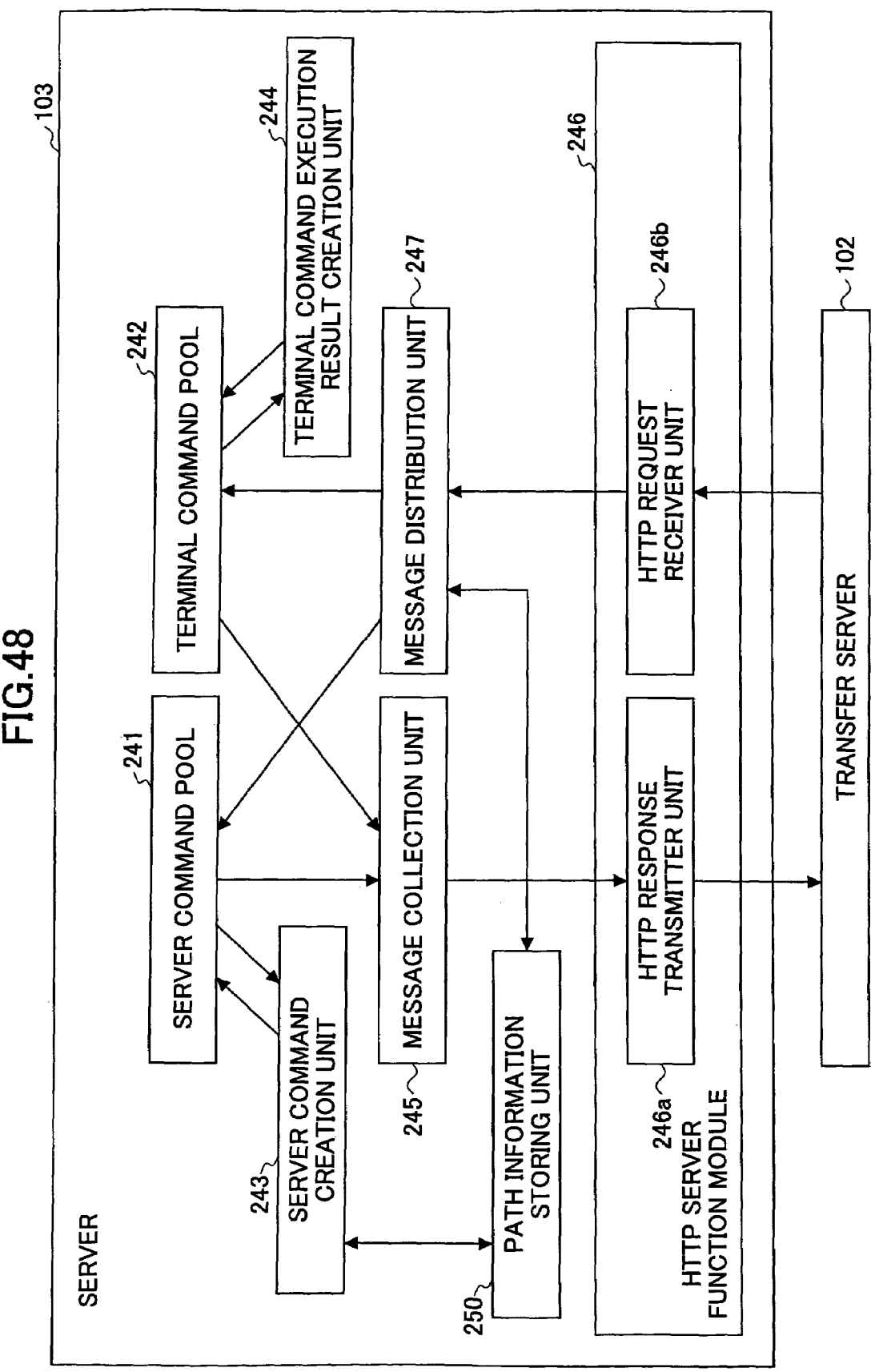
FIG. 48 is a block diagram showing the composition of the functions for performing command and command response related processes among the functions of the server of FIG. 3.

FIG. 48 is a block diagram showing the composition of the function for performing processing related to a command and a command response among the functions of server 103.

Each function shown in FIG. 48 is realized, when CPU 301 of server 103 executes a necessary control program and controls operation of each part of server 103.

And server command pool 241 and terminal command pool 242 are established in the storage unit in which rewriting like RAM303 is possible among these functions.

The function of server command creation unit 243, terminal command execution result creation unit 244, message collection unit 245, and message distribution unit 247 is realized by CPU 301.

The function of HTTP server function module 246 is realized by CPU 301 and NIC305. The path information storage unit 250 is formed in the nonvolatile storage unit in which rewriting like SD card 304 is possible. The function of each unit shown in FIG. 48 will be explained further.

Server command pool 241 is a pool which relates a server command with the response to this command, the identification information of this command, the destination of a command, the information on a transmitting agency, etc., and registers it.

The terminal command pool 242 is a pool which relates a terminal command with the response to this command, the identification information of this command, the destination of a command, the information on a transmitting agency, etc., and registers it. Server command creation unit 243 corresponds to a request creation unit, and creates a server command and the identification information (ID) which identifies this command is assigned.

The management information for managing the destination information of this command and this command is attached, and it has a function which associates these information and is registered into server command pool 241 as a server command sheet of table format.

Among these, the application with which server 103 is equipped, for example corresponds to the portion which creates a server command.

The data structure in the server command sheet of server 103 is the same as that of the data structure in the transfer server command sheet of transfer server 102 shown in FIG. 13.

Server command creation unit 243 registers not only the final destination but path information until it transmits to the destination into a server command sheet as destination information.

And this path information is acquirable from path information storage unit 250. Namely, since path information storage unit 250 made the destination of a command (or other information), and the path information at the time of transmitting a command to the destination correspond and is stored as a path information table.

By searching this path information table by using the final destination as a key, path information until it transmits to that destination is acquirable.

The example of this path information table is shown in FIG. 49. This example shows the table on which four image processing devices are registered.

And although the information on the purport that what is necessary is just to transmit a command via transfer server 102 related to image processing devices A and B is registered, related to image processing devices C and D, the information on the purport the path of which is unknown is registered.

Since it is here considered as a system configuration which does not require communication of a terminal unit from the server 103 side, when the information transmitted from a terminal unit is not once received after an operator inputs terminal unit ID based on the information on a user registration postcard etc.

Whether it have a command transmitted to the terminal unit via which transfer server 102, and since it cannot recognize, the state where path information is unknown may happen.

The information on a path information table can be automatically updated with reference to the information on the message indicated to the HTTP request which server 103 received so that it may mention later, and also the operator of server 103 can also input it manually.

Although a transfer path which is transmitted via two or more transfer servers can also be registered, it accepts one kind of path and is trying to register it related to one terminal unit.

Referring back to FIG. 48, terminal command execution result creation unit 244 corresponds to a response creation unit. And it is the application which reads and executes a terminal command from terminal command pool 242.

And the response to a terminal command is created and it has a function which relates with command ID of a terminal command, and is registered into terminal command pool 242. The terminal command is received from transfer server 102.

It relates with the management information for managing the transmission source information (it becoming the destination information of a command response) of ID which identifies this command, and this command, and this command, and is registering with terminal command pool 242 as a terminal command sheet of table format.

And the command response which terminal command execution result creation unit 244 created is also registered into the terminal command sheet related to the executed terminal command.

The terminal command of two or more kinds is read to terminal command execution result creation unit 244 from terminal command pool 242, and it is possible to provide the function which creates the response to each terminal command.

The terminal command execution result creation unit 244 may be a module which calls not the application itself but application required for execution of a terminal command, and performs a command.

The data structure in the terminal command sheet of server 103 is the same as that of the data structure in the terminal command sheet of transfer server 102 shown in FIG. 12.

Next, message collection unit 245 corresponds to a collection unit. And associate command ID and transmission source information of a terminal command corresponding to the command response which terminal command execution result creation unit 244 created, and this command response, and read from terminal command pool 242.

Command ID and destination information of the server command which server command creation unit 243 created, and this command are associated, and it reads from server command pool 241, and has a function which creates an outgoing message from these.

Related to the entry format of an outgoing message, or a generation system, it is the same as that of the thing explaining transfer server 102.

HTTP server function module 246 is provided with HTTP response transmitter unit 246a which transmits a HTTP response, and HTTP request receiver unit 246b which receives an HTTP request, and HTTP response transmitter unit 246a. It corresponds to a transmitter unit, the HTTP response containing the outgoing message which message collection unit 245 created is created as a communication response to the HTTP request which received from transfer server 102, and it has a function which transmits to transfer server 102.

An outgoing message may be included in one HTTP response how many, and the outgoing message concerning a command response and the outgoing message concerning a server command can also be made arbitrarily intermingled at this time.

Of course, the outgoing message from which the destination differs can also be made intermingled.

There is no HTTP response transmitter unit 246a, and it includes all the outgoing messages which message collection unit 245 created in one HTTP response, and it is trying to be concerned for these any being an outgoing message concerning, and to transmit.

However, providing a maximum in the number of outgoing messages included in one HTTP response is also considered.

By the way, transmission of a HTTP response does not have data read when message collection unit 245 tries read-out of a server command, a command response, etc., and also when the SOAP message which should transmit as a result is not created, it is performed.

And the trial of this read-out shall be performed when the HTTP request from transfer server 102 is received. Since server 103 does not have the HTTP client function module even if it tries read-out in scenes other than this, it is because an HTTP request cannot be transmitted itself and an outgoing message cannot be transmitted to transfer server 102.

HTTP request receiver unit 246b corresponds to a receiver unit, and has the function to receive the HTTP request from transfer server 102.

The received message which includes a terminal command and its command, associated command ID, and transfer path information in an HTTP request, a received message including the response to a server command and its command, associated command ID, and transfer path information is intermingled arbitrarily, and is contained.

Related to the entry format of a received message, it is the same as that of the thing explaining transfer server 102. Message distribution unit 247 corresponds to a distribution unit. And it has the function to distribute and register into server command pool 241 and terminal command pool 242 the data contained in the HTTP request which HTTP request receiver unit 246b received.

Specifically, a terminal command sheet is formed in terminal command pool 242, and registered to the command ID of the command and the transfer path information (it registers as transmission source information) which were related with a terminal command in response to the server command.

The server command sheet which collates with command ID of a server command sheet which has stored command ID related with the response to server command pool 241, and corresponds is specified, and it registers with the item of the "output parameter" of the server command sheet.

Also related to the data-conversion system in the case of this registration, it is the same as that of the thing explaining transfer server 102.

Next, the processing performed by server 103 which has the composition and the function in which it explained above will be explained.

Figure 50:
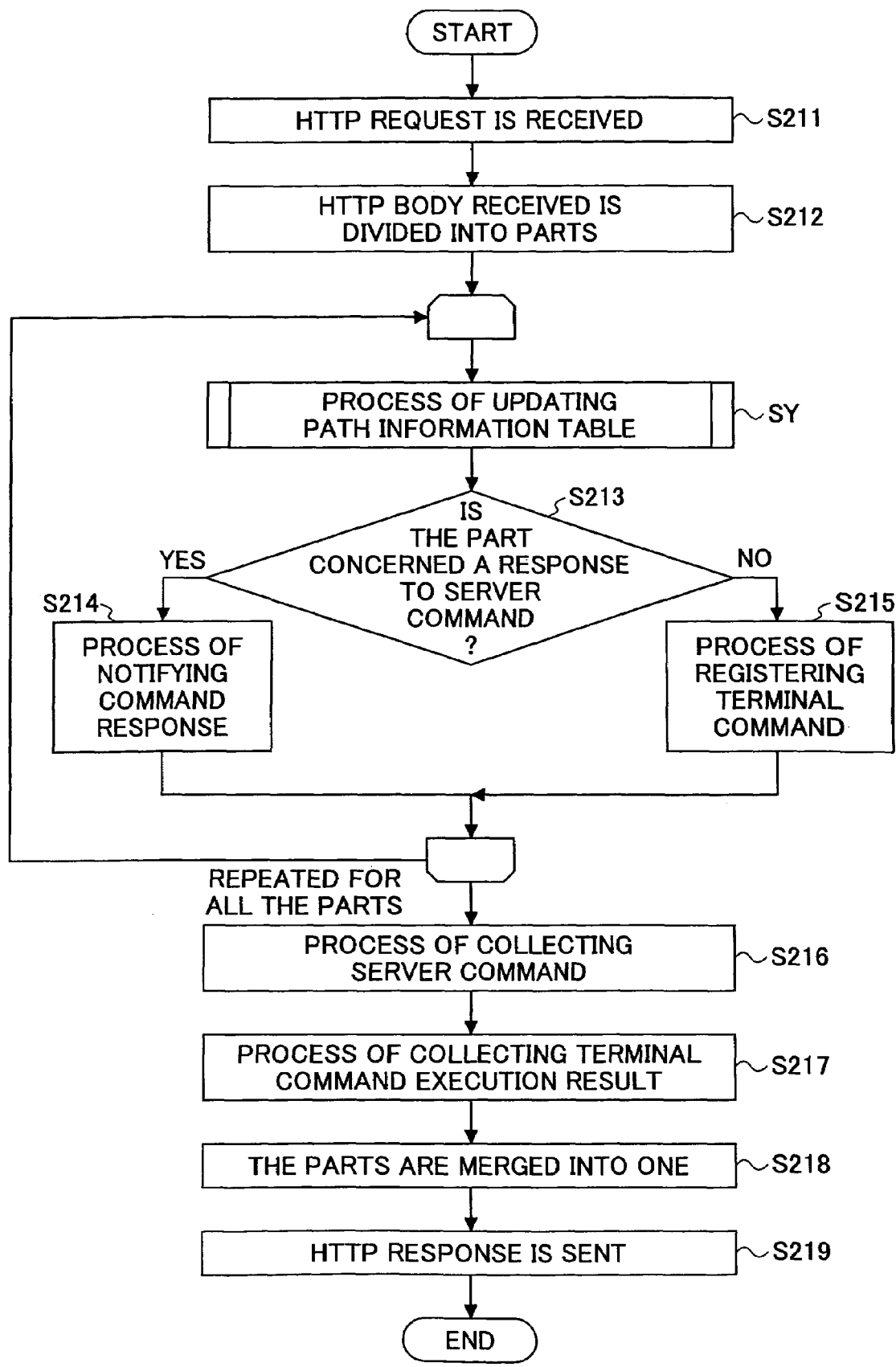
FIG. 50 is a flowchart for explaining the basic flow of the message collection and distribution processes performed by the server of FIG. 3.

Although the flowchart of the basic flow related to transmission and reception of the message between transfer servers is shown in FIG. 50, processing shown in this flowchart is performed when CPU 301 of server 103 executes a necessary control program.

CPU 301 will start the processing shown in the flowchart of FIG. 50, if an HTTP request is transmitted from transfer server 102. And the HTTP request is received first (S211).

And the HTTP body of the HTTP request which received is divided into each part (S212). Here, the division into each part is dividing into the element classified by "MIME boundary", and divides related to all the parts.

Then, step SY and processing of S213 through S215 are repeated for all the parts which divided and got as an object in order.

In this processing, the path information table update process for updating the path information table first shown in FIG. 49 is performed, and the target part determines whether you are the part which describes the response to a server command to (SY) and a degree (S213).

And if it is the response to a server command, notice processing of a response will be performed (S214). Since it is the part indicated by the terminal command when it is not the response to a server command, terminal command registration processing is performed (S215).

After step S214 or S215 is performed, the control is returned to step S213, and the processing is repeated for the next part.

And when these processings are performed related to all the parts, it progresses to the following step S216.

In the processing so far, at steps S211 and S212, CPU 301 functions as HTTP request receiver unit 246b, and it functions as message distribution unit 247 at steps S213 through S215.

Next, CPU 301 performs collection processing of a server command (S216). This processing is processing which collects the server commands which should transmit to transfer server 102 from server command pool 241, and includes the processing which creates the part by a SOAP envelope from collected data.

Next, collection processing of the terminal command execution result which is a response to a terminal command is performed (S217). This processing is processing which collects the command responses which should transmit to transfer server 102 from terminal command pool 242, and includes the processing which creates the part by a SOAP envelope from the data collected too.

Then, the part which created by processing of steps S216 and S217 is merged into one. A HTTP response including all the parts is created (S218), the HTTP response is transmitted to transfer server 102 as a communication response to the HTTP request which received at step S211, and processing (S219) is ended.

In the processing so far, at steps S216 and S217, CPU 301 functions as message collection unit 245, and it functions as HTTP response transmitter unit 246a at steps S218 and S219.

Next, the processing shown in the flowchart of FIG. 50 will be explained using the flowchart shown in details from every part.

Figure 51:
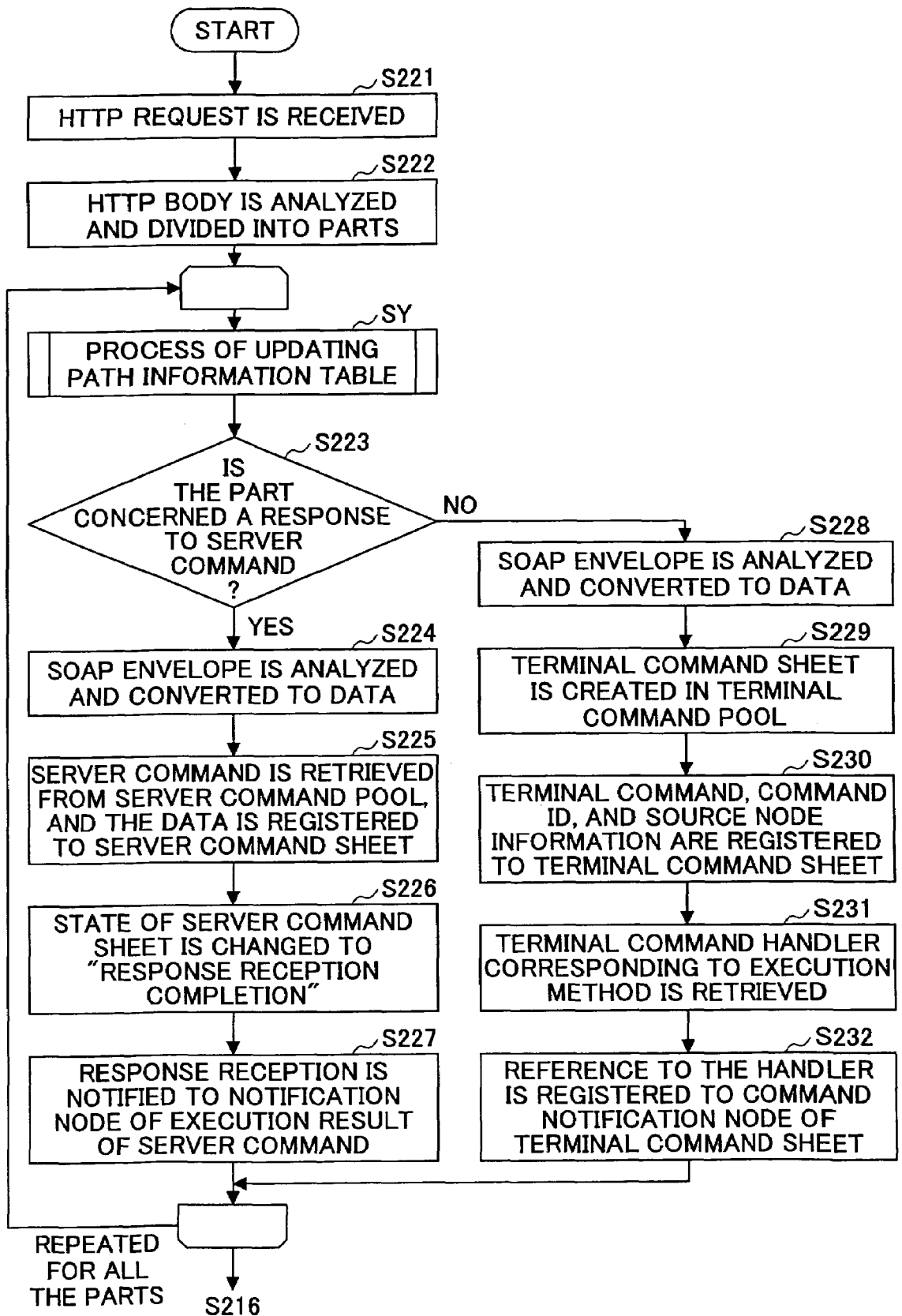
FIG. 51 is a flowchart for explaining the processes up to step S215 in the basic flow of FIG. 50.

FIG. 51 is the flowchart for explaining the processes up to step S215 in the basic flow of FIG. 50.

In this processing, CPU 301 receives an HTTP request from transfer server 102 first (S221). And if this is received, the HTTP body will be analyzed and it will divide into each part (S222).

Then, processing of step SY and step S223 through step S232 is successively repeated by targeting each part which divided and got. Related to these processings, step SY is mentioned later.

Related to step S223 through step S232, it is almost the same as that of processing of steps S133 through S142 explained using FIG. 47 related to image processing device 100.

It is the terminal command which it was the server command which was a terminal command here, and was the server side command during process of FIG. 47 fundamentally, and is only that the names of a command sheet differ in connection with it. The header of the part which the other difference is step S230 and had indicated the terminal command and entity.

It is only the point of extracting the information (the contents of the "X-Received-From" header) related to a transfer path, registering with the item of "transmission source information", and also registering the information on the source node of an HTTP request into a same clause eye as information on the latest transfer path further. Explanation is omitted related to other points.

After processing of step SY and step S223 through step S232 is completed related to all the parts, it ends and the processing shown in the flowchart of FIG. 51 progresses to the processing which corresponds after step S216 of FIG. 50.

Figure 52:
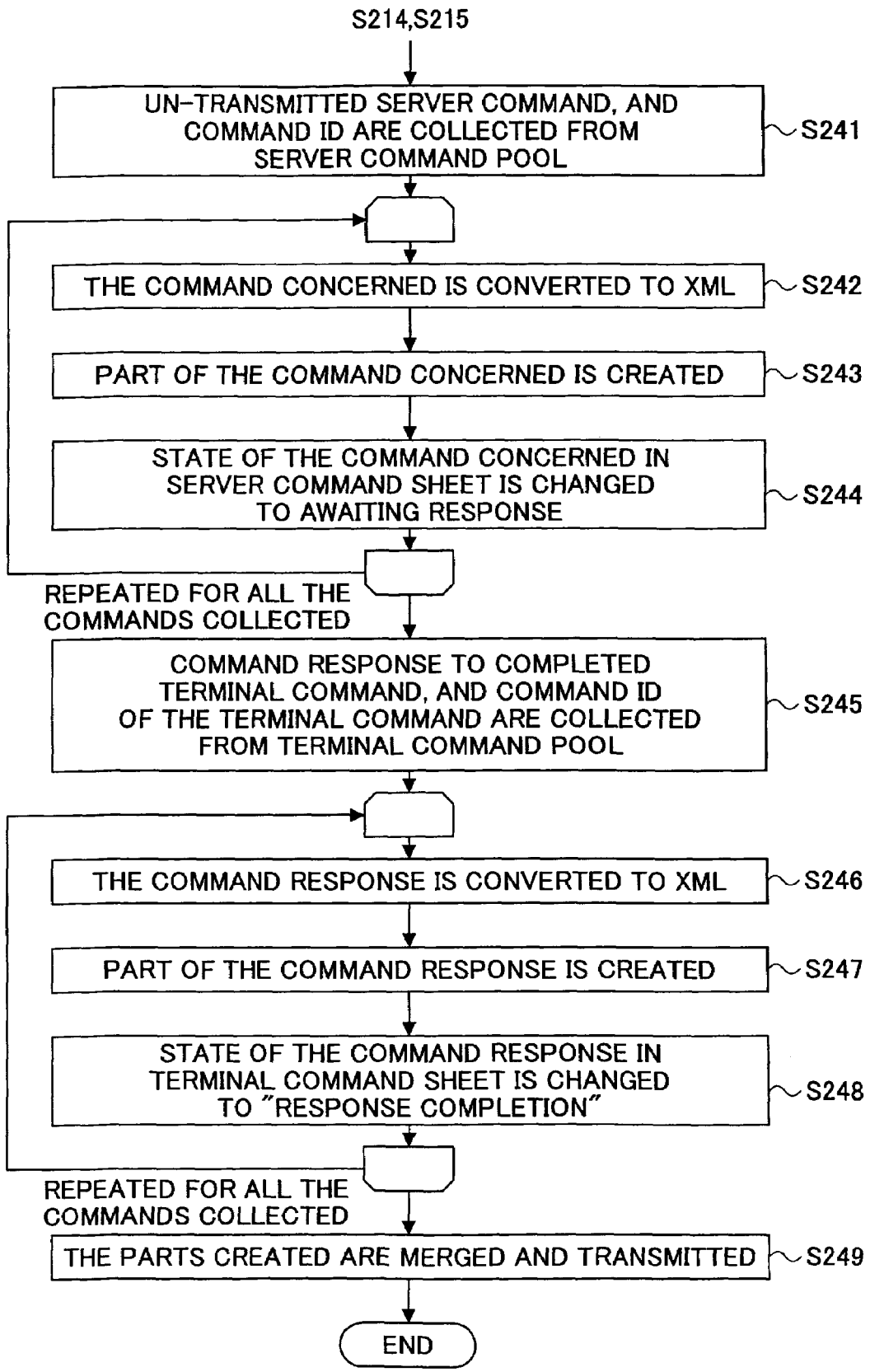
FIG. 52 is a flowchart for explaining the processes of step S216 and subsequent steps in the basic flow of FIG. 50.

FIG. 52 is the flowchart for explaining the processes of step S216 and subsequent steps in the basic flow of FIG. 50.

The processing next to step S227 or step S232 in FIG. 51 corresponds to the processing of step S241 in FIG. 52.

In this processing, CPU 301 collects from server command pool 241 the latest destination is equal to the source node of the HTTP request which received at step S211. And "state" collects the "method names" of a server command sheet and the contents of the "input parameter" "which have not transmitted" as a server command which should transmit, and the contents of the "command ID" also collect them as a command ID of the command (S241).

Since the path information which starts a transfer of a command with reference to a path information table is registered into "destination information". It can be recognized as it being the sheet with which the command which the sheet with which the information on the source node of an HTTP request is indicated as the destination transmitted directly should indicate and transmit to the HTTP response to the HTTP request from server 103 is indicated.

Since the "state" of "un-transmitting" shows what has not been notified to transfer server 102 yet after a command is created by server command creation unit 243, it can extract the command which should transmit to transfer server 102 on the basis of this.

Then, processing of steps S242 through S244 is successively repeated by targeting all the server commands collected at step S241.

In the processing, a target server command and its target command ID, it changes into the SOAP envelope contained in the SOAP body and a SOAP header, respectively (S242), and the information adds an entity header to this, and creates the part related to the target command (S243).

At step S243, the "X-Send-To" header mentioned above with reference to "destination information" to the entity header indicates the information on a transfer path. At this time, any longer, since it is unnecessary, the information on the object which is going to transmit a HTTP response from now on is not indicated.

And the "state" of a server command sheet where the target server command was indicated is changed into "awaiting response" (S244). The "state" of calling it "awaiting response" shows that it is transmitting settled related to a command at transfer server 102.

After these are all completed, CPU 301 collects from terminal command pool 242 the latest destination is equal to the source node of the HTTP request which received at step S211. And "state" collects as what should transmit the contents of the "output parameter" of the terminal command sheet which is "processing completion" among the command responses to a terminal command, and also collects the contents of the "command ID" as a command ID of a corresponding terminal command (S245).

Since the path information concerning a transfer is registered into it here when a terminal command is received to "transmission source information". It can be recognized as it being the sheet with which the command which the sheet with which the information on the source node of an HTTP request is indicated as the destination transmitted directly should indicate and transmit to the HTTP response to the HTTP request from server 103 is indicated.

Since it is shown that the "state" of calling it "processing completion" has not been transmitted to transfer server 102 yet after the processing corresponding to a terminal command is created by terminal command execution result creation unit 244, the command response which should transmit to transfer server 102 on the basis of this can be extracted.

Then, processing of steps S246 through S248 is successively repeated by targeting all the command responses collected at step S245. In the processing, the command ID is collected with a target command response and its target response.

It changes into the SOAP envelope contained in the SOAP body and a SOAP header, respectively (S246), and these information adds an entity header to this, and creates the part related to the target command (S247).

At step S247, the "X-Send-To" header mentioned above with reference to "transmission source information" to the entity header indicates the information on a transfer path.

At this time, any longer, since it is unnecessary, the information on the object which is going to transmit a HTTP response from now on is not indicated. Namely, the contents of the "X-Send-To" header should just presuppose that it is the same as that of the contents of the "X-Received-From" header indicated when a corresponding terminal command was received.

And the "state" of a terminal command sheet where the target command response was indicated below is changed into "response completion" (S248).

The "state", "response completion", shows that it is transmitting settled related to a command response at transfer server 102.

And after all the processings are completed, CPU 301 merges each part which created by step S243 or S247, and creates a multi-part's HTTP response, and it transmits to transfer server 102 as a response to the HTTP request which received (S249).

After this transmission is actually completed, it may be made to make a change of the "state" where it carried out by step S244 or S248.

Since the command and command response which were going to transmit can be again set as the object of transmission even if a communication error occurs by doing in this way, the reliability of a system improves.

Figure 53:
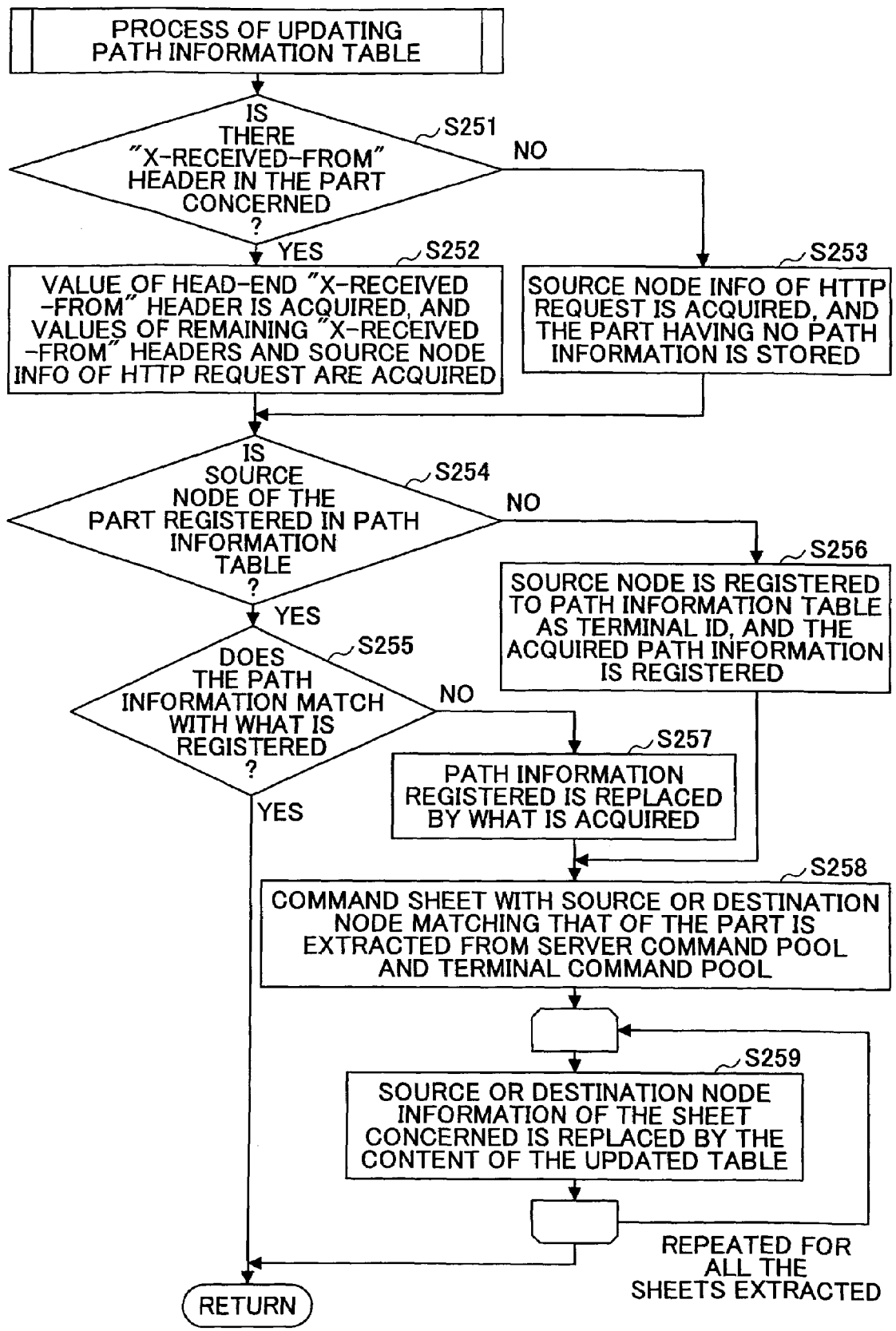
FIG. 53 is a flowchart for explaining the path information table updating process in the basic flow of FIG. 50.

Next, FIG. 53 is the flowchart for explaining the path information table updating process as shown in FIG. 50 or the like.

In this processing, CPU 301 determines whether path information is indicated to whether a candidate part has the "X-Received-From" header first and an entity header (S251).

If there is "X-Received-From" header, the value of the top "X-Received-From" header will be acquired as a candidate part's transmission source information. The transmission source information of the HTTP request which received as path information at the value of the remaining "X-Received-From" headers and step S211 of FIG. 50 is acquired (S252).

On the other hand, if there is no "X-Received-From" header, the transmission source information of an HTTP request will be acquired as a candidate part's transmission source information, and it will store that there is no path information (S253).

In any case, it is determined whether transmitting a candidate part origin is registered into the path information table (S254).

If registered, it will be determined whether path information is in agreement with the contents of registration (S255). Since it is not necessary to change the contents of the path information table if this is in agreement, processing of FIG. 53 is ended and it returns to the original processing.

When not registered at step S254, the path information acquired by step S252 or S253 is registered as path information which registers transmission source information into a path information table as a terminal unit ID, and corresponds transmitting a part origin to a path information table newly that it should register.

When not in agreement at step S255, the path information related to terminal unit ID of a transmitting agency is transposed to the path information acquired by step S252 or S253, and path information is updated.

This is included also when the original path information is unknown. In order to make the contents of updating of a path information table reflect in the command sheet already registered into the pool step S256 or after S257, destination and source node (an intermediate transfer path is not included) extracts the command sheet which is a transmitting candidate part origin (transmission source information acquired by step S252 or S253) in agreement from server command pool 241 and a terminal command pool (S258).

And processing which replaces the destination information or transmission source information of an object sheet according to the contents of the path information table after change is performed by targeting all the extracted sheets one by one (S259).

At this time, what is replaced is only a transfer path and does not change the source node of the final destination or a command.

After all the above processings are completed, the processing shown in the flowchart of FIG. 53 is ended, and it returns to the original processing.

By performing the processing explained above using FIG. 50 through FIG. 53, server 103 can transmit collectively the operation response to the operation request which should transmit to various image processing devices 100, and the operation request which received from image processing device 100 to transfer server 102.

The operation response to the operation request from image processing device 100 and the operation request which transmitted to image processing device 100 can be collectively received and processed from transfer server 102.

Even when not transmitting the communication request from server 103, an operation request and an operation response can be handed over to suitable transfer server 102 which mediates communication to image processing device 100.

After having merged after generating all the parts that should transmit, being made to transmit and receiving all the parts, it was explained that it processed by dividing this into each part. However, it is not necessary to do in this way.

It is the same as that of the case of transfer server 102 that it may be made to perform processing concerning each part one by one whenever it makes it transmit one by one whenever it creates each part, or it receives each part.

What is necessary is just made to perform processing explained using FIG. 37 or FIG. 38 related to transfer server 102 as processing related to execution of a picture device command, and same processing.

Explanation of the processing related to the handling of each command and command response which are performed in server 103 above is ended.

Figure 54:
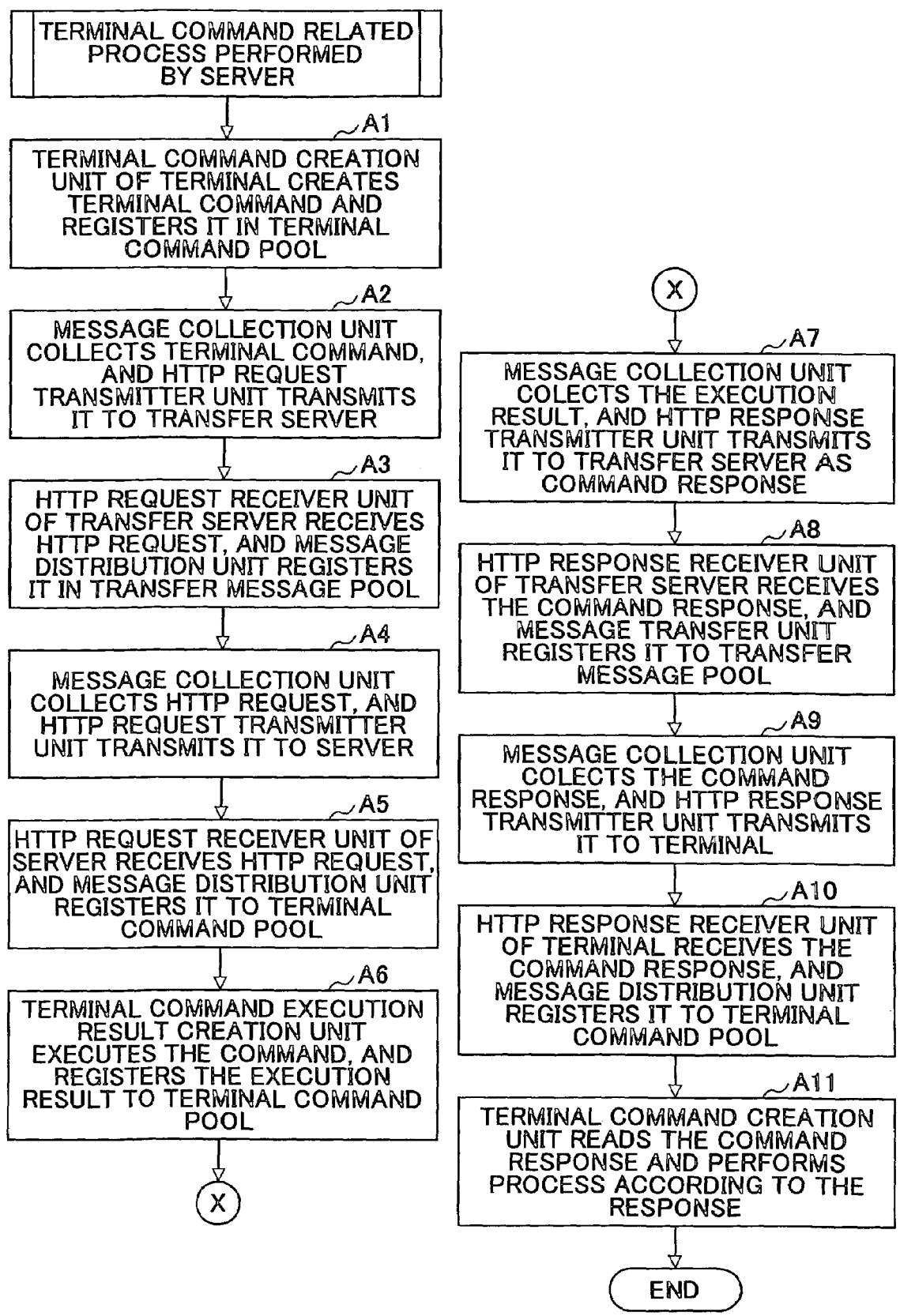
FIG. 54 is a flowchart for explaining the processes performed by the respective elements of the remote management system of FIG. 3 when the image processing device creates a terminal command to be executed by the server and receives a command response to the terminal command.

FIG. 54 shows the processes performed by the respective elements of the remote management system of FIG. 3 when image processing device 100 creates the terminal command to be executed by server 103 and receives the response to the terminal command.

Figure 55:
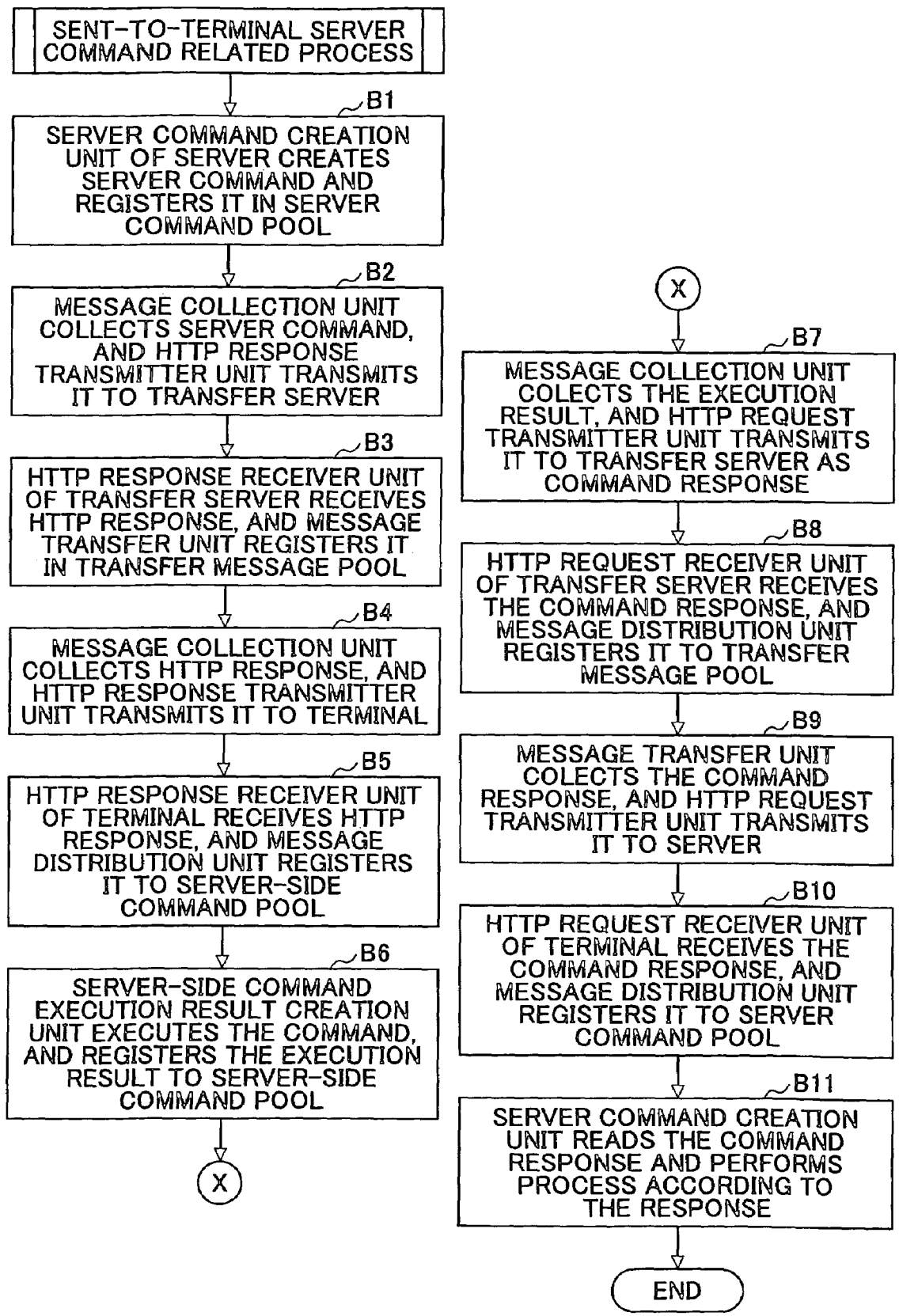
FIG. 55 is a flowchart for explaining the processes performed by the respective elements of the remote management system of FIG. 3 when the server creates a server command sent to the image processing device and receives a command response to the server command.

FIG. 55 shows the processes performed by the respective elements of the remote management system of FIG. 3 when server 103 creates the server command sent to image processing device 100 and receives the response to the server command.

In these figures, the processes shown are the same as corresponding processes described in the foregoing, and a detailed description thereof will be omitted.

In the remote management system explained above, transfer server 102 can perform by performing such processing mediating the command between server 103 and image processing device 100, and transmission and reception of a command response. It sets to this remote management system so that the above explanation may show.

By forming transfer server 102 and having been made to perform communication between image processing device 100 and server 103 via this transfer server 102, even when image processing device 100 does not recognize existence of server 103 and it is not recognized whether a command and a command response are what should finally be transmitted to which device, the command and command response which image processing device 100 transmitted can be transmitted to the suitable destination.

This is because transfer server 102 appoints the suitable destination according to the classification and it is trying to transmit the command and command response received from image processing device 100.

The burden of the destination information management in image processing device 100 which is a terminal unit installed in the customer side environment can be reduced. That is, when changing the composition of the service which transfer server 102 and server 103 by the side of functional offer provide, related to change of a command and the transfer path of a command response, it can respond only by changing the contents of the destination table which transfer server 102 has stored.

That is, since it can respond by the maintenance only by the side of service provision, destination information management is very easy.

Although dividing a command into a group and managing it hierarchical is often performed, even when defining the correspondence relation between classification and the destination for every group and a command is added or deleted within the same group, it is not necessary to change the destination table.

Therefore, the management burden of the destination information in transfer server 102 can also be reduced. And since the command in the same group is processed with the usually same application, a problem in particular does not usually arise considering the destination as the same.

Since the data standardized by XML can be transmitted and received if a command and a command response are indicated as a SOAP request and a SOAP response, the data transmitted and received is effectively recyclable.

That is, the received data can be registered into an in-company system, or processing which creates automatically the homepage which displays the data received using technology, such as XSLT (XML stylesheet language transform), can be performed easily.

In a SOAP message, although defining the name space of a tag is often performed, if the destination is specified for every name space of the tag concerning a command or a command response, management of the destination is easy again.

In this case, the fineness of a classification does not necessarily need to be the same at the name space concerning specification of the destination, and the name space concerning the definition of a name-space prefix.

By taking the composition explained above in each device which constitutes a remote management system, neither the operation request which should be transmitted and received between each device, nor an operation response is depended on any of an operation request or an operation response they are, or where the final destination is but can be transmitted and received collectively.

Related to transmission of an operation request, and transmission of an operation response, negotiation can be performed separately, it is not necessary to establish a communication connection for every final destination, a communication overhead can be reduced, and communication efficiency can be raised.

If the operation request and operation response which the number of image processing devices 100 increases, and should be transmitted between server 103, transfer server 102, and image processing device 100 increase, this effect will become large indeed.

Especially for image processing device 100, since all the operation requests and operation responses can be collectively transmitted between transfer servers 102, communication timing management also becomes easy.

An operation request and an operation response can be collectively transmitted because these were changed into the data serialized, respectively and it has changed into the outgoing message indicated in structured language form.

By having done in this way, the operation request and operation response which differ in a format can be combined easily, and it can transmit as one transmitting contents logically.

And by having done in this way, the operation request and operation response which each device received collectively are easily divided into each message, it is an operation request, it is an operation response, or suitable processing can be performed according to the classification and destination.

It expresses in the form which can combine two or more operation requests and operation responses, respectively, without changing form, and can create one message which can be transmitted.

After having been combined by more than one, if it is made to become the form which can divide, without changing form and can be returned to each operation request and operation response which can be transmitted, the processing load at the time of performing combination and division of an operation request or an operation response can be reduced.

Communication between image processing device 100 and transfer server 102 is performed by transmitting the request from image processing device 100 and transmitting the operation request from the transfer server 102 to image processing device 100 etc.

If it is made to carry out as a response to the communication request, even if it is a case where image processing device 100 is formed inside the firewall, transmission and reception of an operation request and an operation response can be performed without being conscious of existence of a firewall.

Since a communication request and a communication response correspond, timing management on communication level is easy. In this case, if the communication request is periodically transmitted to transfer server 102 from the above-mentioned image processing device 100, the situation where transmission of the information towards image processing device 100 covers a long time, and stagnates from transfer server 102 can be prevented.

Similar to communication between transfer server 102 and server 103, if it is made to communicate by always sending the communication request from transfer server 102, even if it is a case where it is not managed which transfer server can serve as a communication partner by the server 103 side, transmission and reception of an operation request and an operation response can be performed satisfactorily.

Therefore, the management burden of the communication destination by the side of server 103 can be reduced.

In this case, if the communication request is periodically transmitted to server 103 from the above-mentioned transfer server 102, the situation where transmission of the information towards transfer server 102 covers a long time, and stagnates from server 103 can be prevented.

The command pool which registers the operation request which self performs in each device, and the command pool which registers the operation request which self created are provided.

It can carry out by storing the operation request and operation response which each application etc. created or received from other device in these pools, without taking into consideration send timing as opposed to the destination for generation and transmission and reception of an operation request or an operation response.

Therefore, timing management of processing can be simplified and a design and development become easy.

When communicating by establishing the collection unit which reads the operation request which should transmit to a communication partner, and an operation response from a pool even when it does in this way, it cannot leak and the information which should be transmitted can be transmitted.

By establishing the distribution unit which separates respectively the operation request and operation response which received, and a suitable pool is made to store, and also storing the received information in the pool. A transfer of execution of operation concerning the operation request which received, the processing after operation response reception, an operation request, and an operation response can be performed without taking into consideration the receiving timing from a communication partner.

Therefore, timing management can be simplified and a design and development of device become easy.

The identification information, such as ID, is given to the created operation request, and an operation request is stored.

If it is made to carry out by relating with the identification information of an operation request also when it is made to carry out by relating with this identification information when transmitting, and memorizing an operation response and transmitting.

Even when including two or more operation requests and operation responses in one message (here HTTP message), the correspondence relation between an operation request and an operation response can be easily recognized through the identification information.

Priority is given to an operation request, if this performs sequentially from a high thing or transmits a response, operation which requires emergency is performed preferentially and the response can also be returned preferentially.

In transfer server 102, a transfer message pool is provided, and if that in which self creates or performs the operation request and operation response which only mediate a transfer is divided and it is made to register, processing different from the other message related to the message concerning a transfer can be performed.

For example, since the message concerning a transfer does not need to interpret the contents (for example, it is not necessary to deserialize XML), it can be registered into a transfer message pool in the form of having received.

A retrieving range can be narrowed also when searching the message which should be transmitted to server 103. Therefore, the processing burden of the message transfer agency processing in transfer server 102 can be reduced by providing a transfer message pool.

Next, the modification of an embodiment mentioned above will be explained.

First, in the embodiment mentioned above, although the example which transmits and receives only one message via transfer server 102 between the terminal unit and server 103 like image processing device 100 was explained, of course, it may be made to transmit and receive via two or more transfer devices.

Figure 56:
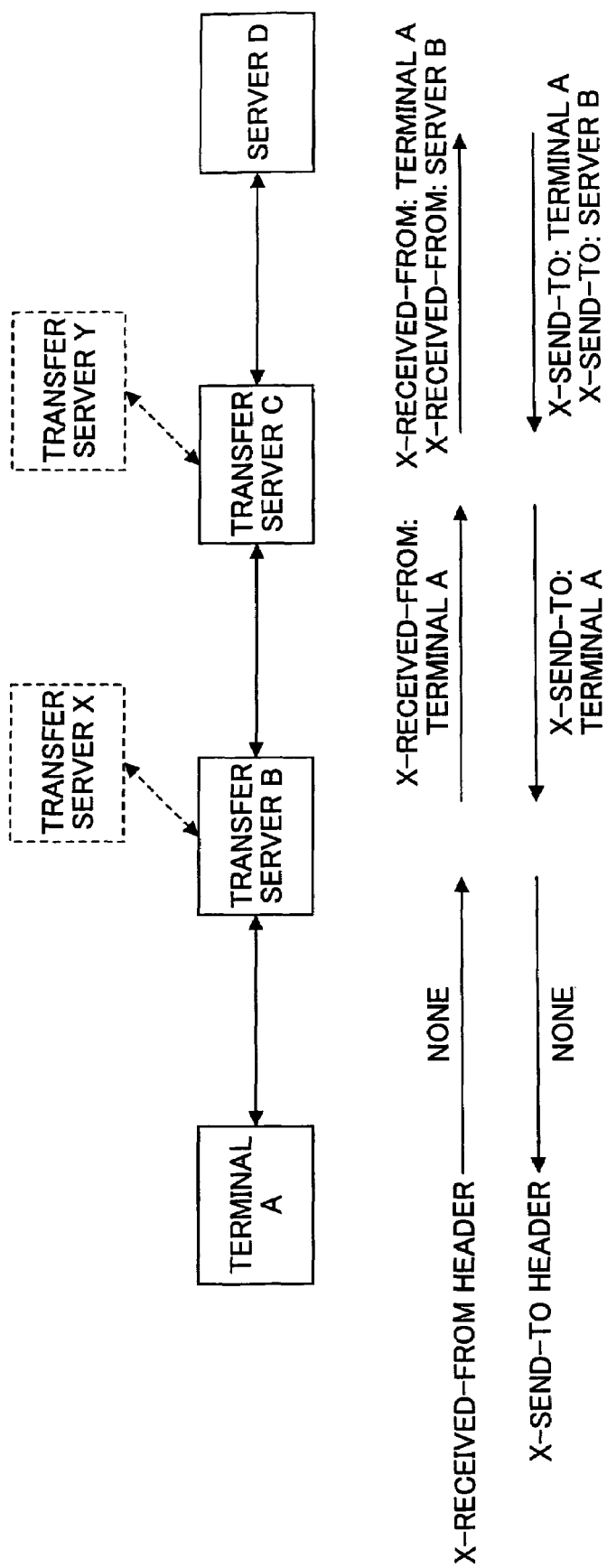
FIG. 56 is a diagram showing the composition of another embodiment of the distributed processing system of the invention.

FIG. 56 shows the example of such a distributed processing system. The terminal A can transmit in this example and receive a message between server D via two transfer servers, transfer server B and transfer server C.

In this case, the function of transfer servers B and C is the same as that of transfer server 102 in the embodiment mentioned above. The function of server D is the same as that of server 103.

In this case, the message transmitted in the direction which goes to a server from a terminal unit shall be indicated to the communication request, and shall indicate and transmit the message transmitted to an opposite direction to the communication response to the communication request.

Which device becomes settled relatively related to each transfer server which communication device is the second communication device with the first communication device.

A partner's device with which the device which transmits the communication request to a transfer server specifically transmits the first communication device, and a transfer server transmits the communication request turns into the second communication device.

Or the device which transmits the message the device which transmits the message which has not indicated the destination has indicated the first communication device and the destination to be can also consider the second communication device.

In the distributed processing system, that destination is transfer server C related to the message of the classification which should be transmitted to transfer server B at server D, and storage is carried out (it is not necessary to make it store where finally this is transmitted).

And the destination is server D related to the message of the classification which should be transmitted to transfer server C at server D, and storage is carried out. Thus, by setting up the destination, the message transmitted to transfer server B can be further transmitted to server D via transfer server C from terminal unit A.

When this is further transmitted to the message transmitted to transfer server B from terminal unit A at transfer server C at this time, the information on "terminal unit" is indicated to the "X-Received-From" header as transmission source information.

When this is further transmitted to server D, the information on "transfer server B" is added to the following "X-Received-From" header as transmission source information.

Server D can recognize that transfer server C is also a transfer path from the transmission source information of the HTTP request this message was indicated to be.

Therefore, it turns out that what is necessary is just to make the message which transmits to terminal unit A by the server D side transmit in the path of transfer server C->transfer server B->terminal unit A.

Then, server D can indicate the path information by the "X-Send-To" header in the message which transmits to terminal unit A (it is not necessary to indicate the information on transfer server C used as the direct destination).

Thus, if it sets, with reference to this path information, the transfer server which hits a transfer path can transmit a message to the next destination, and, finally can transmit a message even to terminal unit A.

At this time, the path information which shows the destination is eliminated when transmitting a message, and the next destination is made to be shown in the bottom.

The contents of the "X-Received-From" header indicated in the above composition in the message transmitted towards a server from a terminal unit so that the statement of FIG. 56 may show, it becomes the completely same thing as the contents of the "X-Send-To" header indicated in the message which turns the same path to a terminal unit from a server, and is transmitted.

Although the embodiment mentioned above explained the example which the addition of the "X-Received-From" header is a receiving side, and performs deletion of the "X-Send-To" header by a transmitting side, doing in this way is not indispensable.

On the contrary, the "X-Received-From" header may be added by a transmitting side, and it may be made to delete the "X-Send-To" header by a receiving side.

Figure 57:
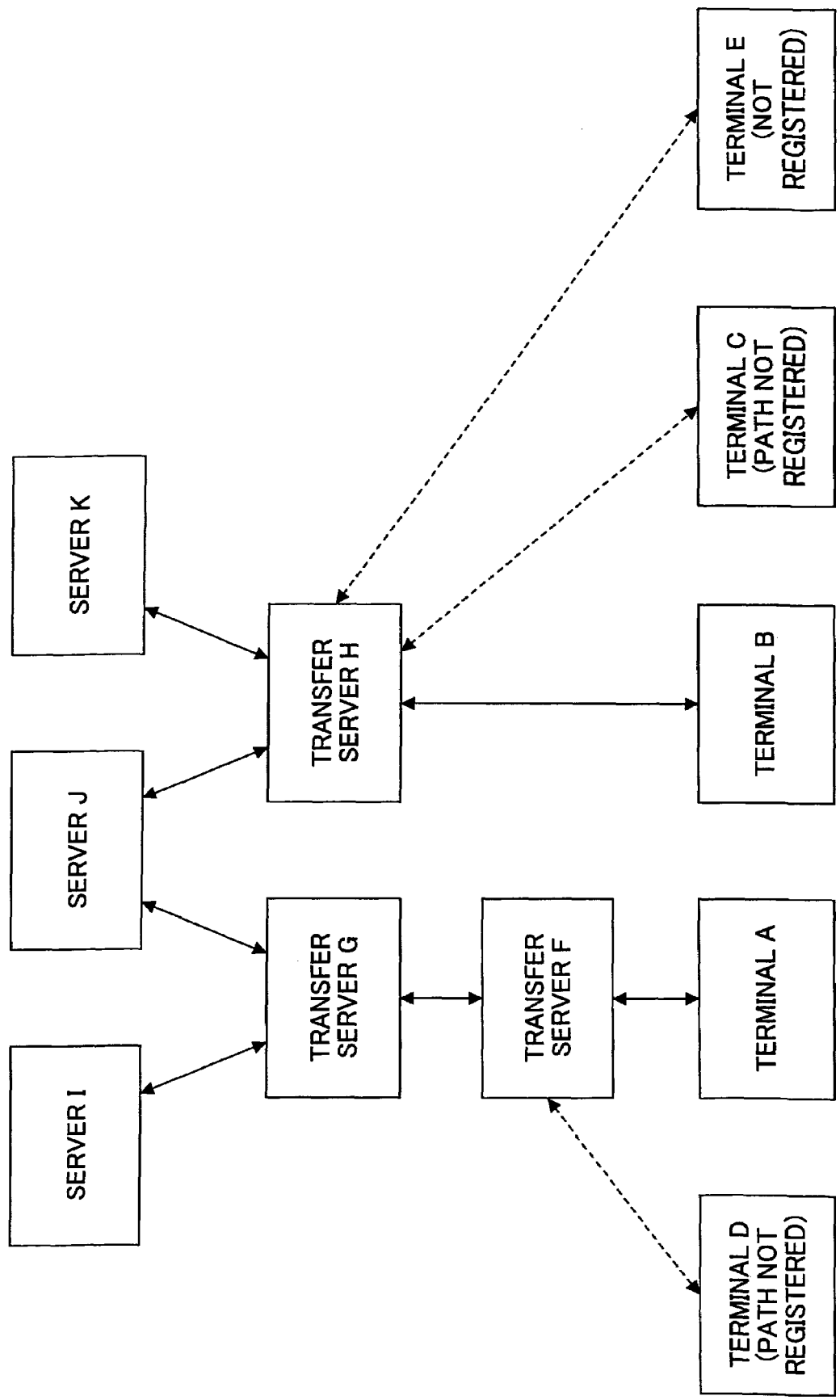
FIG. 57 is a diagram showing the composition of another embodiment of the distributed processing system of the invention.

FIG. 57 shows another example of the composition of the distributed processing system.

As shown in FIG. 57, in the distributed processing system of the invention, the number of the transfer servers which carry out direct communication to a terminal unit does not need to be one.

It is not necessary to be the composition which transmits and receives a message only among one transfer server also with a server.

It is as having mentioned above that one transfer server may transmit and receive a message among two or more terminal units.

Even if it does in this way, in the message transmitted towards a server from a terminal unit, the information on a transmitting agency and a transfer path is indicated.

Since the information on a transfer path and the destination is indicated in the message which the intermediate transfer server has stored the information on the destination for every classification of a message, and transmits towards a terminal unit from a server, if these are referred to, a message can be transmitted to a suitable partner.

In the distributed processing system of such composition, the path information table in server J comes to be shown in FIG. 58. That is, related to terminal unit A, it can recognize by the server J side that a message can be transmitted by a transfer path like terminal unit A<=> transfer server F<=> transfer server G<=> server J.

Related to terminal unit B, it can recognize that a message can be transmitted by a transfer path like terminal unit B<=> transfer server H<=> server J. Related to terminal units C and D, the path has not been registered yet.

However, if server J receives the message from terminal unit D, for example, from the information on the transfer path of the message, the path of terminal unit D<=> transfer server F<=> transfer server G<=> server J can be recognized, and this can be registered into a path information table.

When the message from the terminal unit which is not registered into a path information table is received like terminal unit E, similarly, from the information on the transfer path of a message, the path of terminal unit E<=> transfer server H<=> server J can be recognized, and this can be registered into a path information table.

However, an error is returned to the message from the terminal unit which is not beforehand registered into a path information table, and correspondence which is not registered is also newly considered by the path information table.

It cannot be overemphasized that various composition can take as a distributed processing system besides the composition shown in FIG. 56 or FIG. 57.

However, if a message is made into ability ready for sending from one terminal unit at two or more transfer servers, it will be necessary to manage the destination of a message by the terminal side.

Then, it is preferred to make a message into ability ready for sending from each terminal unit only at one transfer server.

In these distributed processing systems, it is not necessary to necessarily distinguish a server and a transfer server also including the distributed processing system of the embodiment mentioned above.

And when doing in this way, the function of these servers should just add the function related to path information storage unit 250 by which server 103 was explained to the function which explained transfer server 102 by the embodiment.

In the device with which any information other than itself is not registered into a destination table as the destination, all processings concerning all the operation requests and operation responses which receive will be performed by itself, neither the message pool for a transfer nor a message transfer unit will be used, and it will function as a server as a result.

Therefore, since the same device can be arbitrarily operated also as any of a server and a transfer server only by changing the contents of the destination table if it does in this way, structure-of-a-system change becomes easy.

It is also possible not to provide the function which performs processing concerning an operation request to a transfer server, or creates an operation request, but to use a transfer server as the device which specialized in agency of a message conversely.

When it does in this way, the terminal command pool, the transfer server command pool, the terminal command execution result creation unit, and the transfer server command creation unit are unnecessary.

Therefore, the composition of a transfer server can be simplified, the time and effort of a design or development can be reduced, and low cost construction can be attained.

The communication request is transmitted from a server to a transfer server, and making it possible to indicate and transmit the message which starts the communication request as an operation request or an operation response is also considered.

In the embodiment mentioned above, as a destination table in transfer server 102, as shown in FIG. 34, the example which uses what indicated the information on the destination of the message concerning the command or command response belonging to the name space was explained for every name space URI.

However, transmitting the message at which the destination is not clearly appointed in the destination table to the predetermined destination is also considered.

When doing in this way, as shown in FIG. 59, the item of "default" is provided in a destination table.

When neither the command nor name space URI of the command response is registered into a destination table, it is possible to transmit the message concerning the command and command response to the destination registered into the "default" column.

And in message distribution processing as shown in FIG. 33 in this case, when name space URI is not registered into a destination table at step S22, it is good to be made to make the destination of a candidate part's message into the destination registered into the "default" column.

Figure 60:
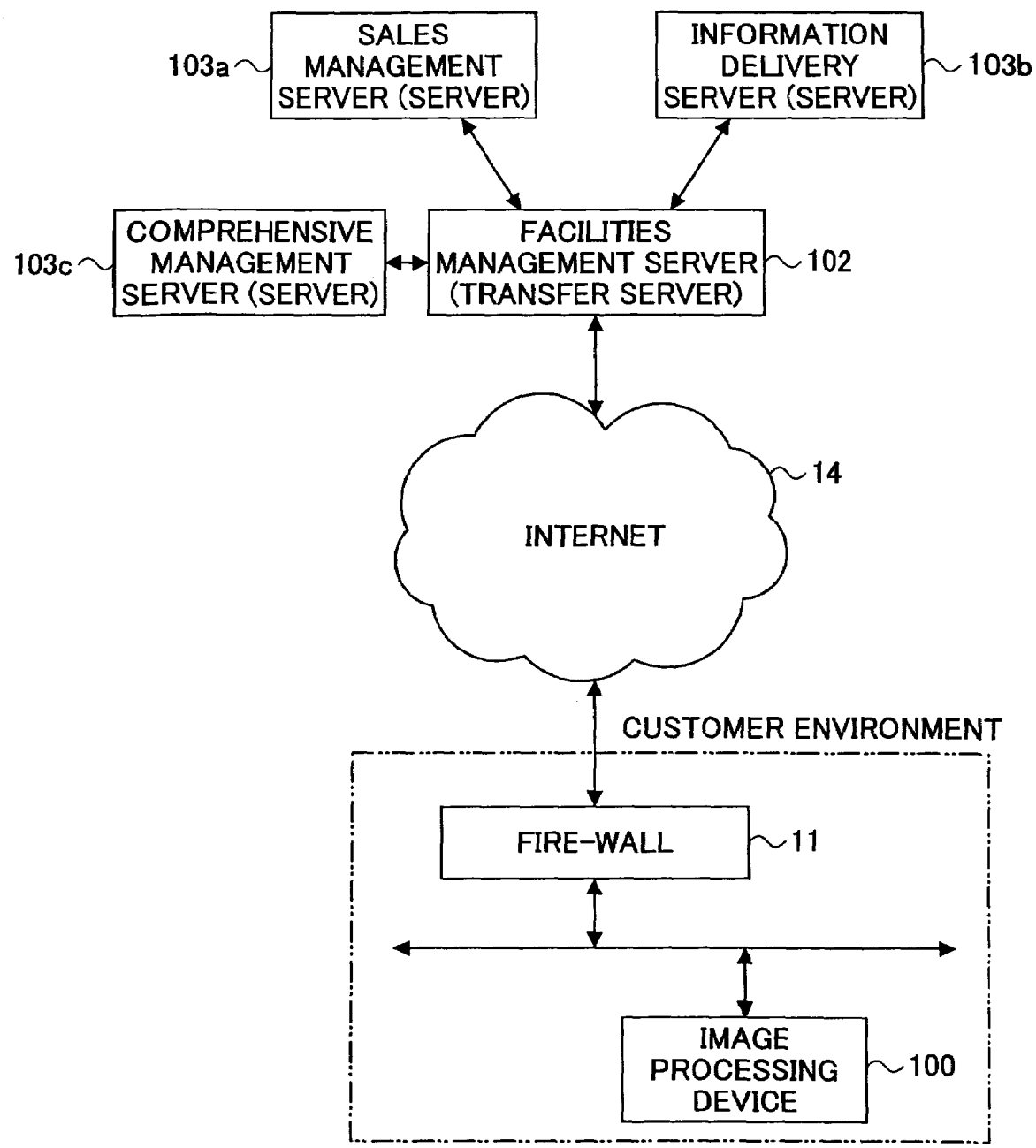
FIG. 60 is a block diagram showing the composition of the distributed processing system when the destination table of FIG. 59 is used.

As a system configuration using the destination table shown in FIG. 59, the composition shown, for example in FIG. 60 can be considered. That is, in the distributed processing system shown in FIG. 3, it is the composition of having added and formed comprehensive managing server 103c.

And the destination table shown in FIG. 59 is stored in the facilities management server 102. What is processed with the facilities management server 102 transmits all the messages that are not what is transmitted to the sales management server 103a or the information delivery server 103b, either to comprehensive managing server 103c.

Since it is necessary in transfer server 102 to cease to specify the destination information according to all the commands and command responses which can be treated by doing in this way, a design and management of a system become easy.

In this case, it is not necessary to process by itself the message which comprehensive managing server 103c received, and may be made to transmit to the device of further others.

The destination table which comprehensive managing server 103c uses in that case may have an item of "default" as shown in FIG. 59 also by a thing without the item of "default" as shown in FIG. 34. Making the destination registered into the item of "default" into the same thing as the destination which makes correspond with one of name spaces URI, and is registered into the destination table is also considered.

Using the destination table as shown in FIG. 61 in each transfer server is also considered. That is, the transfer server itself is registered as the destination only related to the command and command response which should be processed by itself, and transmitting all of the other command or a command response to the following transfer server is also considered.

Figures 62, 63:
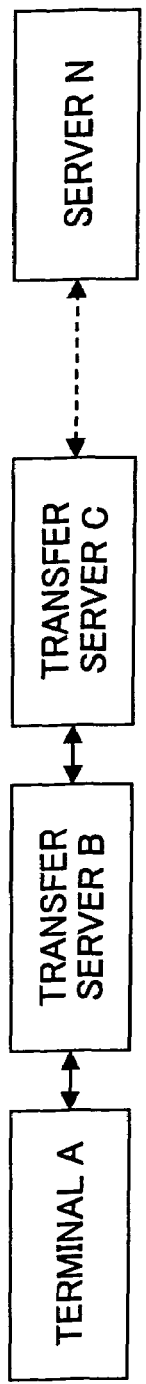
FIG. 62 is a diagram showing the composition of the distributed processing system when the destination table of FIG. 61 is used.
FIG. 63 is a diagram showing an example of the data which can be used instead of the destination table, when the distributed processing system is constituted as shown in FIG. 62.

In this case, a distributed processing system is constituted, as shown in FIG. 62, two or more transfer servers are arranged in series, and each transfer server can transmit the message concerning commands other than what should be processed by itself, or a command response to the following server one by one.

Thus, since what is necessary is just to make each transfer server store only the command which should be processed by itself, the information on a command response and other commands, and the destination of a command response if a system is constituted, a design and management of a system become still easier.

Since each transfer server does not need to know how a message will be processed in the transfer server and server of the destination of a message, in the transfer server and server of the destination, the kind of command and the assignment of processing to receive can be defined freely, without notifying to the transfer server of the source.

Therefore, since the company which received the order of processing can constitute a system freely if such composition is adopted when the company which provided the transfer server outsource processing concerning a message to a separate company and the company which received the order of the subcontract takes out processing to a sub-subcontract further, it is especially effective.

If it is made not to provide the item of "default" in a destination table and name space URI is made to perform error processing in server N of a final stage to the command and command response which are not registered into a destination table Suitable correspondence is attained also related to the command which is not related at all.

As long as what is necessary is to be able to respond only to the composition which has arranged two or more transfer servers directly as shown in FIG. 62, it may be made to make information as replaced with a destination table at each transfer server and shown in FIG. 63 store.

That is, it may be made to make name space URI to which the method processed by itself belongs, and ID of the destination server which transmits the other command etc. store.

Figure 64:
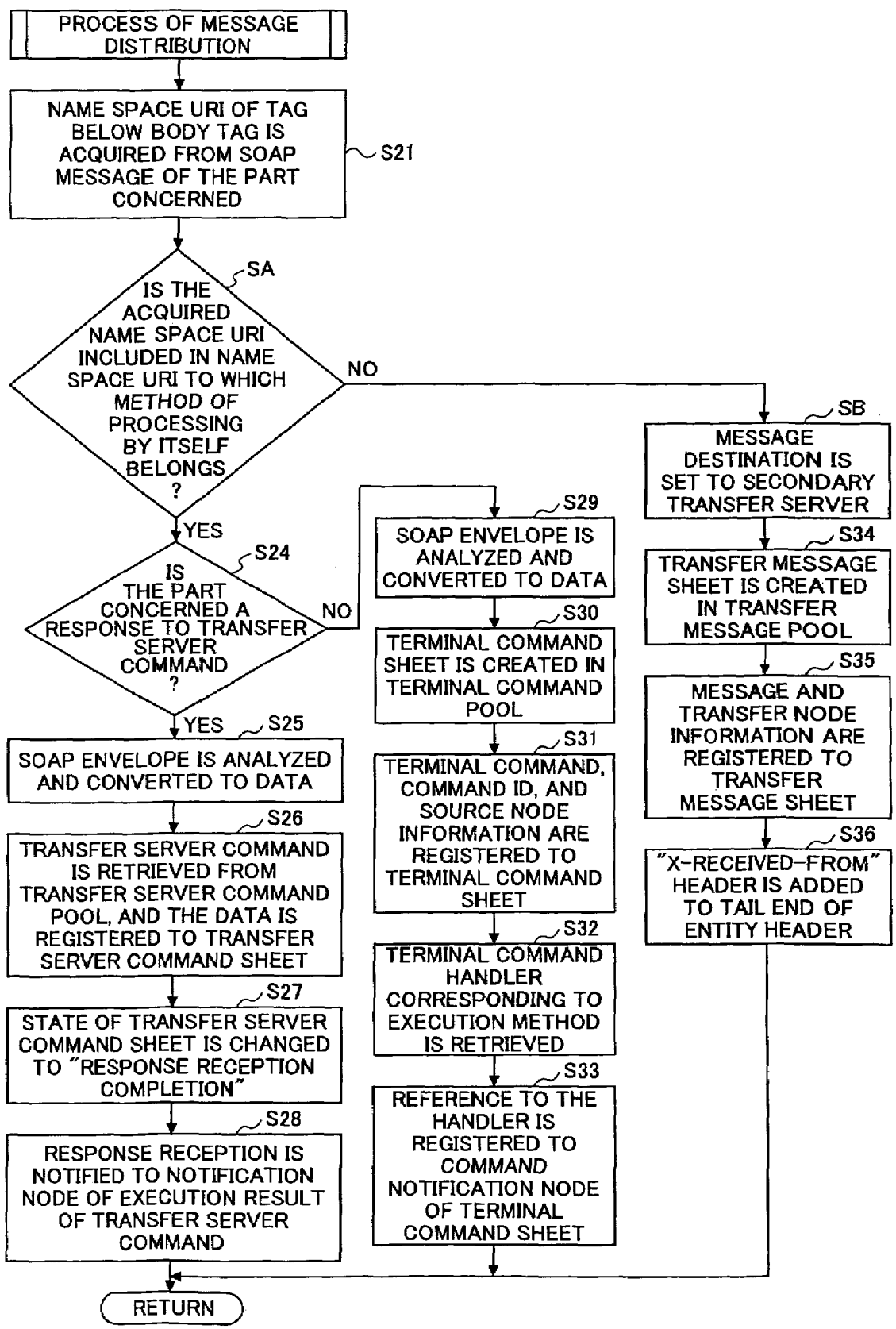
FIG. 64 is a flowchart for explaining the message distribution process performed when the data of FIG. 63 is used, which corresponds to the flowchart of FIG. 33.

The flowchart of processing in the case of dealing with the message which received using information as shown in FIG. 63 is shown in FIG. 64.

The processing shown in FIG. 64 is replaced with steps S22 and S23 of the processing shown in FIG. 33, and is made to perform processing of step SA and step SB.

That is, when using the information shown in FIG. 63, in the message distribution processing in the basic flow of the message transmission and reception shown in FIG. 32, it is made to perform processing shown in FIG. 64.

And at step S21, acquire name space URI of the command concerning the message, or a command response from a candidate part's SOAP message, and at step SA, the name space URI determines whether it is contained in "name space URI to which the method processed by itself belongs" shown in FIG. 63.

And when contained, since the command or a command response should be processed by itself, it progresses to less than step S24, and performs the same processing as the case of FIG. 33.

Since the command or command response should be transmitted to the following transfer server when not contained, the destination of a message is set as the "following transfer server" registered as "destination server ID" shown in FIG. 63 at step SB, it progresses to less than step S34, and the target message is registered into transfer message pool 51 for transmission.

If it is made to make each transfer server perform the above processings, a message can be made to transmit appropriately only for information as shown in FIG. 63.

What is necessary is to collect all the messages registered into transfer message pool 51 for transmission, when performing message transfer processing as shown in FIG. 39, and just to make it transmit to the predetermined destination, since there is only one server of the destination when such processing is adopted.

Therefore, it is not indispensable to manage the destination of a message in a transfer message sheet as shown in FIG. 14, either. Two or more servers are registered as "destination server ID", and it may be made for random etc. to distribute the destination of the message concerning the command which should be transmitted to other servers to each server in the receiving origin of the scheduling and message according to the receiving date of the message.

If it does in this way, it can prevent that a message concentrates on the server of the destination, and distribution of processing load can be aimed at. It may be made to perform processing with the same said of a command response.

In this case, if each device which may finally receive a message pools the message which formed the database which can be referred to in common and received, even if a command response does not reach the device of the source node of a command, refer to the command response for the device of a transmitting agency by accessing a database.

Even if it is a message concerning the command which can be processed by itself, when a resource required for processing by self cannot secure enough, it may be made to transmit to other servers depending on the case.

When doing in this way, it is good for the server of the destination to provide the function to process the same command as the server of the source.

When processing load is focusing on some servers, two or more efficient servers can be made to distribute processing by simple processing, if it does in this way.

In the embodiment mentioned above, although the example which transmits the message between each device by a multi-part was explained, doing in this way is not indispensable.

For example, the command dealt with by the system returned from the terminal unit to the transfer server or the server case. The processing which was explained to one HTTP request or a HTTP response using FIG. 41 in system 102 which indicates only one SOAP message, for example, a transfer server, and may be used.

Since it will become unnecessary to make each device correspond to a special transfer protocol like a multi-part if it does in this way, the time and effort of a design or development can be reduced and low cost construction can be attained.

If it is made to perform a transfer according to the above multi-parts only also as what turned to the transfer server or the server the command dealt with by the system from the terminal unit, the effect mentioned above can be acquired similarly.

Although SOAP was adopted in each embodiment mentioned above as a higher-level protocol which realizes RPC, application operated the pool directly and RPC is realized between the application and the pool, by having a bridge (message conversion function) with CORBA (Common Object Request Broker Architecture) or JAVA (registered trademark) RMI (Remote Method Invocation). The development efficiency of application may be raised further.

In the embodiment mentioned above, although carried out by the SOAP message described by XML, the command between each node and the exchange of a command response to this are not restricted to this, and may be described by in the form of others. A limit may be provided in the command transmitted and received or the amount of information of a command response.

If the amount of information of the command received especially is restricted, when a receiving side is the device with which memory space was restricted, the amount of the memory used can be stopped.

By adding and adopting as this not only the standard protocol for SOAP but the original protocol which combined SOAP and a MIME multi-part in the embodiment mentioned above, the SOAP envelope contained in an HTTP request or a HTTP response is treated as what completely became independent. By the SOAP attachment defined as related specification of SOAP, the link to the SOAP envelope after the second part may be embedded at the first part's SOAP envelope contained in a HTTP response, and it may have composition which associates and hands these over. It is also the same as when adopting SMTP.

When adopting SMTP as a transfer protocol of a message, a message will be indicated and transmitted to an E-mail, but it is possible to indicate two or more messages to the E-mail of one copy using a MIME multi-part etc.

Therefore, it can replace with the HTTP request and HTTP response which were mentioned above, and an E-mail and the E-mail of the reply can be used. However, since there is no correspondence relation like needed information and a response to an E-mail, it is necessary to manage the timing of the transmission to begin and the reply to it independently.

It is more desirable to use HTTP as a transfer protocol for smooth employment of a system, since the attainment to the destination may take a long time to an E-mail.

Although here explained is the example which connected image processing device 100 and transfer server 102 via the Internet 14, cable and radio resources cannot be needed besides this but the various communication paths in which network communication is possible can be used.

Similarly, various communication paths between transfer server 102 and server 103 can be used. It is not restricted to what explained above and the invention can be applied also to distributed processing systems other than a remote management system and arbitrary communication system also related to the composition of a distributed processing system again.

For example, the "terminal unit" in the embodiment mentioned above is the "terminal" in a distributed processing system to the last, and does not need to be functioning as "terminal" in customer environment. That is, it connects with a distributed processing system like the above-mentioned embodiment by using the basic system server in customer environment as "terminal unit", and composition which processes the information acquired from here and is distributed to other device within customer environment can also be taken.

It is not necessary to be device for executing a respectively different command also with a server. For example, not only the kind of an operation request or operation response but the information on the source node of a message is referred to, and it may be made to appoint the destination in a transfer server.

If it does in this way, the number of the terminal units which transmit an operation request increases, even when the burden of a server becomes excessive, it can carry out dividing a server for every terminal unit of the fixed number etc., and the load distribution of processing can be planned easily.

Also in this case, since it is necessary to tell the terminal side related to no distributed contents of processing, the burden in the case of system configuration change can be managed with minimum.

Related to the operation request from the terminal side, it is able for a transfer server to carry out supervising a communications traffic etc., and to change the destination dynamically according to the contents.

Since there is a function to specify the suitable transfer path for a server and to return an operation response even if it does in this way, an operation response can be correctly returned to the source node of an operation request.

The device equivalent to a transfer server is installed also in customer environment, and it may be made to make a transfer of the message related to two or more terminal units bear collectively.

In this case, since the transfer server and terminal unit within customer environment can consider connecting by LAN, they can apply the general communications protocol used for communication within LAN to communication between these.

Therefore, if such a protocol conversion function is provided in the transfer server of customer environment, even if it is a terminal unit which does not support a special protocol, it can connect with the distributed processing system which uses special protocols, such as a multi-part transfer, and the effect mentioned above can be acquired.

And since the transfer server and terminal unit within customer environment are small and end, in order that they may communicate via the network where the communication partner was usually limited, even if it does in this way, and its communication number of times increases, communication efficiency does not fall so much.

Since it is not necessary to make a terminal unit correspond to a complicated communications protocol, the time and effort and cost for constituting a system can be held down. Connection between the transfer server of customer environment and a terminal unit may be made in this case by the serial connection not only based on LAN but RS-485 specification etc., the parallel connection based on SCSI (Small Computer System Interface) specification etc.

For example, in the case of RS-485 specification, the terminal unit up to five sets is connectable in series at a transfer server. Supposing it does not provide a transfer server in customer environment, in order to prevent stagnation of information transmission, periodical needed information which each terminal unit mentioned above will be performed separately.

Therefore, much needed information will pour in transfer server 102 by the side of functional offer. Therefore, when forming many terminal units in customer environment, it is preferred to also provide a transfer server in customer environment and to make periodical needed information perform to the transfer server by representation.

Figure 65:
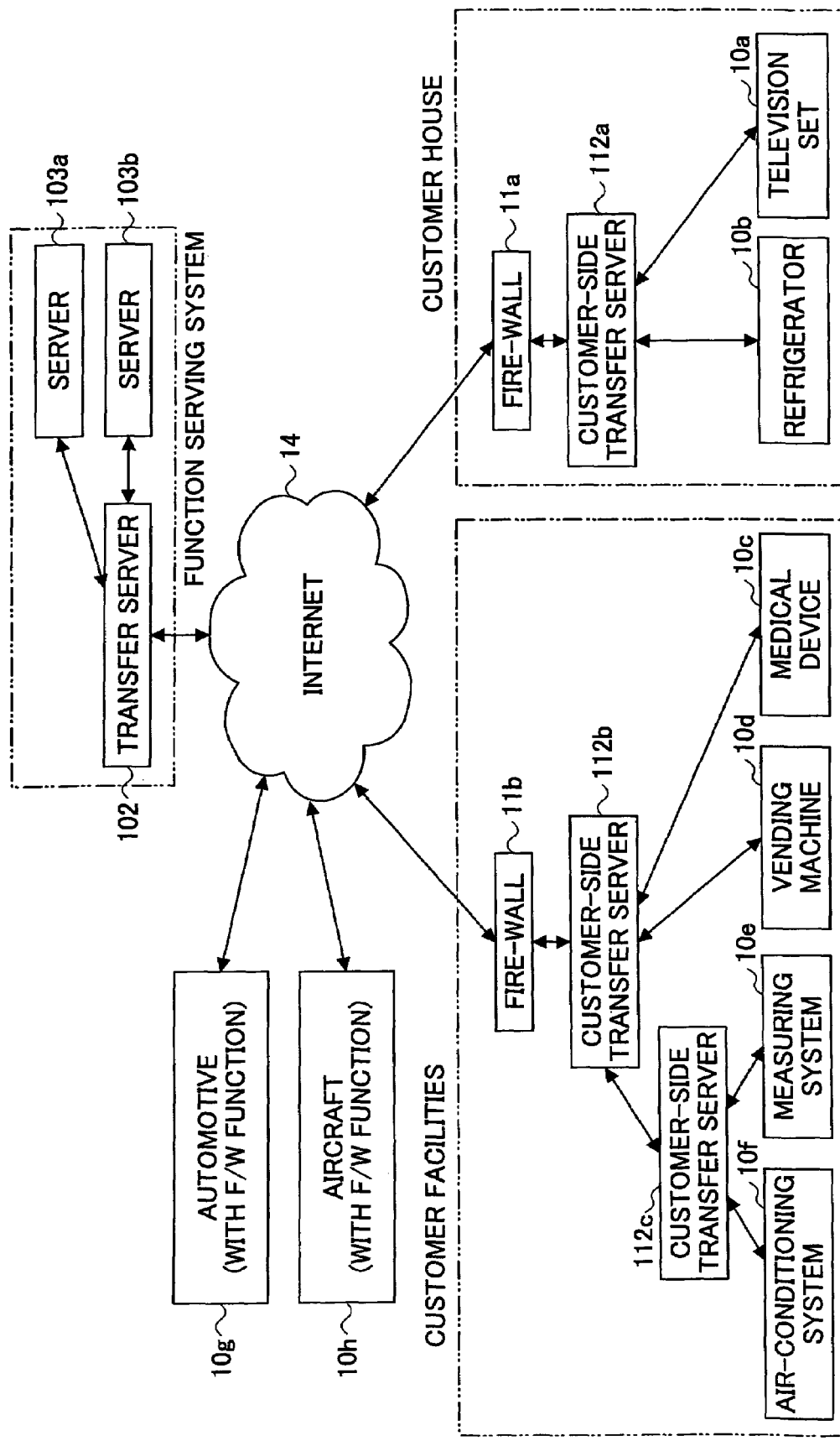
FIG. 65 is a diagram showing the composition of another embodiment of the distributed processing system of the invention.

In this case, a system configuration as shown in FIG. 65 can be considered.

In FIG. 65, a network connected home appliance like television set 10*a* or refrigerator 10*b* as an example of the controlling device which forms customer environment side transfer server 112 separately, medical device 10*c*, 10*d* of vending machines, measurement system 10*e*, and 10*f* of air conditioning systems are mentioned.

And 10*g* of cars and 10*h* of aircrafts are mentioned as an example of the controlling device which does not form customer environment side transfer server 112 separately. In the device which moves a large area like 10*g* of cars, and 10*h* of aircrafts, it is preferred to make it also have a function of firewall (FW) 11.

If needed information is always emitted from customer environment side transfer server 112 and it is made to transmit a message even if firewall 11 is between customer environment side transfer server 112 and transfer server 102 by the side of functional offer, there will be no trouble in particular in a transfer of a message.

The same vendor does not need to offer transfer server 102 and server 103 related to the functional offer side, either.

It will not matter, if the destination of a command can be grasped in each transfer server, and how a function is offered by the server of the destination.

Therefore, the command to two or more servers which offer functions, such as tourist resort guidance, timetable guidance, ticket reservation, and prearranged accommodation, by the terminal side is transmitted.

The XML data of a command response is processed respectively and it joins together, and if processing which is changed into one HTML document is performed, the transfer server can also provide the same service what is called as a portal site which offers the function of two or more sites within one web page.

In the embodiment mentioned above, the terminal unit explained the example which does not indicate the message concerning the destination or the destination to the operation request and operation response which transmit to a transfer server.

However, the destination of the server which should transmit a terminal command, and the information on the source node of a server command are grasped by the terminal side, and it may be made to indicate the destination to the command and command response which transmit to a transfer server.

What is necessary is to indicate the destination and the information on a transmitting agency to the SOAP header in a SOAP message, to indicate this on a terminal command sheet or the server side command sheet, and just to manage it, in doing in this way.

When the destination indicated to the operation request and operation response which receive from a terminal unit is only device in which itself or direct communication is possible, a transfer server does not provide a destination table but should just register it into a transfer message sheet by making into the destination the destination indicated to the SOAP header.

When the device which should be transmitted to the destination via another transfer server may be contained, the correspondence relation between destination information and the device used as the direct destination is stored as a destination table, and it is possible to judge the destination of the following stage with reference to this table.

In order to interpret the contents of the SOAP header, it is necessary to deserialize the SOAP message. The effect of the improvement in efficiency of communication by transmitting collectively the operation request addressed to two or more terminal units to a transfer server from a server, even when such composition is taken is acquired like the case of the embodiment mentioned above. This effect is large especially when it is the customer environment side transfer server which the transfer server mentioned above.

A transfer server bundles up the operation request from two or more servers addressed to a terminal unit to a terminal unit, and transmits, and when receiving the operation response to those operation requests collectively, the effect of the improvement in communication efficiency is acquired similarly.

This effect has a large effect, especially when the transfer server is provided in the functional offer side. These effects are acquired, even when not dealing with the operation request from the terminal side but dealing with only the operation request from the server side, and the operation response to it.

Of course, each deformation explained above can be combined and applied in the range which is not contradictory.

The program by the invention is a program for operating a computer as a transfer device which mediates communication between the first communication device and two or more second communication devices.

An effect which was mentioned above can be acquired by making a computer execute such a program. Although such a program may be stored in storage units with which a computer is equipped from the start, such as ROM or HDD. It can record on nonvolatile recording media (memory), such as CD-ROM which is a recording medium or a flexible disk, SRAM and EEPROM, and a memory card, and can also provide.

Each procedure mentioned above can be performed by installing in a computer the program recorded on that memory, and performing CPU, or making CPU read and execute this program from that memory.

It is also possible to download and perform an external instrument or a program provided with the recording medium which was connected to the network and recorded the program from the external instrument stored for the storage unit.

If the transfer device, the distributed processing system, the data transfer method, program, or recording medium of the invention is used as explained above. When it constitutes communication system which a certain communication device transmits an operation request to two or more communication devices, and receives the operation response to the operation request, communication efficiency can be raised by mediating communication between communication devices appropriately.

Therefore, the communication system with a small communication load can be constituted by applying the invention to the transfer device which mediates communication in such a communication system.

The present invention is not limited to the above-described embodiments, and variations and modifications may be made without departing from the scope of the present invention.

Further, the present application is based on and claims the benefit of priority of Japanese patent application No. 2004-272605, filed on Sep. 17, 2004, the entire contents of which are hereby incorporated by reference.

What is claimed is:

1. A transfer device which mediates communication between first communication devices and a second communication device via a network, comprising:
   a first receiver unit receiving collectively operation responses from the first communication devices, the operation responses being created in response to operation requests of the second communication device and sent to the second communication device;
   a first transmitter unit transmitting collectively the operation responses received by the first receiver unit, to the second communication device as a destination of each of the operation responses;
   a second receiver unit receiving collectively the operation requests which are sent to the first communication devices by the second communication device, from the second communication device;
   a second transmitter unit transmitting collectively the operation requests received by the second receiver unit, to the first communication devices as respective destinations of the operation requests of the second communication device;
   a destination information storage unit storing a destination table defining correspondence between respective destinations of the operation responses created in response to the operation requests and respective classifications of the operation responses; and
   a message distribution unit retrieving the destination table stored in the destination information storage unit and determining a destination of each of the operation responses received by the first receiver unit according to a classification of each of the operation responses so that a pool of the transfer device, where each operation response is to be registered, is determined by a result of the determination.

2. A transfer device which mediates communication between first communication devices and a second communication device via a network, comprising:
   a first receiver unit receiving collectively both operation requests and operation responses from the first communication devices, the operation responses being created in response to operation requests of the second communication device and sent to the second communication device;
   a first transmitter unit transmitting collectively both the operation requests and the operation responses received by the first receiver unit, to the second communication device as a destination according to classification of each of the operation requests and the operation responses of the first communication devices;
   a second receiver unit receiving collectively both the operation requests which are sent to the first communication devices by the second communication device, and operation responses which are created in response to the operation requests of the first communication devices and sent to the first communication devices, from the second communication device;

a second transmitter unit transmitting collectively both the operation requests and the operation responses received by the second receiver unit, to the first communication devices as respective destinations of the operation requests and the operation responses of the second communication device;

a destination information storage unit storing a destination table defining correspondence between respective destinations of the operation requests and the operation responses created in response to the operation requests and respective classifications of the operation requests and the operation responses; and a message distribution unit retrieving the destination table stored in the destination information storage unit and determining a destination of each of the operation requests and the operation responses received by the first receiver unit according to a classification of each of the operation responses so that a pool of the transfer device, where each of the operation requests and the operation responses is to be registered, is determined by a result of the determination.

3. A transfer device which mediates communication between first communication devices and a second communication device via a network, comprising:

a first receiver unit receiving collectively both operation requests and operation responses from the first communication devices, the operation requests being sent to the second communication device, the operation responses being created in response to operation requests of the second communication device and sent to the second communication device;

a first transmitter unit transmitting collectively both the operation requests and the operation responses received by the first receiver unit, to the second communication device as a destination according to classification of each of the operation requests and the operation responses of the first communication devices;

a second receiver unit receiving collectively both the operation requests which are sent to the first communication devices by the second communication device, and operation responses which are created in response to the operation requests of the first communication devices and sent to the first communication devices, from the second communication device;

a second transmitter unit transmitting collectively both the operation requests and the operation responses received by the second receiver unit, to the first communication devices as respective destinations of the operation requests and the operation responses of the second communication device;

a destination information storage unit storing a destination table defining correspondence between respective destinations of the operation requests and the operation responses created in response to the operation requests and respective classifications of the operation requests and the operation responses; and a message distribution unit retrieving the destination table stored in the destination information storage unit and determining a destination of each of the operation requests and the operation responses received by the first receiver unit according to a classification of each of the operation responses so that a pool of the transfer device, where each of the operation requests and the operation responses is to be registered, is determined by a result of the determination.

4. The transfer device according to claim 2 further comprising a response creation unit executing an operation related to one of the received operation requests of the first receiver unit when the operation is to be executed by the transfer device, the response creation unit creating an operation response to the one of the received operation requests by a result of execution of the operation, wherein the second transmitter unit is configured to transmit collectively the operation response created by the response creation unit as well as the received operation requests and the received operation responses of the second receiver unit, to the first communication devices.

5. A transfer device which mediates communication between first communication devices and a second communication device via a network, comprising:

a first receiver unit receiving a single HTTP request from the first communication devices, the HTTP request containing respective SOAP responses of the first communication devices which are created in response to SOAP requests of the second communication device and sent to the second communication device;

a first transmitter unit transmitting the HTTP request received by the first receiver unit, to the second communication device as a destination of each of the SOAP responses contained in the HTTP request;

a second receiver unit receiving an HTTP response from the second communication device, the HTTP response being created in response to the HTTP request and containing the SOAP requests of the second communication device which are sent to the first communication devices respectively;

a second transmitter unit transmitting the SOAP requests contained in the HTTP response received by the second receiver unit, to the first communication devices as respective destinations of the SOAP requests;

a destination information storage unit storing a destination table defining correspondence between respective destinations of the SOAP responses created in response to the SOAP requests and respective classifications of the SOAP responses; and a message distribution unit retrieving the destination table stored in the destination information storage unit and determining a destination of each of the SOAP responses received by the first receiver unit according to a classification of each of the SOAP responses so that a pool of the transfer device, where each SOAP response is to be registered, is determined by a result of the determination.

6. The transfer device according to claim 5 wherein the first transmitter unit is configured to have a unit which periodically transmits an HTTP request to the second communication device.

7. The transfer device according to claim 5 wherein the second transmitter unit is configured to create, when the first receiver unit receives the HTTP request, a transfer device generated HTTP response which contains all the SOAP requests which are sent to the first communication devices respectively, and is configured to transmit the SOAP requests contained in the received HTTP response to the first communication devices.

8. A distributed processing system having a server and a transfer device connected to each other, the transfer device mediating communication between the server and terminal units via a network, the transfer device comprising:

a first receiver unit receiving collectively operation responses from the terminal units, the operation responses being created in response to operation requests of the server and sent to the server;

a first transmitter unit transmitting collectively the operation responses received by the first receiver unit, to the server as a destination of each of the operation responses;

a second receiver unit receiving collectively the operation requests which are sent to the terminal units by the server, from the server;

a second transmitter unit transmitting collectively the operation requests received by the second receiver unit, to the terminal units as respective destinations of the operation requests of the server;

a destination information storage unit storing a destination table defining correspondence between respective destinations of the operation responses created in response to the operation requests and respective classifications of the operation responses; and a message distribution unit retrieving the destination table stored in the destination information storage unit and determining a destination of each of the operation responses received by the first receiver unit according to a classification of each of the operation responses so that a pool of the transfer device, where each operation response is to be registered, is determined by a result of the determination, and the server comprising:

a transmitter unit transmitting collectively the operation requests which are sent to the terminal units, to the transfer device; and a receiver unit receiving collectively the operation responses of the terminal units which are created in response to the operation requests of the server and sent to the terminal units, from the transfer device.

9. A distributed processing system having a server and a transfer device connected to each other, the transfer device mediating communication between the server and terminal units via a network, the transfer device comprising:

a first receiver unit receiving collectively both operation requests and operation responses from the terminal units, the operation responses being created in response to operation requests of the server and sent to the server;

a first transmitter unit transmitting collectively both the operation requests and the operation responses received by the first receiver unit, to the server as a destination according to classification of each of the operation requests and the operation responses of the terminal units;

a second receiver unit receiving collectively both the operation requests which are sent to the terminal units by the server, and operation responses which are created in response to the operation requests of the terminal units and sent to the server, from the server;

a second transmitter unit transmitting collectively both the operation requests and the operation responses received by the second receiver unit, to the terminal units as respective destinations of the operation requests and the operation responses of the server;

a destination information storage unit storing a destination table defining correspondence between respective destinations of the operation requests and the operation responses created in response to the operation requests and respective classifications of the operation requests and the operation responses; and a message distribution unit retrieving the destination table stored in the destination information storage unit and determining a destination of each of the operation requests and the operation responses received by the first receiver unit according to a classification of each of the operation responses so that a pool of the transfer device, where each of the operation requests and the operation responses is to be registered, is determined by a result of the determination, and the server comprising:

a receiver unit receiving collectively both the operation requests of the terminal units which are sent to the server, and the operation responses of the terminal units which are created in response to the operation requests of the server and sent to the server, from the transfer device;

a response creation unit creating the operation responses of the server to the operation requests of the terminal units received by the receiver unit; and a transmitter unit transmitting collectively both the operation requests which are sent to the terminal units, and the operation responses which are created by the response creation unit and sent to the terminal units, to the transfer device.

10. A distributed processing system having a server and a transfer device connected to each other, the transfer device mediating communication between the server and terminal units via a network, the transfer device comprising:

a first receiver unit receiving collectively both operation requests and operation responses from the terminal units, the operation requests being sent to the server, the operation responses being created in response to operation requests of the server and sent to the server;

a first transmitter unit transmitting collectively both the operation requests and the operation responses received by the first receiver unit, to the server as a destination according to classification of each of the operation requests and the operation responses of the terminal units;

a second receiver unit receiving collectively both the operation requests which are sent to the terminal units by the server, and operation responses which are created in response to the operation requests of the terminal units and sent to the server, from the server;

a second transmitter unit transmitting collectively both the operation requests and the operation responses received by the second receiver unit, to the terminal units as respective destinations of the operation requests and the operation responses of the server;

a destination information storage unit storing a destination table defining correspondence between respective destinations of the operation requests and the operation responses created in response to the operation requests and respective classifications of the operation requests and the operation responses; and a message distribution unit retrieving the destination table stored in the destination information storage unit and determining a destination of each of the operation requests and the operation responses received by the first receiver unit according to a classification of each of the operation responses so that a pool of the transfer device, where each of the operation requests and the operation responses is to be registered, is determined by a result of the determination, and the server comprising:

a receiver unit receiving collectively both the operation requests of the terminal units which are sent to the server, and the operation responses of the terminal units which are created in response to the operation requests of the server and sent to the server, from the transfer device;

a response creation unit creating the operation responses of the server to the operation requests of the terminal units received by the receiver unit; and a transmitter unit transmitting collectively both the operation requests which are sent to the terminal units, and the operation responses which are created by the response creation unit and sent to the terminal units, to the transfer device.

11. The distributed processing system according to claim 9 wherein the transfer device further comprises a response creation unit which executes an operation related to one of the received operation requests of the first receiver unit when the operation is to be executed by the transfer device, the response creation unit creating an operation response to the one of the received operation requests by a result of execution of the operation, wherein the second transmitter unit is configured to transmit collectively the operation response created by the response creation unit as well as the received operation requests and the received operation responses of the second receiver unit, to the terminal units.

12. A distributed processing system having a server and a transfer device connected to each other, the transfer device mediating communication between the server and terminal units via a network, the transfer device comprising:

a first receiver unit receiving a single HTTP request from the terminal units, the HTTP request containing respective SOAP responses of the terminal units which are created in response to SOAP requests of the server and sent to the server;

a first transmitter unit transmitting the HTTP request received by the first receiver unit, to the server as a destination of each of the SOAP responses contained in the HTTP request;

a second receiver unit receiving an HTTP response from the server, the HTTP response being created in response to the HTTP request and containing the SOAP requests of the server which are sent to the terminal units respectively;

a second transmitter unit transmitting the SOAP requests contained in the HTTP response received by the second receiver unit, to the terminal units as respective destinations of the SOAP requests;

a destination information storage unit storing a destination table defining correspondence between respective destinations of the SOAP responses created in response to the SOAP requests and respective classifications of the SOAP responses; and a message distribution unit retrieving the destination table stored in the destination information storage unit and determining a destination of each of the SOAP responses received by the first receiver unit according to a classification of each of the SOAP responses so that a pool of the transfer device, where each SOAP response is to be registered, is determined by a result of the determination, and the server comprising:

a receiver unit receiving the HTTP request which contains the SOAP responses of the terminal units which are created in response to the SOAP requests of the server and sent to the terminal units, from the transfer device; and a transmitter unit transmitting the HTTP response which contains the SOAP requests of the server which are sent to the terminal units, to the transfer device.

13. The distributed processing system according to claim 12 wherein the first transmitter unit of the transfer device is configured to have a unit which periodically transmits an HTTP request to the server.

14. The distributed processing system according to claim 12 wherein the second transmitter unit of the transfer device is configured to create, when the first receiver unit receives the HTTP request, the HTTP response which contains all the SOAP requests which are sent to the terminal units respectively, and configured to transmit the SOAP requests contained in the received HTTP response to the terminal units.

15. A method of controlling a transfer device which mediates communication between first communication devices and a second communication device via a network, the method comprising:

receiving collectively operation responses from the first communication devices, the operation responses being created in response to operation requests of the second communication device and sent to the second communication device;

transmitting collectively the operation responses to the second communication device as a destination of each of the operation responses;

receiving collectively the operation requests which are sent to the first communication devices by the second communication device, from the second communication device;

transmitting collectively the received operation requests to the first communication devices as respective destinations of the operation requests of the second communication device;

storing a destination table defining correspondence between respective destinations of the operation responses created in response to the operation requests and respective classifications of the operation responses; and retrieving the destination table stored by the storing and determining a destination of each of the operation responses collectively received by the receiving from the first communication devices according to a classification of each of the operation responses so that a pool of the transfer device, where each operation response is to be registered, is determined by a result of the determination.

16. A method of controlling a transfer device which mediates communication between first communication devices and a second communication device via a network, the method comprising:

receiving collectively both operation requests and operation responses from the first communication devices, the operation responses being created in response to operation requests of the second communication device and sent to the second communication device;

transmitting collectively both the operation requests and the operation responses to the second communication device as a destination according to classification of each of the operation requests and the operation responses of the first communication devices;

receiving collectively both the operation requests which are sent to the first communication devices by the second communication device, and operation responses which are created in response to the operation requests of the first communication devices and sent to the first communication devices, from the second communication device;

transmitting collectively both the operation requests and the operation responses to the first communication devices as respective destinations of the operation requests and the operation responses of the second communication device;

storing a destination table defining correspondence between respective destinations of the operation requests and the operation responses created in response to the operation requests and respective classifications of the operation requests and the operation responses; and retrieving the destination table stored by the storing and determining a destination of each of the operation requests and the operation responses collectively received by the receiving from the first communication devices according to a classification of each of the operation responses so that a pool of the transfer device, where each of the operation requests and the operation responses is to be registered, is determined by a result of the determination.

17. A method of controlling a transfer device which mediates communication between first communication devices and a second communication device via a network, the method comprising:

receiving collectively both operation requests and operation responses from the first communication devices, the operation requests being sent to the second communication device, the operation responses being created in response to operation requests of the second communication device and sent to the second communication device;

transmitting collectively both the operation requests and the operation responses to the second communication device as a destination according to classification of each of the operation requests and the operation responses of the first communication devices;

receiving collectively both the operation requests which are sent to the first communication devices by the second communication device, and operation responses which are created in response to the operation requests of the first communication devices and sent to the first communication devices, from the second communication device;

transmitting collectively both the operation requests and the operation responses to the first communication devices as respective destinations of the operation requests and the operation responses of the second communication device;

storing a destination table defining correspondence between respective destinations of the operation requests and the operation responses created in response to the operation requests and respective classifications of the operation requests and the operation responses; and retrieving the destination table stored by the storing and determining a destination of each of the operation requests and the operation responses collectively received by the receiving from the first communication devices according to a classification of each of the operation responses so that a pool of the transfer device, where each of the operation requests and the operation responses is to be registered, is determined by a result of the determination.

18. The method according to claim 16 further comprising executing an operation related to one of the received operation requests of a first receiver unit when the operation is to be executed by the transfer device, wherein an operation response to the one of the received operation requests is created by a result of execution of the operation, wherein the second transmitting step is configured to transmit collectively the created operation response as well as the received operation requests and the received operation responses of a second receiver unit, to the first communication devices.

19. A method of controlling a transfer device which mediates communication between first communication devices and a second communication device via a network, the method comprising:

receiving a single HTTP request from the first communication devices, the HTTP request containing respective SOAP responses of the first communication devices which are created in response to SOAP requests of the second communication device and sent to the second communication device;

transmitting the HTTP request to the second communication device as a destination of each of the SOAP responses contained in the HTTP request;

receiving an HTTP response from the second communication device, the HTTP response being created in response to the HTTP request and containing the SOAP requests of the second communication device which are sent to the first communication devices respectively;

transmitting the SOAP requests contained in the HTTP response, to the first communication devices as respective destinations of the SOAP requests;

storing a destination table defining correspondence between respective destinations of the SOAP responses created in response to the SOAP requests and respective classifications of the SOAP responses; and retrieving the destination table stored by the storing and determining a destination of each of the SOAP responses received by the receiving from the first communication devices according to a classification of each of the SOAP responses so that a pool of the transfer device, where each SOAP response is to be registered, is determined by a result of the determination.

20. The method according to claim 19 wherein the first transmitting step is configured to include periodically transmitting an HTTP request to the second communication device.

21. The method according to claim 19 wherein the second transmitting step is configured to create, when the HTTP request is received, the HTTP response which contains all the SOAP requests which are sent to the first communication devices respectively, and configured to transmit the SOAP requests contained in the received HTTP response to the first communication devices.

22. A computer readable storage medium having stored thereon a program product for causing a computer to execute a method of controlling a transfer device which mediates communication between first communication devices and a second communication device via a network, the method comprising:

receiving collectively operation responses from the first communication devices, the operation responses being created in response to operation requests of the second communication device and sent to the second communication device;

transmitting collectively the operation responses to the second communication device as a destination of each of the operation responses;

receiving collectively the operation requests which are sent to the first communication devices by the second communication device, from the second communication device;

transmitting collectively the received operation requests to the first communication devices as respective destinations of the operation requests of the second communication device;

storing a destination table defining correspondence between respective destinations of the operation responses created in response to the operation requests and respective classifications of the operation responses; and retrieving the destination table stored by the storing and determining a destination of each of the operation responses collectively received by the receiving from the first communication devices according to a classification of each of the operation responses so that a pool of the transfer device, where each operation response is to be registered, is determined by a result of the determination.

23. A computer readable storage medium having stored thereon a program product for causing a computer to execute a method of controlling a transfer device which mediates communication between first communication devices and a second communication device via a network, the method comprising:

receiving collectively both operation requests and operation responses from the first communication devices, the operation responses being created in response to operation requests of the second communication device and sent to the second communication device;

transmitting collectively both the operation requests and the operation responses to the second communication device as a destination according to classification of each of the operation requests and the operation responses of the first communication devices;

receiving collectively both the operation requests which are sent to the first communication devices by the second communication device, and operation responses which are created in response to the operation requests of the first communication devices and sent to the first communication devices, from the second communication device;

transmitting collectively both the operation requests and the operation responses to the first communication devices as respective destinations of the operation requests and the operation responses of the second communication device;

storing a destination table defining correspondence between respective destinations of the operation requests and the operation responses created in response to the operation requests and respective classifications of the operation requests and the operation responses; and retrieving the destination table stored by the storing and determining a destination of each of the operation requests and the operation responses collectively received by the receiving from the first communication devices according to a classification of each of the operation responses so that a pool of the transfer device, where each of the operation requests and the operation responses is to be registered, is determined by a result of the determination.

24. A computer readable storage medium having stored thereon a program product for causing a computer to execute a method of controlling a transfer device which mediates communication between first communication devices and a second communication device via a network, the method comprising:

receiving collectively both operation requests and operation responses from the first communication devices, the operation responses being created in response to operation requests of the second communication device and sent to the second communication device;

transmitting collectively both the operation requests and the operation responses to the second communication device as a destination according to classification of each of the operation requests and the operation responses of the first communication devices;

receiving collectively both the operation requests which are sent to the first communication devices by the second communication device, and operation responses which are created in response to the operation requests of the first communication devices and sent to the first communication devices, from the second communication device;

transmitting collectively both the operation requests and the operation responses to the first communication devices as respective destinations of the operation requests and the operation responses of the second communication device;

storing a destination table defining correspondence between respective destinations of the operation requests and the operation responses created in response to the operation requests and respective classifications of the operation requests and the operation responses; and retrieving the destination table stored by the storing and determining a destination of each of the operation requests and the operation responses collectively received by the receiving from the first communication devices according to a classification of each of the operation responses so that a pool of the transfer device, where each of the operation requests and the operation responses is to be registered, is determined by a result of the determination.

25. The computer readable storage medium according to claim 23 wherein the method further comprises executing an operation related to one of the received operation requests of a first receiver unit when the operation is to be executed by the transfer device, wherein an operation response to the one of the received operation requests is created by a result of execution of the operation, wherein the second transmitting step is configured to transmit collectively the created operation response as well as the received operation requests and the received operation responses of a second receiver unit, to the first communication devices.

26. A computer readable storage medium having stored thereon a program product for causing a computer to execute a method of controlling a transfer device which mediates communication between first communication devices and a second communication device via a network, the method comprising:

receiving a single HTTP request from the first communication devices, the HTTP request containing respective SOAP responses of the first communication devices which are created in response to SOAP requests of the second communication device and sent to the second communication device;

transmitting the HTTP request to the second communication device as a destination of each of the SOAP responses contained in the HTTP request;

receiving an HTTP response from the second communication device, the HTTP response being created in response to the HTTP request and containing the SOAP requests of the second communication device which are sent to the first communication devices respectively;

transmitting the SOAP requests contained in the HTTP response, to the first communication devices as respective destinations of the SOAP requests;

storing a destination table defining correspondence between respective destinations of the SOAP responses created in response to the SOAP requests and respective classifications of the SOAP responses; and retrieving the destination table stored by the storing and determining a destination of each of the SOAP responses received by the receiving from the first communication devices according to a classification of each of the SOAP responses so that a pool of the transfer device, where each SOAP response is to be registered, is determined by a result of the determination.

27. The computer readable storage medium according to claim 26 wherein the first transmitting step is configured to include periodically transmitting an HTTP request to the second communication device.

28. The computer readable storage medium according to claim 26 wherein the second transmitting step is configured to create, when the HTTP request is received, the HTTP response which contains all the SOAP requests which are sent to the first communication devices respectively, and configured to transmit the SOAP requests contained in the received HTTP response to the first communication devices.

* * * * *